(12) United States Patent
Kitchen et al.

(10) Patent No.: US 12,270,664 B2
(45) Date of Patent: *Apr. 8, 2025

(54) METHOD AND SYSTEM FOR VEHICLE ROUTE DETERMINATION BASED ON MOTION DATA

(71) Applicant: Cambridge Mobile Telematics Inc., Cambridge, MA (US)

(72) Inventors: Harrison Kitchen, Braintree, MA (US); Matthew Evan Lewin, Lexington, MA (US); Yuting Qi, Cambridge, MA (US); William Abildgaard, Jr., Waltham, MA (US); Ankit Singhania, Somerville, MA (US); Edward Gelberg, Ashland, MA (US)

(73) Assignee: Cambridge Mobile Telematics, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,457

(22) Filed: Nov. 2, 2023

(65) Prior Publication Data

US 2024/0142244 A1   May 2, 2024

Related U.S. Application Data

(63) Continuation of application No. 17/752,520, filed on May 24, 2022, now Pat. No. 11,841,231.
(Continued)

(51) Int. Cl.
*G01C 21/34* (2006.01)
(52) U.S. Cl.
CPC ....... *G01C 21/343* (2013.01); *G01C 21/3484* (2013.01)

(58) Field of Classification Search
CPC .. G01C 21/343; G01C 21/3484; G01C 21/30; G07C 5/008; G07C 5/0816
See application file for complete search history.

(56) References Cited

U.S. PATENT DOCUMENTS

| | | |
|---|---|---|
| 10,246,037 B1 | 4/2019 | Shea et al. |
| 2005/0192749 A1 | 9/2005 | Flann et al. |

(Continued)

OTHER PUBLICATIONS

U.S. Appl. No. 17/752,520, "Non-Final Office Action", Apr. 7, 2023, 21 pages.

(Continued)

*Primary Examiner* — Sahar Motazedi
(74) *Attorney, Agent, or Firm* — Kilpatrick Townsend & Stockton LLP

(57) ABSTRACT

Apparatuses and methods for determining a route are provided. In some examples, the method comprises: receiving measurements of one or more motion sensors of a mobile device disposed in a vehicle; selecting, based on a start time and an end time of a first route, a subset of the measurements; determining, based on the subset of the measurements, turns or stops made by the vehicle as part of the first route and their directions; determining, based on the subset of the measurements, distances of path segments traveled by the vehicle between the turns or stops; constructing an estimated route including a sequence of the turns or stops and path segments; selecting, based on comparing the estimated route and a plurality of candidates routes from a map, the first route; and displaying the map including the first route.

20 Claims, 54 Drawing Sheets

Related U.S. Application Data

(60) Provisional application No. 63/296,798, filed on Jan. 5, 2022, provisional application No. 63/192,961, filed on May 25, 2021.

(56) References Cited

U.S. PATENT DOCUMENTS

| | | | |
|---|---|---|---|
| 2005/0242970 A1* | 11/2005 | Blaker | G07C 9/00182 |
| | | | 340/870.07 |
| 2007/0156334 A1 | 7/2007 | Vu | |
| 2012/0016576 A1 | 1/2012 | Huang et al. | |
| 2015/0274028 A1 | 10/2015 | Payne et al. | |
| 2015/0308847 A1 | 10/2015 | Hilbrandie et al. | |
| 2018/0126938 A1 | 5/2018 | Cordova et al. | |
| 2019/0204838 A1 | 7/2019 | Haque et al. | |
| 2019/0208384 A1 | 7/2019 | Matus et al. | |
| 2020/0256693 A1 | 8/2020 | Sheha et al. | |
| 2021/0172754 A1 | 6/2021 | Nunkesser et al. | |
| 2021/0372800 A1 | 12/2021 | Primack et al. | |

OTHER PUBLICATIONS

U.S. Appl. No. 17/752,520, "Notice of Allowance", Aug. 2, 2023, 15 pages.
PCT/US2022/030740, "International Preliminary Report on Patentability", Dec. 7, 2023, 10 pages.
PCT/US2022/030740, "International Search Report and the Written Opinion", Oct. 6, 2022, 11 pages.

\* cited by examiner

METHOD AND SYSTEM FOR VEHICLE ROUTE DETERMINATION BASED ON MOTION DATA

CROSS-REFERENCES TO RELATED APPLICATIONS

This application is a continuation of U.S. patent application Ser. No. 17/752,520, filed on May 24, 2022; which claims priority to U.S. Provisional Patent Application No. 63/192,961, filed on May 25, 2021 and U.S. Provisional Patent Application No. 63/296,798, filed on Jan. 5, 2022, the disclosures of which are hereby incorporated by reference in their entirety for all purposes.

BACKGROUND

Unless otherwise indicated herein, the materials described in this section are not prior art to the claims in this application and are not admitted to be prior art by inclusion in this section.

A mobile device typically includes a Global Positioning System (GPS) receiver. The positioning of the mobile device, as well as the positioning of a carrier of the mobile device (a person, a vehicle, etc.), can be performed using GPS data. A history of locations of the mobile device, as well as historical routes undertaken by the vehicle that carries the mobile device, can also be determined based on past GPS data. The historical routes can be determined for various purposes, such as determining past driving behaviors of a driver of the vehicle during a trip or determining past driving events (e.g., vehicle crashes) that occurred in the trip.

While past GPS data allow determination of a history of locations and historical routes undertaken by the vehicle, the GPS data can become unavailable within certain route segments(s) of the trip. The GPS data can become unavailable due to various reasons such as, latency in acquiring and/or processing GPS signals for location determination, poor GPS signal reception, etc. If GPS data is relied upon to determine the locations of the vehicles, it may become difficult to determine certain historical routes undertaken the vehicle where GPS data is unavailable.

SUMMARY OF THE INVENTION

Embodiments of the present invention generally relate to vehicle route determination, and more particularly, to vehicle route determination based on motion data.

According to various aspects there is provided methods for determining a vehicle route based on motion data. The method comprises: receiving measurements of one or more motion sensors of a mobile device disposed in a vehicle; selecting, based on a start time and an end time of a first route, a subset of the measurements; determining, based on the subset of measurements, one or more turns or stops made by the vehicle as part of the first route, one or more turning directions of the one or more turns, and one or more first times at which the vehicle made the one or more turns or stops; determining, based on the subset of measurements, one or more distances of one or more path segments traveled by the vehicle before or after the one or more turns or stops as part of the first route, and one or more second times at which the vehicle traveled the one or more path segments; constructing an estimated route including a sequence of the one or more turns or stops and the one or more paths based on the start time, the one or more first times, the one or more second times, the one or more turning directions, and the one or more distances; selecting, based on comparing the estimated route and a plurality of candidate routes from a map, the first route traveled by the vehicle; and displaying the map including the first route.

In an embodiment, comparing the estimated route and the plurality of candidate routes can include determining a first metric representing a number of mismatch turns between the estimated route and each of the plurality of candidate routes, determining a second metric representing mismatches in distances of path segments between the estimated route and each of the plurality of candidate routes, and determining a score based on the first metric and the second metric for each of the plurality of candidate routes. The first route can be selected as one of the plurality of candidate routes from the plurality of candidate routes based on the score of the one of the plurality of candidate routes. The method can also include removing a mismatch turn from the estimated route and merging a plurality of path segments separated by the mismatch turn into a single path segment. The first metric and the second metric can be determined from the estimated route having the mismatch turn removed and the single path segment. The first route can be part of a trip and the method can include receiving information of other routes of the trip and displaying the trip including the first route and the other routes. Additionally, the method can further include obtaining information of a driving event that occurs in the first route and displaying the driving event in the map. The method can be performed by the mobile device.

Another aspect of the present disclosure includes a system comprising one or more processors and a non-transitory, computer-readable medium storing instructions, which when executed by one or more processors, cause the one or more processors to perform the first method and/or the second method described above. During operation of the system, the start time can be determined based on an indication of an end of a previous trip or a visit. Comparing the estimated route and the plurality of candidate routes can include determining a first metric representing a number of mismatch turns between the estimated route and each of the plurality of candidate routes, determining a second metric representing mismatches in distances of path segments between the estimated route and each of the plurality of candidate routes, and determining a score based on the first metric and the second metric for each of the plurality of candidate routes. The first route can be selected as one of the plurality of candidate routes based on the score of the one of the plurality of candidate routes. The system can perform removing a mismatch turn from the estimated route and merging a plurality of path segments separated by the mismatch turn into a single path segment. The first metric and the second metric can be determined from the estimated route having the mismatch turn removed and the single path segment. The first route can be part of a trip and the system can receive information of other routes of the trip and display the trip including the first route and the other routes. The system can obtain information of a driving event that occurs in the first route and display the driving event in the map. The system can include a processor that is part of a mobile device.

Another aspect of the present disclosure includes a non-transitory, computer-readable medium storing instructions, which when executed by one or more processors, cause one or more processors to perform the first method and/or the second method described above.

Numerous benefits are achieved by way of the various embodiments over conventional techniques. For example, the various embodiments provide methods and systems that can be used to circumvent excessive power consumption by GPS receivers operating for vehicle crash detection in mobile devices. In some embodiments, speed estimates for crash detection are obtained sensor measurements from an inertial measurement unit that consumes significantly less power from a mobile device than a GPS receiver. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION OF SPECIFIC EMBODIMENTS

While certain embodiments are described, these embodiments are presented by way of example only and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Example Systems

Figure 1:
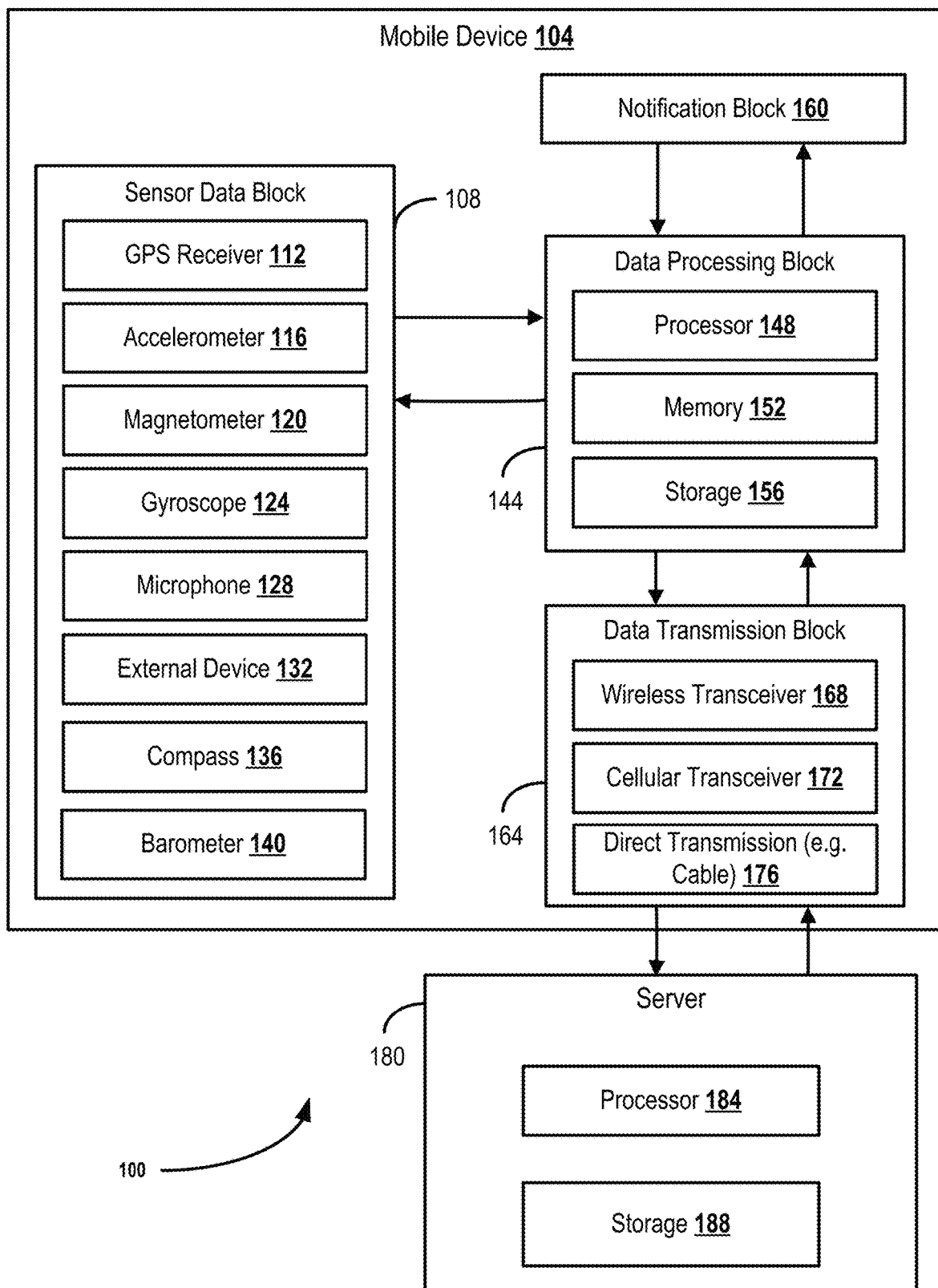
FIG. 1 is a block simplified diagram illustrating an example of a system for collecting driving data according to some aspects of the present disclosure.

FIG. 1 is a system diagram illustrating a system 100 for measuring device acceleration and detecting physical interaction according to some embodiments. System 100 includes a mobile device 104 which includes a plurality of processing, sensor, and communication resource components. Mobile device 104 may include a sensor data block 108, a data processing block 144, a data transmission block 164, and optionally a notification block 160. The sensor data block 108 includes data collection sensors as well as the data collected from sensors that is available to mobile device 104. This can include external devices connected via Bluetooth, USB cable, etc. The data processing block 144 may include storage 156 which may include data from the sensors of the sensor data block 108 processed by processor 148. This may include, but is not limited to, analyzing, characterizing, manipulating, smoothing, subsampling, filtering, reformatting, etc. Examples of mobile devices include, but are not limited to, smartphones, tablets, laptops, application specific integrated circuits (ASICs), and the like.

Data transmission block 164 may process communications (e.g., transmitted and received communications), such as the processed sensor data transmitted to an external computing device (e.g., server 180). The external computing device may also store and/or process the data obtained from sensor data block 108. Server 180 may include its own processor 184 and storage 188.

Notification block 160 may report the results of analysis of sensor data performed by the data processing block 144 to a user of the mobile device 104 via a display (not shown). For example, notification block 160 may display or otherwise present a warning communication to a user of the mobile device 104 upon determining that that the user may be a distracted driver. In some examples, the physical interaction determination may be a process executed by processor 148 of mobile device 104. In other examples, the physical interaction determination may be a process executed by processor 184, as described further herein with respect to FIG. 2.

Some embodiments are described using examples where driving data is collected using mobile device 104, also referred to as an electronic device, and these examples are not limited to any particular electronic device. For example, electronic devices may include a variety of devices that be included within or connected to mobile device 104. Examples of electronic devices include, but are not limited to, devices with one or more location determination systems such as global positioning system (GPS) receivers 112, accelerometers 116, magnetometers 120, gyroscopes 124, microphones 128, external (sensor) devices 132, compasses 136, barometers 140, communications capabilities, and the like. Exemplary electronic devices include smart watches, fitness monitors, Bluetooth headsets, tablets, laptop computers, smart phones, music players, movement analysis devices, and the like.

One or more sensors of mobile device 104 (e.g., the sensors of sensor data block 108) may be operated to collect measurements to provide an indication as to physical interaction with the mobile device 104. In some examples, the measurements may be collected at time when the electronic device is likely to be with the driver when operating a vehicle, such as when the device is moving with a particular speed or when the device is located on a known road (e.g., a highway). The sensors used to collect data may be components of the mobile device 104 and use power resources available to mobile device 104 components (e.g., mobile device battery power and/or a data source external to mobile device 104).

In some examples, settings of a mobile device may be used to enable different functions described herein. For example, in Apple iOS, Android OS, and/or wearable device operating systems having certain settings enabled can enable certain functions of embodiments. In some examples, having location services enabled allows the collection of location information from the mobile device (e.g., collected by global positioning system (GPS) receiver 112) and enabling the background app refresh allows some embodiments to execute in the background, collecting and analyzing driving data even when the application is not executing. In some instances, location information may be determined by other sensors of the mobile device, such as by tracking movement of the mobile device (e.g., using an accelerometer), by receiving location information from an external source, radio triangulation (e.g., using cellular, Bluetooth, or Wi-Fi radios), by an IP address of the mobile device, or by other means. Thus, in some embodiments, the measurements made using the one or more sensors of the mobile device do not include GPS location data, but rely on sensors, such as an accelerometer, a gyroscope, or other sensor, that does not receive or utilize GPS location data. Thus, measurements made using the one or more sensors may be referred to in some embodiments as non-position data since, although position data can be derived from the measurements, the measurements include acceleration or velocity data, but not GPS location data. In some implementations, alerts are provided or surfaced using notification block 160 while the app is running in the background since the physical can be performed in the background.

Figure 2:
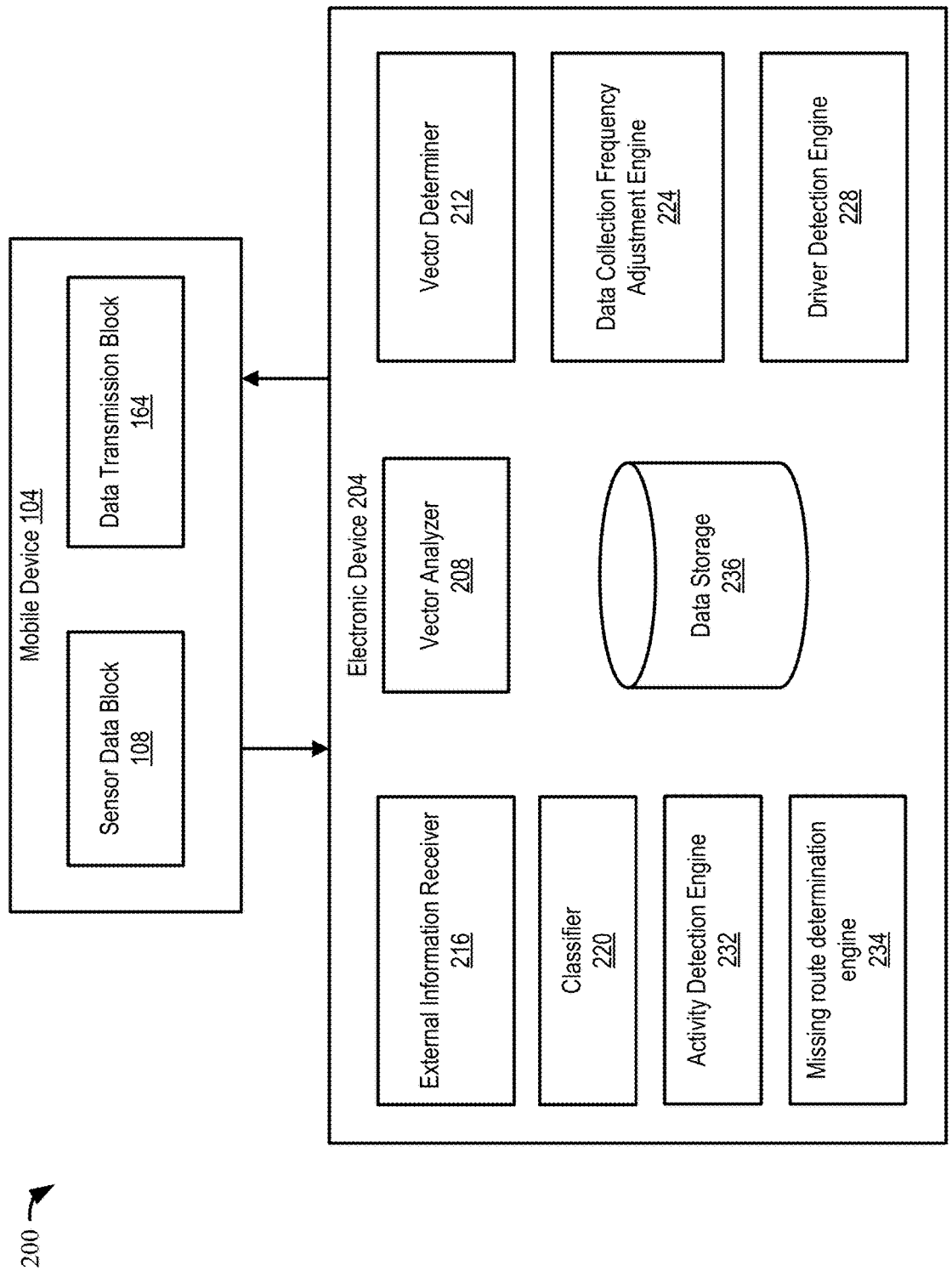
FIG. 2 is a simplified block diagram illustrating example of another system for collecting driving data according to some aspects of the present disclosure.

FIG. 2 is a simplified block diagram illustrating an example of another system 200 for collecting driving data according to some aspects of the present invention. System 200 may include electronic device 204, which may be incorporated within mobile device 104 (e.g., as specialized hardware or software) or may be a separate device (or execute on a separate device) that communicates with the mobile device 104. For instance, as a separate device, electronic device 204 may be a mobile device (e.g., such as mobile device 104 of FIG. 1, a similar type of mobile device, a different type of mobile device, or the like), a server, a computing device such as desktop or laptop computer, a specialized processing device (e.g., such as one or more application specific integrated circuits, field programmable gate arrays, or the like), a distributed processing system (e.g., such a cloud environment or the like), a combination thereof (e.g., as a distributed process), or the like. In some embodiments, the electronic device 204 may provide functionality using components including, but not limited to: a vector analyzer 208, a vector determiner 212, an external information receiver 216, a classifier 220 (e.g., a machine learning model), a data collection frequency engine 224, a driver detection engine 228, an activity detection engine 232, and a missing route determination engine 234. Each component may include one or more processors (not shown) and memory (not shown). Instructions stored in the memory of a component may be executed by the one or more processors of the component provide the functionality of the component. Alternatively, one or more processors of electronic device 204 (not shown) may execute instructions stored in a central memory of electronic device 204 to provide the functionality of the components. The electronic device 204 may also include a data storage 236. In some instances, one or more of the components 208-234 operating on electronic device 204 may be stored memory 152 or storage 156 of mobile device 104, and/or executed by processor 148 of mobile device 104.

One or more of sensors of mobile device 104 (e.g., sensors of sensor data block 108) are used to measure characteristics of an environment in which the mobile device is positioned. For instance, the one or more sensors are used to collect characteristics of a vehicle while the mobile device is positioned in the vehicle and during a drive. In that instance, the one or more sensors may be operated while the mobile device is positioned proximate to a driver during a time interval that corresponds to when the driver is operating the vehicle. As used herein, the terms "drive" and "trip" refer to the operation of a vehicle over an interval of time. Measurements obtained from the one or more sensors may be analyzed to determine acceleration vectors for the vehicle, as well as different features of the drive. In some instances, external data (e.g., weather, traffic, vehicle information, driver information) can be retrieved and correlated with collected driving data.

In some embodiments, a display of a mobile device (such as mobile device 104) can show representations of driving data collected by the one or more sensors or generated by any of components 208-234. For instance, representations of driving data can be generated by transforming collected sensor data (e.g., driving data collected using sensor data block 108) into different results, including but not limited to, estimates of an activity of a user of mobile device 104 (e.g., stationary, walking, running, or driving), estimates of the occurrence of different driving events during a drive or a trip for which data was collected, a metric descriptive of the driving behavior of a driver during the drive, a metric descriptive of the overall driving behavior of a driver for all drives, a metric descriptive of a driver's behavior as related to the occurrence of certain events, and/or a combination of transformed driving data and geographic data.

In some instances, collected driving data can be analyzed to assign scores to a drive, multiple drives, a driver, and/or driving behavior based on different criteria. A scoring engine (not shown) may aggregate data collected by the one or more sensors and apply one or more rules to generate scores for the embodiments. Further disclosure regarding scoring can be found in U.S. patent application Ser. No. 15/615,579, entitled "SYSTEMS AND METHODS FOR SCORING DRIVING TRIPS" ("the '579 application"), filed Jun. 6, 2017, herein incorporated by reference in its entirety.

Sensor data (e.g., collected using the sensor data block 108) may be used to analyze movement of the mobile device to detect the occurrence of driving events. The sensor data may be aggregated by electronic device 204 and analyzed once a predetermined amount of the sensor data is received. For example, once the electronic device 204 aggregates 50 megabytes of sensor data, the electronic device 204 may initiate an analysis of the sensor data. In another example, the electronic device 204 may initiate an analysis of the sensor data once electronic device 204 receives sensor data collected over a predetermined interval (e.g., a half hour of sensor data or an hour of sensor data). In still yet another example, the electronic device 204 aggregates sensor data associated with a trip and analyzes the sensor data once all of the sensor data associated with the trip is received. Alternatively, mobile device 104 includes one or more of components 208-234 and provides analysis of sensor data in real time (e.g., as the one or more sensors obtain measurements).

A GPS receiver may provide time stamped location and speed data that can be used by various applications executing on the mobile device. The time stamped data can be used to accurately determine vehicle location and speed. A GPS receiver may detect a crash and to determine distance traveled by the vehicle. For instance, GPS receiver may detect a crash by detecting sudden changes in speed or location. However, since mobile devices operate with limited resources due power and processing constraints and due to the high power consumption of operating a GPS receiver, electronic device 204 may use the one or more other sensors of mobile device 104 to detect vehicle location and/or speed.

For instance, a mobile device positioned in a vehicle experiences mechanical vibrations related to the activity of the vehicle. These vibrations are measurable using a subset of the sensors in the sensor data block 108 of mobile device 104 referred to as an inertial measurement unit (IMU). The measurements of the mechanical vibration can occur at varying amplitudes and frequencies, which can be used to identify the vehicle activity or in some cases activity of the user. For example, some or all of the accelerometer, gyroscope, and magnetometer measurements may distinguish walking patterns of the user from driving patterns of the vehicle (e.g., vehicle speed of approximately 5 m/s).

The IMU may include any of the accelerometer 116, the gyroscope 124, and the magnetometer 120. The IMU and the sensors included within may be a separate unit from a GPS receiver. The accelerometer 116 may be a three-axis accelerometer operable to measure longitudinal and lateral acceleration, as well as acceleration due to gravity. The gyroscope 124 and the magnetometer 120 may also be three-axis devices and may measure angular rotation and magnetic heading, respectively, in three dimensions. The IMU may combine the three-dimensional accelerometer data with the three-dimensional gyroscopic data to identify movement of the mobile device with six degrees of freedom (6 DOF) (e.g., translation and rotation).

In some instances, data obtained from the IMU can be filtered and used as input to train a classifier, such as classifier 220, to predict vehicle speed. An example of such a classifier includes, but is not limited to, an xgboost classifier. The classifier may be trained using features extracted from training data of a large number of driving trips. The extracted training features may include statistical features of the driving data, for example, median, variance, and maximum values of the IMU signals (e.g., accelerometer, gyroscope, and magnetometer signals). In some instances, the orientation of the mobile device with respect to gravity may be determined and input to the classifier for training. Other statistical features may be used without departing from the scope of the present invention.

During a trip with a mobile device positioned in a vehicle, the IMU of the mobile device may be used to obtain movement measurements from any of the accelerometer, the gyroscope, and the magnetometer, and the movement measurements to generate an input for a classifier to predict vehicle speed. In some instances, the acceleration measurements used in the prediction of vehicle speed may be user acceleration measurements. User acceleration measurements may be acceleration measurements for which the gravity component of acceleration has been removed. In some instances, the acceleration measurements used in the prediction of vehicle speed may be raw acceleration measurements. Raw acceleration measurements may be acceleration measurements that include the gravity component.

The movement measurement signals from the IMU sensors may be sampled at a specified sampling rate to obtain digital signals. In some instances, a 9 Hz sampling rate may be used for the movement measurement signals. In other instances, a 30 Hz sampling rate may be used for the movement measurement signals. Other sampling rates, for example, 50 Hz or another sampling rate may be used. Higher sampling rates can provide improved speed estimation at the cost of increased resource consumption (e.g., processing and/or power resources). Electronic device 204 and/or mobile device 104 may modulate IMU sensor sampling in real time to optimize the volume of data collected (e.g., for accuracy of data analysis) and the resource consumption.

For instance, if the mobile device is connected to a reliable power source (e.g., such as the vehicle's power supply), the movement measurement signals may be sampled at a highest frequency (e.g., 50 Hz or a predetermined highest frequency). If the mobile device is not connected to a power source, the movement measurement signals may be sampled at a lower frequency (e.g., 30 Hz sampling or a predetermined medium frequency). If the power supply of the mobile device is below a threshold value (e.g., 25% of maximum), then the sampling of the movement measurement signals may be reduced to a lower frequency (e.g., 9 Hz or a predetermined low frequency) to conserve the remaining power of the mobile device. In some instances, the sampling rate of the movement measurement signals may be modified to improve the speed estimation. For instance, an accuracy metric may be used to indicate a likelihood that a given speed estimation is valid. If the accuracy metric does not exceed a threshold, the sampling rate of the movement measurement signals may be temporarily or permanently increased until the accuracy metric exceeds the threshold. The mobile device may modulate the sampling rate in real time based on the operating conditions (e.g., resource consumption) of the mobile device or the metric.

Filtered IMU signals can distinguish driving, stopping, and user walking patterns. A bandpass filter (e.g., implemented in hardware or software), for example, an infinite impulse response (IIR) filter, may be used to filter the IMU signals to isolate frequencies indicative of various vehicle activities and to remove signal magnitude values exceeding a specified threshold. Portions of the signals having magnitude values exceeding the specified threshold may be excluded from further bandpass filtering. The digital bandpass filters can be designed to isolate the amount of vibration (i.e., frequencies) occurring within specific frequency ranges of interest. For example, the amount of vibrations may be separated into frequency ranges from 0.2 Hz to 1.1 Hz, from 1.1 Hz to 2.0 Hz, etc., depending on the sampling frequency, by bandpass filtering the signals.

Changes in lower frequency bands, for example up to approximately 1 Hz, may contain information about the vehicle stopping, while changes in higher frequency bands may correspond to the vehicle driving at higher speeds. The sources of the vibrations detected by the IMU sensors are complex interactions between engine vibrations resulting from speed changes or vibrations due to the vehicle interacting with the road surface at different speeds. A machine-learning model (e.g., the classifier) can learn these more complex interactions, which can be a combination of high and low frequencies, which correspond to each vehicle behavior.

In some instances, IMU sensor signals having large magnitudes may be disruptive to the vehicle speed prediction. In those instances, filtering may exclude the large magnitude signals. For example, accelerometer signal magnitude values exceeding a threshold value of about 10 m/s$^2$ or another threshold value, as well as any subsequent portions of the signal, may be excluded. The portions of the IMU signals up to, but not including, the signal magnitude values exceeding the threshold value may be bandpass filtered using the IIR filter.

The IIR filtering process may employ forward-backward filtering in which the portions of the IMU signals are filtered normally (i.e., forward filtering), and the forward filtered signals are "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, such that the result of the last step of the filter algorithm is applied to the next step. IIR filtering methods may be more computationally efficient than filtering methods that require computation of all intermediate numerical quantities that lead to the result (e.g., Fourier transforms). IIR filters are also advantageous because they can isolate frequency ranges of interest with greater signal amplitude attenuation outside of a range of interest. In some implementations, a finite impulse response (FIR) filter, rather than an IIR filter, may be used for bandpass filtering of the IMU signals.

The number of frequency bands used for the bandpass filtering may be determined by the desired granularity and the sampling frequency of the sensor data. For example, 14 passbands may be used in equally spaced 0.3 Hz frequency bands from 0.2 Hz to a Nyquist sampling frequency of 4.5 Hz for data obtained using a 9 Hz sampling, and 28 passbands may be used from 0.2 Hz to 15 Hz for data obtained using a 30 Hz data. More granular frequency bands may be used when the IMU signals are sampled at higher sampling frequencies. Selection of the number and width of the frequency bands may be determined based on the desired signal quality in each band and the granularity of the information. For example, too many frequency bands can result in degraded signal quality due to the narrow bandwidth, while too few frequency bands may result in loss of granularity of the captured information.

Features, for example statistical features, may be extracted from some or all of the filtered signals. The features used as inputs to classifier 220 can be summary statistics (e.g., median, variance, and maximum) over the various signals, covering different time spans. The features may be extracted from time windows of different lengths. In some implementations, each of the statistical features may be extracted from the IMU signals over a 5-second time window, a 10-second time window, and a 20-second time window. Each window may be centered at the time point under consideration. Over each of the windows, summary statistics such as the mean, median, variance, maximum, and minimum of the various band-passed versions of the IMU sensor signals (e.g., accelerometer, gyroscope) contained in these windows can be calculated.

The different length windows may provide levels of stability for the feature values, with longer window times producing more stable feature values. Other window lengths or a different number of windows may be used without departing from the scope of the invention. For example, in some implementations, a single window may be used. For a bandpass filtered accelerometer signal between 0.2 Hz to 1.1 Hz, nine features may be extracted (e.g., median, variance, and maximum, with each feature extracted over a 5-second time window, a 10-second time window, and a 20-second time window). The feature extraction produces a single list of values (e.g., a feature vector) for each time point under consideration.

The extracted features (e.g., the feature vectors) may be input to the classifier. The machine learning model (e.g., the classifier) can then make a speed prediction based on the feature vector inputs. The vehicle speed prediction by the classifier may be quantized, for example, in increments of 5 m/s or another increment. In some implementations, the orientation of the mobile device with respect to gravity may be determined and input to the classifier.

Activity detection engine 232 identifies an activity that corresponds to sensor measurements received from the one or more sensors of sensor data block 108. For instance, the activity detection engine 232 identifies: when mobile device 104 is stationary, with a user who is walking, with a user who is running, with a user who is riding a bicycle, in a vehicle that is driving, in a vehicle that is flying, and the like. In some instances, activity detection engine 232 outputs a probability of the activity. In those instances, activity detection engine 232 may output more than one probability such as a 45% probability that the mobile device is walking, a 33% probability that mobile device is driving, and a 22% probability of some other activity. The probability may be expressed as an integer or real number, a percentage, a grade (such as a low, medium, or high), or in any way that represents the probability of a given activity.

Activity detection engine 232 may use the activity to detect drives from sensor data. For instance, activity detection engine 232 may analyze the data received from mobile device 104 and identify a first time when the activity indicates a high probability that mobile device 104 is in a car that is driving. Activity detection engine 232 may identify a second time after the first time in which there is a high probability another activity (e.g., stationary, walking). Activity detection engine 232 then defines a trip as occurring from the first time to the second time. Other components of electronic device 204 may then further analyze the sensor data received between the first time and the second time to identify driver behavior, driver score, crash detection, speed estimation, etc. In some instances, activity detection engine 232 or any of the operations described in connection with the activity detection engine 232 may be performed by an operating system of the mobile device to manage data collection by sensor data block 108.

In some instances, activity detection engine 232 may operate on mobile device 104 to control collection of measurements from sensor data block 108. Mobile device 104 may execute a data collection application that controls the operation of the one or more sensors of mobile device 104 (e.g., such as sampling rates and the like) and collects measurements from the one or more sensors. The data collection application can include one or more of the components 208-232. Since the mobile device operates with limited resources, the data collection application may be suspended or terminated by the user of the mobile device, due to inactivity of the data collection application, when the mobile device is at rest, or the like. Activity detection engine 232 may operate in a background process to detect if a drive/trip is occurring. If a trip is occurring, activity detection engine 232 may cause the data collection application to be initiated and begin collection of sensor data associated with the drive.

In some instances, activity detection engine 232 may generate a geo-fence around mobile device 104, which, when crossed, will cause activity detection engine 232 to execute the data collection application or return the data collection application to an active state from a suspended state. If mobile device 104 crosses the geo-fence, then activity detection engine 232 may cause the data collection application to be initiated. For instance, the geo-fence may surround a user's vehicle or residence such that when the geo-fence is crossed, it is likely due to the user initiating a drive or a trip. The geo-fence may be generated after a period of inactivity such as when the mobile device has been at rest for a predetermined time interval. The geo-fence may be generated a predetermined distance from the mobile such that when the mobile crosses the geo-fence it is likely due to the beginning of a drive rather than through other activity such as walking. Activity detection engine 232 may use other mechanisms to determine whether activate the data collection application including, but not limited to, detecting a visit (e.g., that the mobile device is at a particular location), a notification, a time interval, one or more sensor measurements exceeding threshold, or the like.

Since the data collection application of the mobile device 104 cannot collect GPS data and or certain sensor measurements until it is executed (or returned to an actively executing state), some GPS data and sensor measurements may be missed. For example, the data collection application may miss those GPS data and sensor measurements associated with the portion of the trip that occurred prior to crossing the geo-fence. As a result, the data collection application may not collect GPS data and sensor measurements for the entire trip, thereby missing valuable information about the trip, driver behavior, potential vehicle collisions, etc. In some instances, the mobile device 104 may not detect that a geo-fence has been crossed at all, thereby never activating the data collection application during the trip. In those instances, the mobile device 104 may miss a particular route of trip such that the data collection application does not collect certain sensor measurements or GPS data associated with the missed route. The data collection application may obtain some sensor measurements collected over the missed route from other processes executing on mobile device 104.

For instance, an operating system of mobile device 104 may collect and cache some sensor measurements, such as accelerometer measurements, over a sliding window such as an immediately preceding time interval of a predetermined length. The sliding window may include the preceding, twenty-four hours, forty-eight hours, seventy-two hours, ninety-six hours, or any predetermined time interval. Applications of mobile device 104 may request and obtain sensor measurements for up to the length of the sliding window from the operating system.

The operating system may begin collecting and caching sensor measurements upon request by an application such as the data collection application and retained the cached sensor measurements for up to the length of the sliding window. At that point, the operating system discards the oldest sensor measurement each time a new sensor measurement is added. For instance, the operating system may cache up to the previous 72 hours of sensor measurements (e.g., 72 hours from a current time such as now), at which point, the oldest sensor measurements (e.g., anything older than 72 hours) may be discarded such that the cache retains those sensor measurement collected over immediately previous 72 hours. In some instances, the operating system may only allow an application to request collection and caching of sensor measurements for a particular time interval (e.g., that may be smaller than or equal to the length of the sliding window). The data collection application may not be able to request the operating system to cache sensor measurements over the entire sliding window if the particular time interval is less than the sliding window. Instead, the data collection application may generate a series of requests with each subsequent request being sent upon termination of the particular interval of the previous request. This enables the data collection application to request caching of sensor measurements by the operating system for the entire sliding window.

In the following example, the sliding window may be 72 hours in length and the predetermined time interval may be 12 hours. When the data collection application executes (or returns from suspension), the data collection application may generate a first request that the operating system collect and cache sensor measurements for the next 12 hours. In response, the operating system will begin collecting and caching sensor measurements. The data collection application may then perform any intended operations that were the reason for its execution (or return from suspension) or terminate (or return to a suspended state). At the termination of the 12-hour time interval, the data collection application may execute (or return from suspension) and generate a second request to the operating system for collection and caching of sensor data for another 12 hours. In some instances, the data collection application may be executed before the termination of the 12-hour time interval. In that instance, the application may generate the second request to the operating system for collection and caching of sensor data for a 12-hour time interval that begins at the time of the second request (rather than at the termination of the previous 12-hour time interval). The data collection application may also access the sensor measurements from the previous 12-hours (from the first request). This process may be repeated every 12 hours such that the operating system caches up to 72 hours of sensor measurements.

The data collection application may access the cached sensor measurements over the entire 72 hours (e.g., based on each 12-hour request combined) even though the data collection application may be limited to sending requests for data collection and caching over smaller time intervals (e.g., in this case 12 hours). If the data collection application sends a first request (at the zero-hour mark) for 12 hours of sensor measurements, when the data collection application executes (or returns from suspension) 12 hours later, the operating system will have collected and cached 12 hours of sensor measurements that the data collection application may access. When the data collection application sends a second request to the operating system (at the 12-hour mark) for another 12 hours of sensor measurement caching, the operating system continues to collect and cache sensor measurements for the next 12 hours. When the data collection application executes this, 12 hours later (e.g., now at the 24-hour mark) the data collection application may now access 24 hours of sensor data even though the data collection application may only request that the operating system collect and cache sensor measurements for the next 12 hours.

The data collection application may continue to make requests for collection and caching of sensor measurements even when the cache includes sensor measurements over the 72-hour time interval (e.g., the complete sliding window). Since the cache may only store sensor measurements over the sliding window (e.g., the preceding 72 hours), the oldest sensor measurements (e.g., sensor measurements older than 72 hours) may be discarded as new sensor measurements are stored in the cache. Sensor measurements may be continually discarded as new sensor measurements are continually cached over the next requested time interval (e.g., 12 hours). With back-to-back requests by the data collection application, the data collection application may cause the operating system to perpetually cache the preceding 72 hours of sensor measurements.

Missing route determination engine 234 can determine a history of locations, one or more historical routes undertaken by mobile device 104, and those of the vehicle that carries the mobile device based on the cached motion sensor measurements, such as accelerometer measurements. Missing route determination engine 234 can determine the history of locations and one or more historical routes for a durations during a trip when, for various reasons, the data collection application of the mobile device 104 cannot collect GPS data (e.g., since the application is not yet executed, the mobile device does not cross a geo-fence, poor GPS reception, etc.), or otherwise do not collect good quality GPS data that enables location and route determination based on the GPS data.

As to be described below, missing route determination engine 234 can determine a missing route start time based on, for example, a combination of outputs of activity detection engine 232 and motion sensor data. The start time of the missing route can also be the start time of a trip. Missing route determination engine 234 can also determine a missing route end time, which corresponds to the time when the data collection application starts collecting (or using) GPS data and or other sensor data to determine and track locations of the mobile device. Missing route determination engine 234 can fetch a subset of the cached motion sensor measurements, determine a sequence of turns and travelled path segments before and after the turns based on the motion sensor measurements, and construct an estimated route based on the sequence. Missing route determination engine 234 can also compare the estimated route with a set of candidate routes generated from map data. The set of candidate routes can represent a set of shortest alternative routes between the start point of the missing route and an end point of the missing route. Based on the comparison result between the estimated route and the set of candidate routes, missing route determination engine 234 can determine the missing route. In some examples, missing route determination engine 234 can provide the missing route together to the data collection application, which can combine the missing route with the routes determined based on GPS speed data, and display the combined routes as the complete trip in a map on mobile device 104. Missing route determination engine 234 can also provide the missing route information to other components of electronic device 204 and/or mobile device 104 to determine various events (such as distracted driving events and vehicle crash events,) in the missing route and generate outputs based on those events. Although some embodiments are described in relation to the analysis of one or more turns made during a trip, it will be appreciated the motion data associated with one or more turns may be supplemented by motion data associated with one or more stops made during the trip. Thus, the discussion provided herein related to turns may be applied to one or more stops. Additionally, in some embodiments, the motion data associated with one or more turns made during the trip is replaced with motion data associated with one or more stops made during the trip. Thus, the discussion related to turns is applicable to stops. One of ordinary skill in the art would recognize many variations, modifications, and alternatives.

Applications of mobile device 104 including at least some of components 208-234 may request data collection by the operating system while other applications of the mobile device (such as the data collection application) are suspended or not executing. The operating system may collect sensor measurements over a predetermined time interval. For instance, an application may request sensor measurements from the operating system for up to 12 hours after the application is suspended or terminated. When the application is executed again, the application may request access to the sensor measurements collected by the operating system while the application was suspended or terminated, as well as the missing route information generated by missing route determination engine 234 for the route(s) that were undertaken during the time when the application was suspended or terminated. In some examples, the application may also include missing route determination engine 234 to determine the missing route based on the sensor measurements collected by the operating system.

As previously described, activity detection engine 232 may obtain the sensor measurements that were collected by the operating system (or another application) of the mobile device and generate a probability of an activity associated with the mobile device. Alternatively, this may be performed by the operating system itself. For instance, the operating system may output a probability that mobile device 104 is stationary, walking, running, driving, flying, or the like. Activity detection engine 232 may use the activity data from the operating system to determine a time interval during which a drive was likely to have occurred while the data collection application was suspended or terminated (e.g., not executing). Activity detection engine 232 may then request the sensor data collected by the operating system over the time interval. The sensor data collected by the operating system may be added to any sensor data collected by the data collection application.

For example, activity detection engine 232 may detect that mobile device 104 crossed a geo-fence and initiate execution of a data collection application to begin collection of sensor measurements such as IMU sensors. The data collection application then requests sensor data from the operating system for a time interval prior to when the mobile device crossed the geo-fence. This enables the mobile device 104 to capture sensor measurements over the entire duration of the drive despite the application executing and beginning collecting of sensor measurements a few minutes into the drive.

In another example, when the data collection application is executed, the data collection application requests sensor data from the operating system of mobile device 104 over a time interval prior to execution of the data collection application. The data collection application identifies data of a first-time interval during which the operating system determines with a high probability that a drive occurred from the activity. The data collection application then requests the sensor data collected by the operating of the mobile device 104 over the first-time interval. In some instances, there may be a delay between when the drive begins and the operating system detects that a drive activity is occurring. Similarly, there may be delay between when the drive ends and the operating system detects that the drive ended. To ensure that sensor data for the entire trip is collected, the data collection application may request the sensor data over a second (larger) time interval that begins prior to the first-time interval (e.g., one minute, five minutes, ten minutes, or the like before the first time interval begins) and ends after the first-time interval (e.g., one minute, five minutes, ten minutes, or the like after the first-time interval ends).

Example Application for Missing Route Determination

Figure 3A:
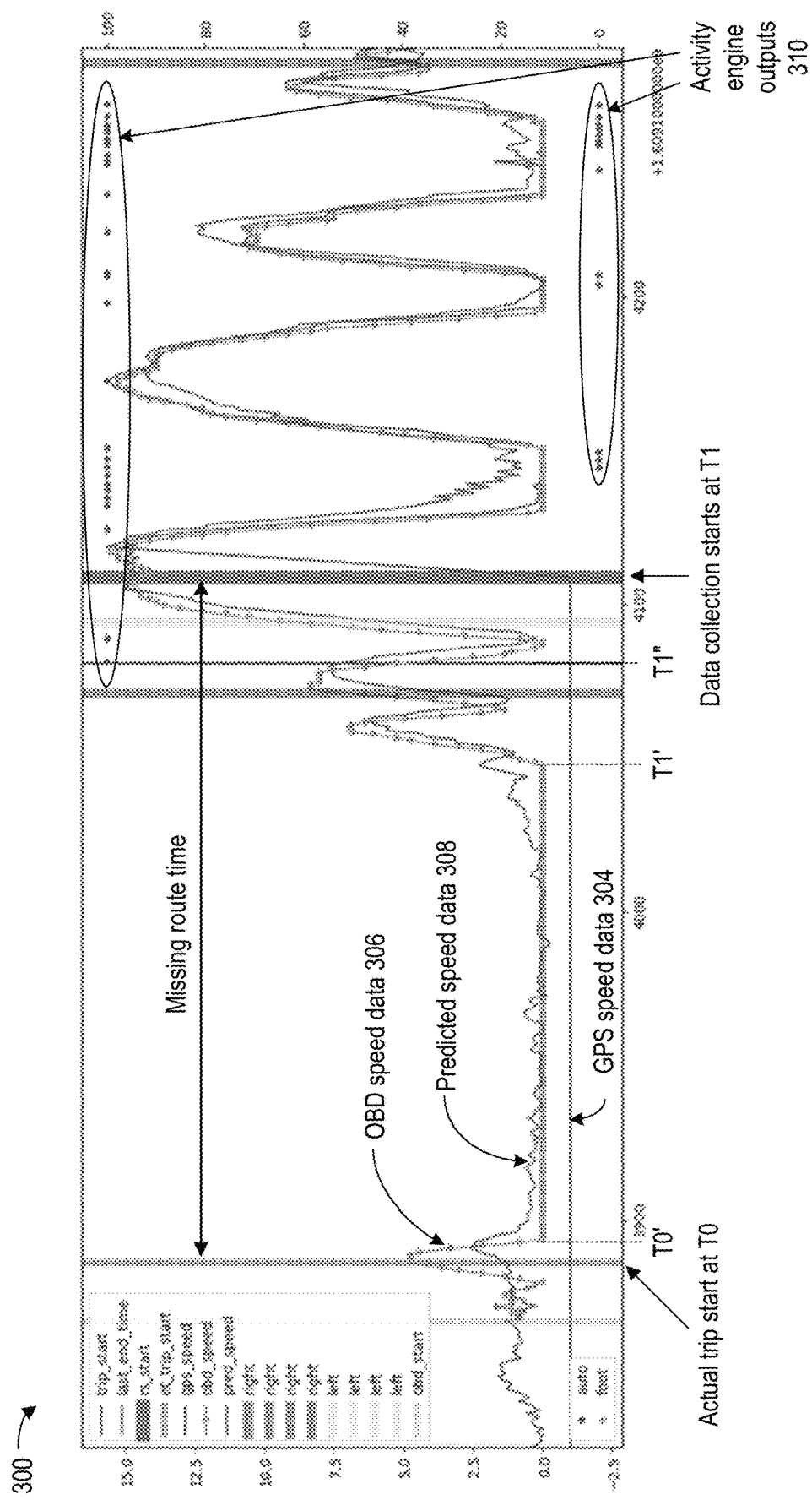
FIG. 3A and FIG. 3B illustrate an example application for a missing route determination engine of FIG. 2 according to some aspects of the present disclosure.
Figure 3B:
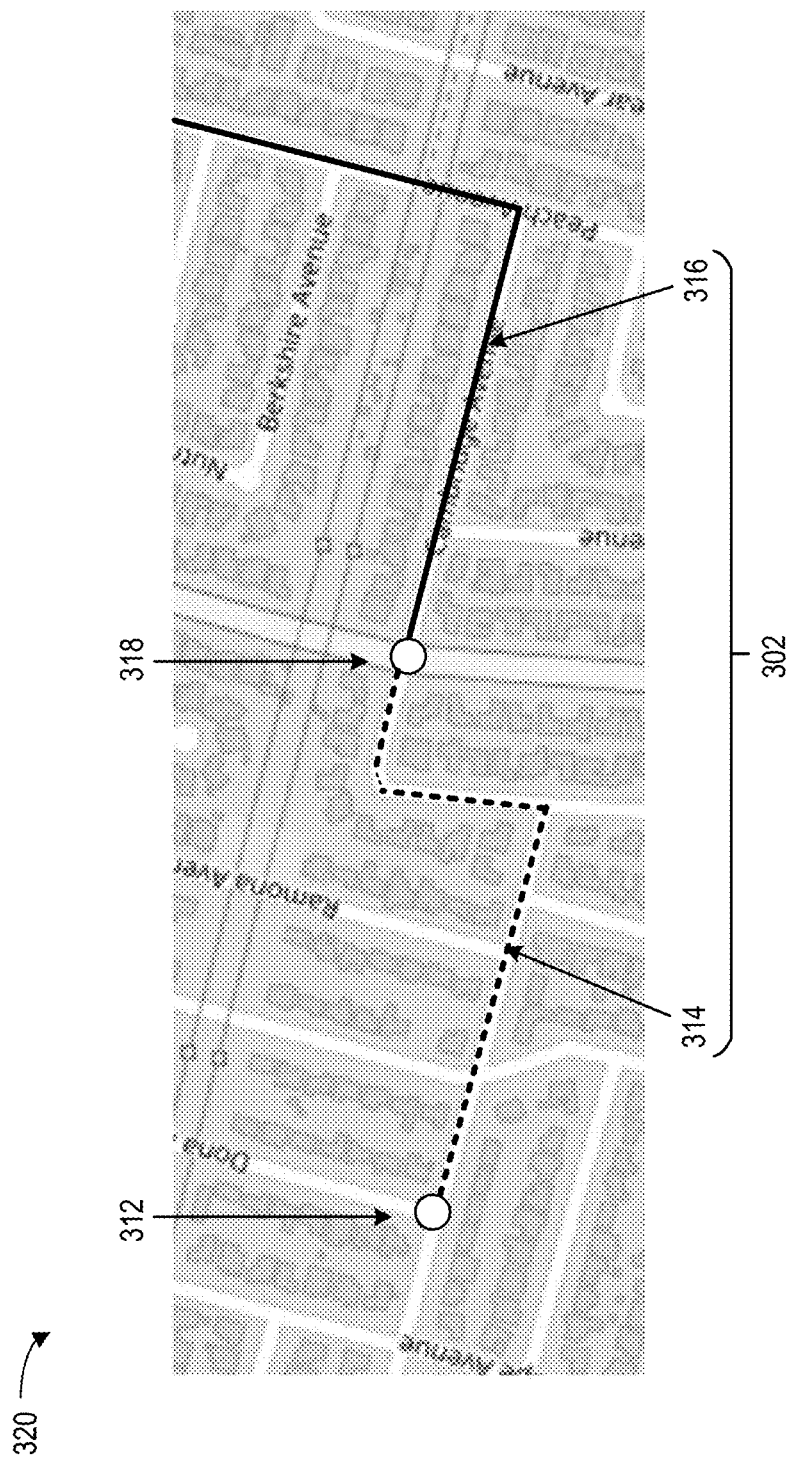

FIG. 3A and FIG. 3B illustrate an example application for missing route determination engine 234 to determine a missing route of a trip. In FIG. 3A, chart 300 illustrates time-series graphs of various motion data and event data from different sources during trip 302 undertaken by a user of a mobile device, such as a graph of GPS speed data 304, a graph of speed data 306 from on-board diagnostics (OBD), and a graph for predicted speed data 308, all with respect to time. Speed prediction can be based on accelerometer data, as well as other types of sensor data, as to be described below in FIG. 25-FIG. 31. Chart 300 further includes outputs 310 of activity detection engine 232. In chart 300, each dot of outputs 310 can represent the detection of a driving activity. FIG. 3B shows a map 320 of trip 302 of the vehicle that corresponds to the time-series motion data and event data of chart 300. In FIG. 3B, the trip starts at a location 312 and at time T0, and comprises a route 314 and a route 316. In FIG. 3B, route 314 can be a missing route of the trip where the GPS speed data is unavailable, or where the data collection application is in a suspended state. On the other hand, route 316 can be tracked and displayed by data collection application.

Referring back to FIG. 3A, the trip of the user starts at time T0, but the data collection application may start collecting GPS speed data 304 and generating location information starting at time T1, therefore GPS speed data 304 is flat before time T1. The GPS speed data allows route 316 of the user to be determined starting at time T1 and from location 318, but the trip actually starts at an earlier time T0. The data collection application may delay till time T1 to collect GPS data for various reasons. For example, activity detection engine 232 may be unable to detect a driving activity between times T0 and T1. The data collection application may be in a suspended state and wakes up at time T1 due to, for example, detection of a geo-fence, detection of a driving activity by activity detection engine 232, etc. As another example, the data collection application may be unable to collect GPS data due to poor GPS signal reception. If the locations of the mobile device (and the vehicle that carries the mobile device) are determined based solely on the GPS data, the location information may be missing for the duration between times T0 and T1. All these can lead to route 314 becoming a missing route in trip 302 reconstructed by the data collection application.

On the other hand, while the data collection application may be in a suspended state between times T0 and T1, the sensors may collect or generate speed data during that time, such as OBD speed data 306 and predicted speed data 308. Those data can be cached in a memory. Specifically, there can be fluctuations in OBD speed data 306 around time T0 due to, for example, the user being in another vehicle towards the end of a previous trip. OBD speed data 308 is flat and close to zero between times T0' and T1'. OBD speed data 306 fluctuates again starting at time T1' due to, for example, the user starting traveling in another vehicle at time T1'. On the other hand, fluctuating predicted speed data 308 can be captured between times T0 and T1. As to be described below, missing route determination engine 234 can determine, based on the cached measurement data, such as OBD speed data 306 and predicted speed data 308, the trip starts at time T0, select a subset of the cached measurement data collected between times T0 and T1, and determine missing route 314 based on the subset of the cached measurement data. Missing route determination engine 234 can then provide missing route 314 to the data collection application, which can then combine missing route 314 with route 316 to reconstruct trip 302.

Example Components for Missing Route Determination Engine

Figure 4:
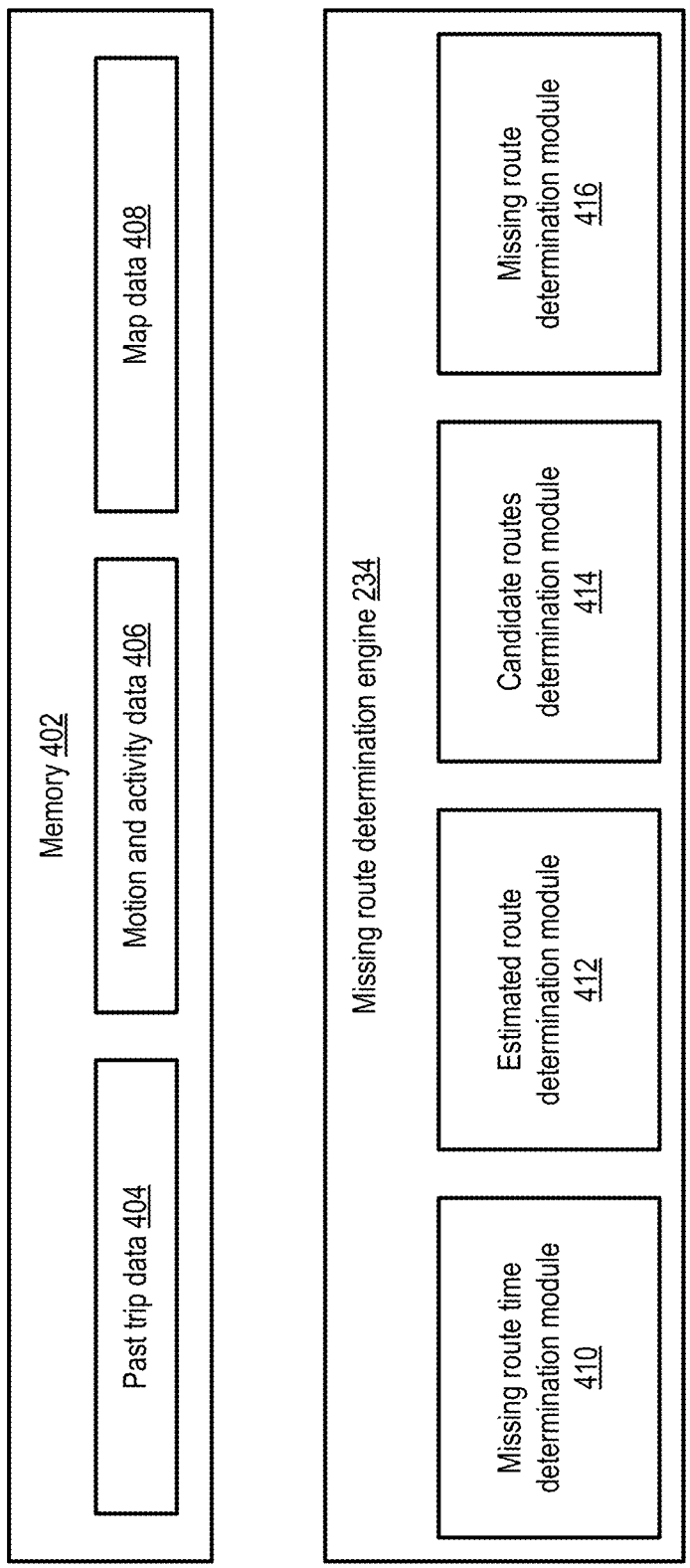
FIG. 4 illustrates an example of internal components of a missing route determination engine, according to some aspects of the present disclosure.

FIG. 4 illustrates examples of internal components of missing route determination engine 234. As shown in FIG. 4, missing route determination engine 234 can have access to a memory 402 that stores various data, including past trip data 404, motion and activity data 406, and map data 408. Missing route determination engine 234 can determine a missing route based the data stored in memory 402. Past trip data 404 can include a history of trips/routes undertaken by a vehicle/user, including trips undertaken by the user immediately before the current trip. Motion and activity data 406 can include cached sensor data, such as accelerometer data, speed data (e.g., OBD speed data 306), predicted speed data based on the cached sensor measurements (e.g., predicted speed data 308), etc., as well as the timestamps of the sensor data. Motion and activity data 406 can also include driving activities (e.g., driving activities shown in outputs 310 of activity engine) and their timestamps. Map data 408 can include map data of a locale in which the missing route is to be determined. The map data can include, for example, locations of thoroughfares (e.g., streets, highways, etc.), locations of road corners/turns, etc., that can be travelled by the vehicle/user during the trip.

Missing route determination engine 234 further includes a missing route time determination module 410, an estimated route determination module 412, a candidate routes determination module 414, and a missing route determination module 416. Missing route time determination module 410 can determine a start time of the trip, which can also be the start time of the missing route (e.g., time T0 in FIG. 3A). Missing route time determination module 410 can also determine an end time of the missing route, which can be the time when, for example, the data collection application wakes up and starts receiving GPS data or when location information from GPS data starts becoming available, etc., such as time T1 in FIG. 3A. Estimated route determination module 412 can then fetch a subset of motion and activity data 406 having timestamps between the start time and the end time of the missing route and construct an estimated route based on the subset of motion and activity data 406.

Figure 5:
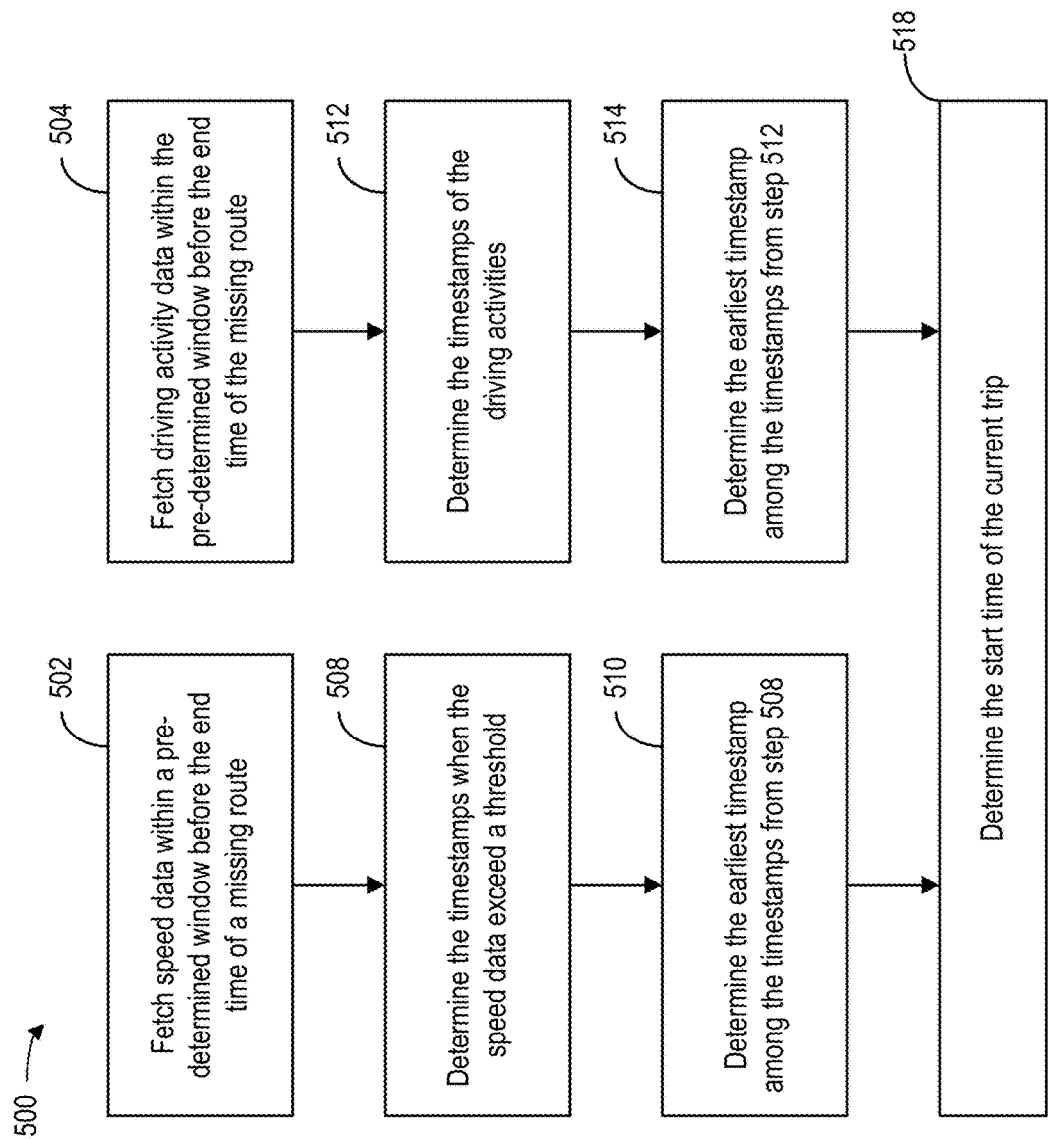
FIG. 5 illustrates an example method for determining the start time of a trip, according to some aspects of the present disclosure.

FIG. 5 illustrates an example flowchart of a method 500 performed by missing route time determination module 410 to determine the start time of a trip based on motion and activity data 406. Method 500 can start with steps 502 and 504. In step 502, missing route time determination module 410 can fetch speed data (e.g., OBD speed data 306, predicted speed data 308, etc.) within a pre-determined window before the end time of the missing route. The start of the pre-determined window can be based on, for example, detection of an event, such as a visit to a particular location, end of a previous trip, the start of the OBD, etc. A visit can be detected based on, for example, the location of the visit, an amount of time spent at the location, etc. The end of a trip can detected based on, for example, detecting a transition in the mode of transportation (e.g., from travelling in vehicle to walking, opening a car door, etc.). On the other hand, the end time can be the time when the data collection application wakes up and starts receiving GPS data, when location information from GPS data starts becoming available, etc. Referring to FIG. 3A, the pre-determined window can start at time T0.

Following step 502, missing route time determination module 410 can process the fetched speed data to identify timestamps when the speed exceeds a threshold, in step 504. The speed exceeding the threshold can indicate, for example, the user is driving in a vehicle. In step 510, missing route time determination module 410 can determine the earliest timestamp among the timestamps determined in step 508. The earliest timestamp can indicate, for example, when the user starts driving the vehicle. Referring back to FIG. 3A, from step 510, missing route time determination module 410 can determine the earliest timestamp when the speed data exceeds a threshold is at time T0.

In addition, in step 504, missing route time determination module 410 can fetch driving activity data within the pre-determined window before the end time of the missing route, followed by step 512, in which missing route time determination module 410 determines the timestamps of the driving activities, and step 514, in which missing route time determination module 410 determines the earliest timestamp among the timestamps of step 512. Referring to FIG. 3A, from step 514, missing route time determination module 410 can determine the earliest timestamp of the driving activities is at time T0.

Following steps 510 and 514, missing route time determination module 410 can determine the start time of the current trip based on the outputs of steps 510 and 514, in step 518. For example, missing route time determination module 410 can compare among the earliest timestamp of speed data that exceed the threshold, the earliest timestamp of driving activity, and the timestamps of the closet visit/end of trip, and determine the start time based on the earliest timestamp among these timestamps. Referring to FIG. 3A, missing route time determination module 410 can determine the earliest timestamps between timestamps T0 and T1 (time T0) and determine that the start time of the missing route is at time T0. In some examples, missing route time determination module 410 can also determine the start time based on a weighted average of the timestamps obtained from steps 510 and 514.

Based on the start time and the end time of missing route time determination module 410, estimated route determination module 412 can fetch a subset of motion data of motion and activity data 406 having timestamps between the start time and the end time of the missing route, and construct an estimated route based on the subset of motion data. The motion data can include accelerometer data, speed data, etc. From the motion data, estimated route determination module 412 can detect turns and their directions, as well as path segments between turns, and construct a representation (e.g., a graph) of a sequence of the turns and path segments.

Figure 6A:
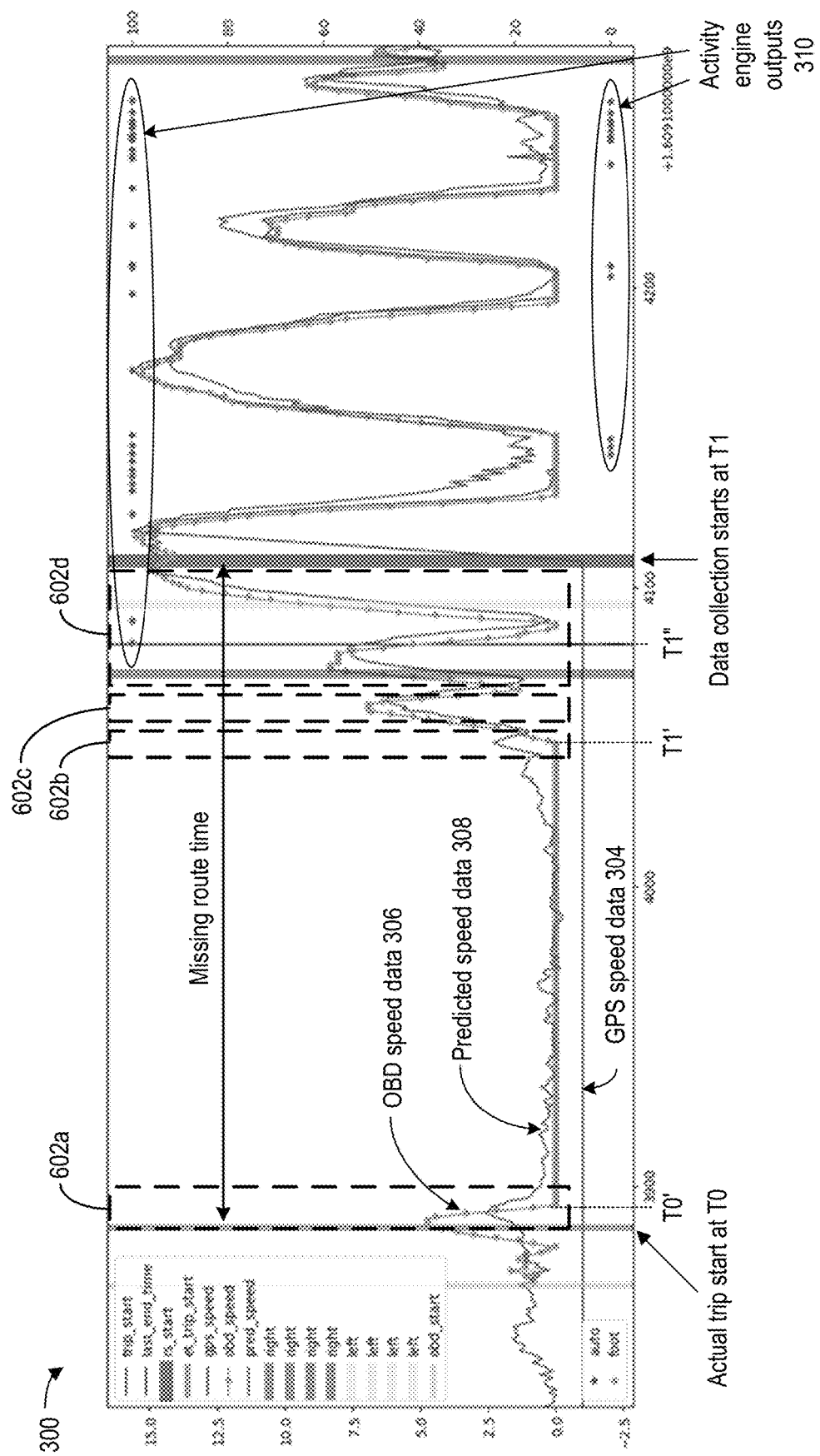
FIG. 6A, FIG. 6B, FIG. 6C, and FIG. 6D illustrate example operations of missing route determination engine of FIG. 4, according to some aspects of the present disclosure.

FIG. 6A, FIG. 6B, FIG. 6C, and FIG. 6D illustrate example operations of missing route determination engine 234. Referring to chart 300 of FIG. 3A (reproduced in FIG. 6A), estimated route determination module 412 can identify, based on the speed data between the start time (T0) and end time (T1) of the missing route, one or more segments that are likely to be data representing the user/vehicle in motion. The candidate segments can be identified based on, for example, the speed data (e.g., OBD speed data 306, predicted speed data 308, etc.) exceeding a threshold, activity engine outputs 310 indicating the user is driving a vehicle, etc. In FIG. 6A, estimated route determination module 412 can determine segments 602a, 602b, 602c, and 602d of speed data as likely to be data representing the user/vehicle in motion. In some examples, estimated route determination module 412 can merge multiple candidate segments into a single candidate segment based on, for example, the end time of one candidate segment and the start time of the next candidate segment being separated by a short time interval (e.g., 200 seconds). In a case where a missing driving route is to be determined, segments that are separated by a period of walking will not be merged.

Estimated route determination module 412 can then determine, for each candidate segment, turns and path segments between the turns. Referring to chart 610 on the left of FIG. 6B, motion and activity data 406 can include accelerometer data along multiple axes, such as along an x-axis ($a_x$), a y-axis ($a_y$), and along a z-axis ($a_z$). Estimated route determination module 412 can determine a course rate of the user/vehicle based on accelerometer data $a_x$, $a_y$, and $a_z$, and the L2 norm of each. In some examples, estimated route determination module 412 may use a neural network to process the accelerometer data and L2 norms to determine a course rate, using similar techniques as speed prediction as to be described below. Estimated route determination module 412 can determine the course rate with respect to time between the start time and the end time of the missing route. Referring to chart 612 on the right of FIG. 6B, estimated route determination module 412 can determine a rate of change of angle θ, which represents a rate of course change, with respect to time, and identify turns where the rate of change of angle θ exceeds a threshold. Comparing a rate of course change with a threshold can distinguish turns from lane changes. From chart 612, estimated route determination module 412 can identify a right turn at time T2 due to the rate of change of angle θ at time T2 having a value of +C whose magnitude exceeds a threshold and has a positive sign. Moreover, estimated route determination module 412 can identify a left turn at time T3 due to the rate of change of angle θ at time T3 having a value of −C whose magnitude also exceeds the threshold and has a negative sign.

Figure 6B:
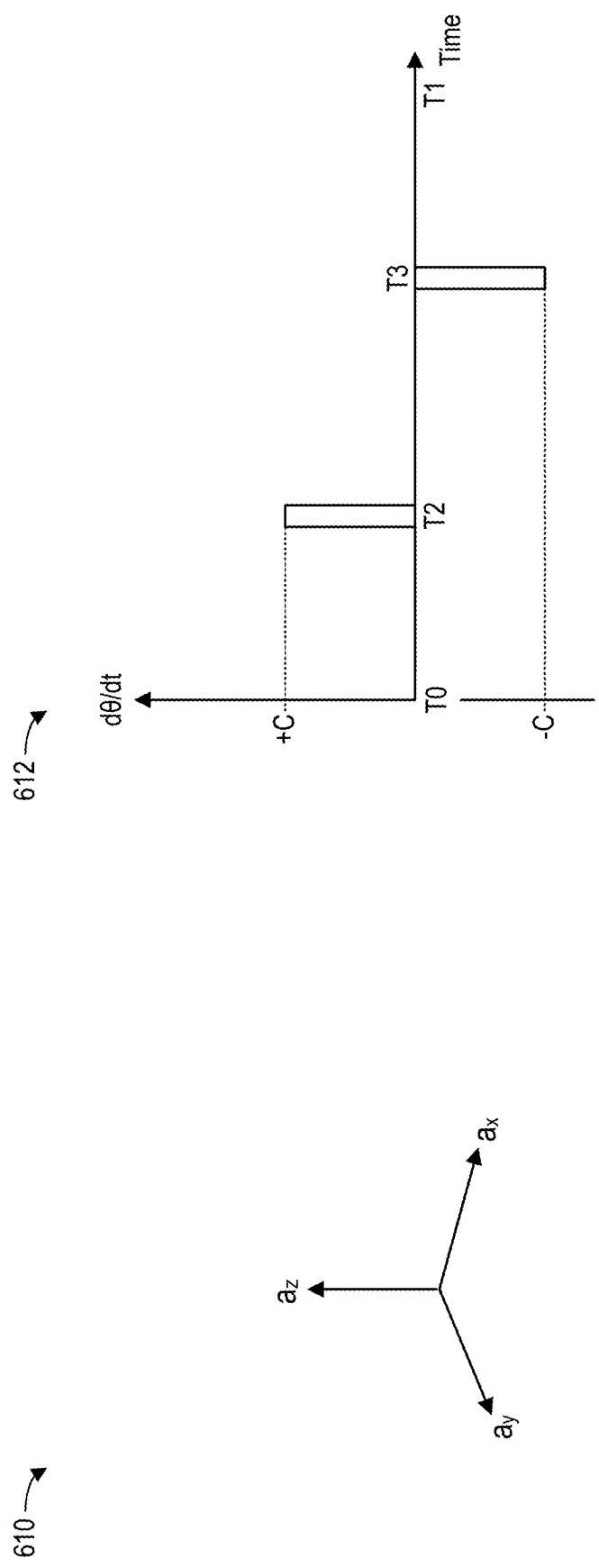
Figure 6C:
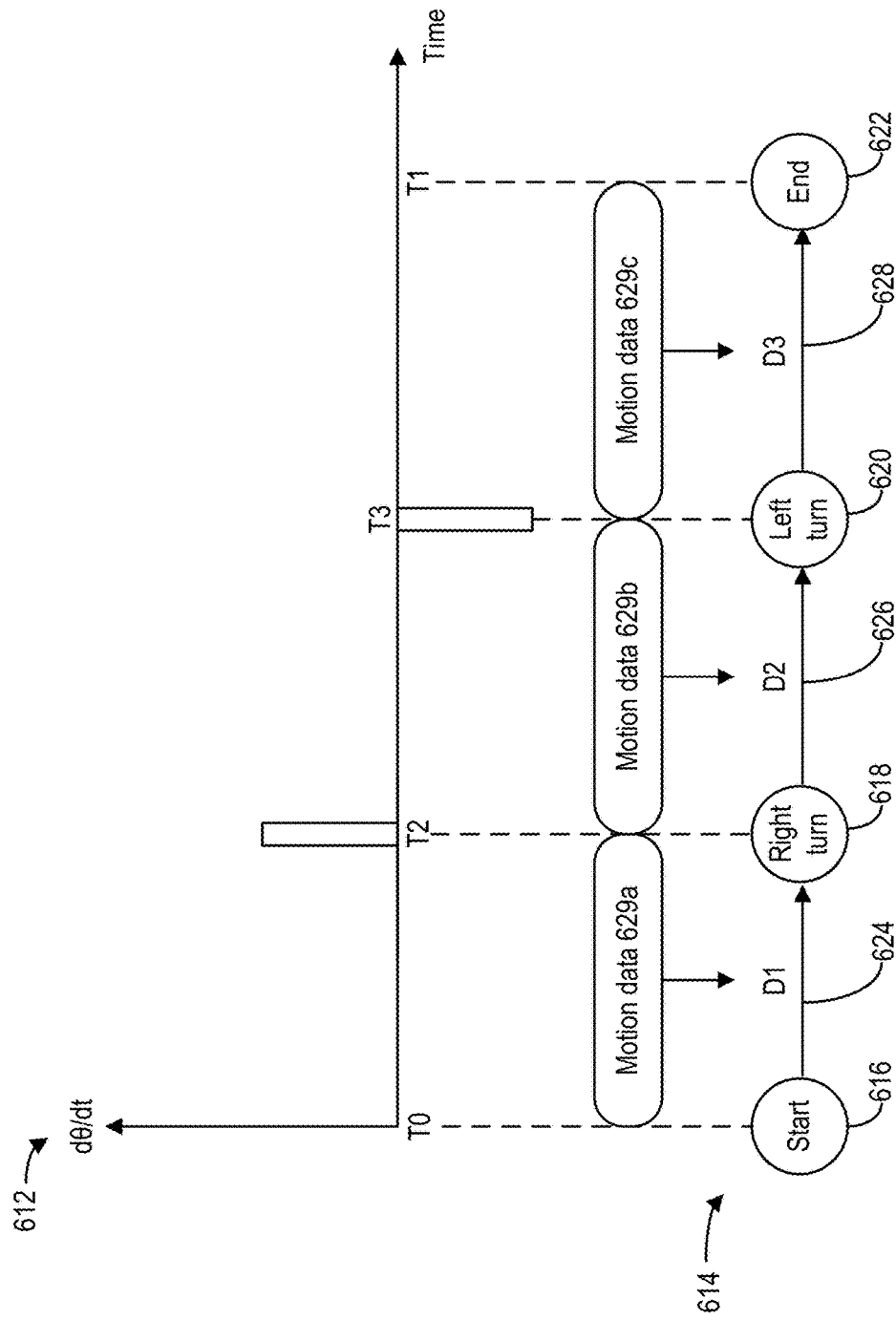

Referring to FIG. 6C, after identifying the turns and their timestamps in the candidate segments, estimated route determination module 412 can construct a representation, which can be in the form of a directed graph 614 of a sequence of the turns and paths for the estimated route. In the example of FIG. 6C, a candidate segment spans from time T0 to time T1. As shown in FIG. 6C, directed graph 604 can include a plurality of nodes, including nodes 616, 618, 620, and 622, as well as edges 624, 626, and 628. Node 616 can represent a start point of the missing route, node 622 can represent an end point of the missing route, whereas node 618 and 620 can represent turns identified from chart 612. In addition, edges 624, 626, and 628 represent path segments travelled by the user/vehicle between nodes. For each edge between two nodes, estimated route determination module 412 can determine a distance based on a set of motion data between two time points associated with the two nodes. Estimated route determination module 412 can determine a distance based on, for example, performing an integration operation on a set of speed data over time or a double integration operation on a set of accelerometer data over time. For example, for edge 624, estimated route determination module 412 can fetch motion data 629a between times T0 and T2 (associated with start node 616 and right turn node 618), and determine a distance D1 based on performing one or more integrations on motion data 629a. Also, for edge 626, estimated route determination module 412 can fetch motion data 629b between times T2 and T3 (associated with right turn node 618 and left turn node 620), and determine a distance D2 based on performing one or more integrations on motion data 629b. Further, for edge 628, estimated route determination module 412 can fetch motion data 629b between times T3 and T1 (associated with left turn node 620 and end node 622), and determine a distance D3 based on performing one or more integrations on motion data 629c.

Figure 6D:
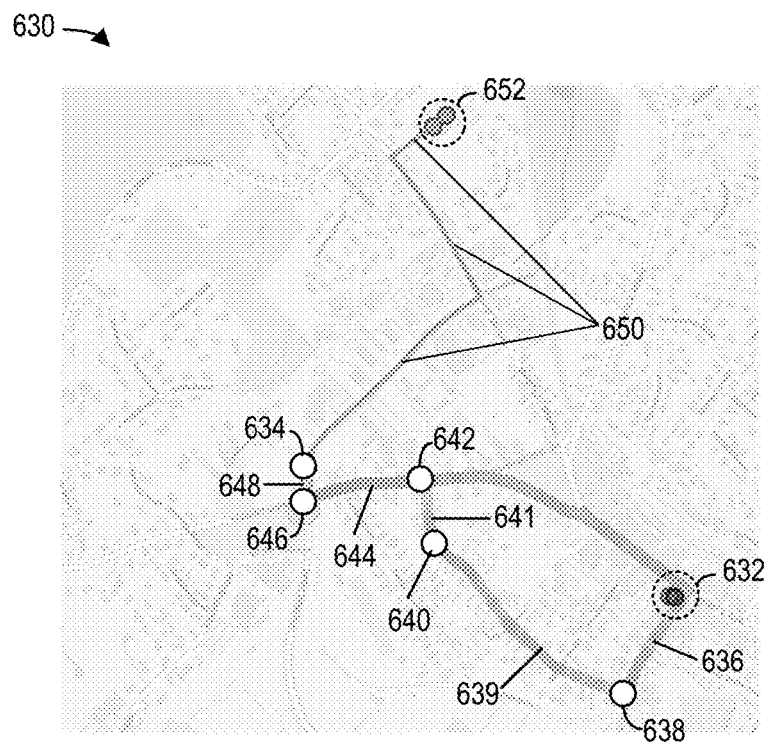
Figure 6D:
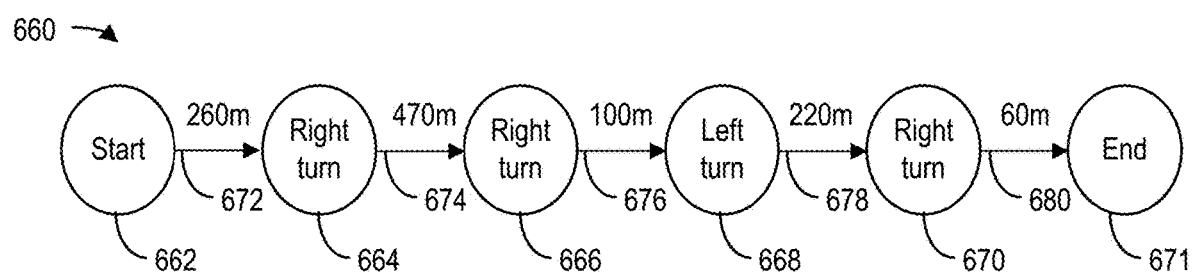

FIG. 6D illustrates a map of a missing route of a trip, as well as a linear graph corresponding to the missing route constructed by estimated route determination module 412. As shown in in map 630, a trip starts at a start point 632 and ends at an end point 634, determined by missing route time determination module 410. Between start point 632 and end point 634 there is a path segment 636, followed by a right turn 638, a path segment 639, a right turn 640, a path segment 641, a left turn 642, a path segment 644, a right turn 646, and a path segment 648. After end point 634, the data collection application can receive GPS speed data and determine routes 650 of the trip, which ends at end point 652.

FIG. 6D further illustrates a directed graph 660 that corresponds to the missing route in map 630. Directed graph 660 includes nodes 662, 664, 666, 668, 670, and 671, as well as edges 672, 674, 676, 678, and 680. Node 662 corresponds to start point 632, node 664 corresponds to right turn 638, node 666 corresponds to right turn 640, node 668 corresponds to left turn 642, node 670 corresponds to right turn 646, whereas node 670 corresponds to end point 634. Further, edge 672 corresponds to path segment 636, edge 674 corresponds to path segment 639, edge 676 corresponds to path segment 641, edge 678 corresponds to path segment 644, whereas edge 680 corresponds to path segment 648. Estimated route determination module 412 can determine the distances of the path segments represented by the edges based on integrating the speed data and/or accelerometer data between the times represented by the nodes. In the example of FIG. 6C, estimated route determination module 412 can determine a distance of 260 meters for path segment 636 (represented by edge 672), a distance of 470 meters for path segment 639 (represented by edge 674), a distance of 100 meters for path segment 641 (represented by edge 676), a distance of 220 meters for path segment 644 (represented by edge 678), and a distance of 60 meters for path segment 648 (represented by edge 680).

After estimated route determination module 412 constructs an estimated route, missing route determination engine 234 can compare the estimated route with a set of candidate routes generated from map data 408. The set of candidate routes can be generated by candidate routes determination module 414 based on the map data. The set of candidate routes can represent a set of shortest alternative routes between the start point of the missing route and an end point of the missing route. Candidate routes determination module 414 can determine the location of start point 632, the missing route, based on an indication of an end of a previous trip, a visit, etc., from past trip data 404. Moreover, candidate routes determination module 414 can also determine the location of end point 634 based on, for example, GPS data received by the data collection application. Based on the map data including locations of thoroughfares (e.g., streets and highways), locations of road corners/turns, etc., that can be travelled by the vehicle/user during the trip, candidate routes determination module 414 can determine a set of shortest alternative routes that can be traveled by the user/vehicle between the locations of start point 632 and end point 634.

Figure 7A:
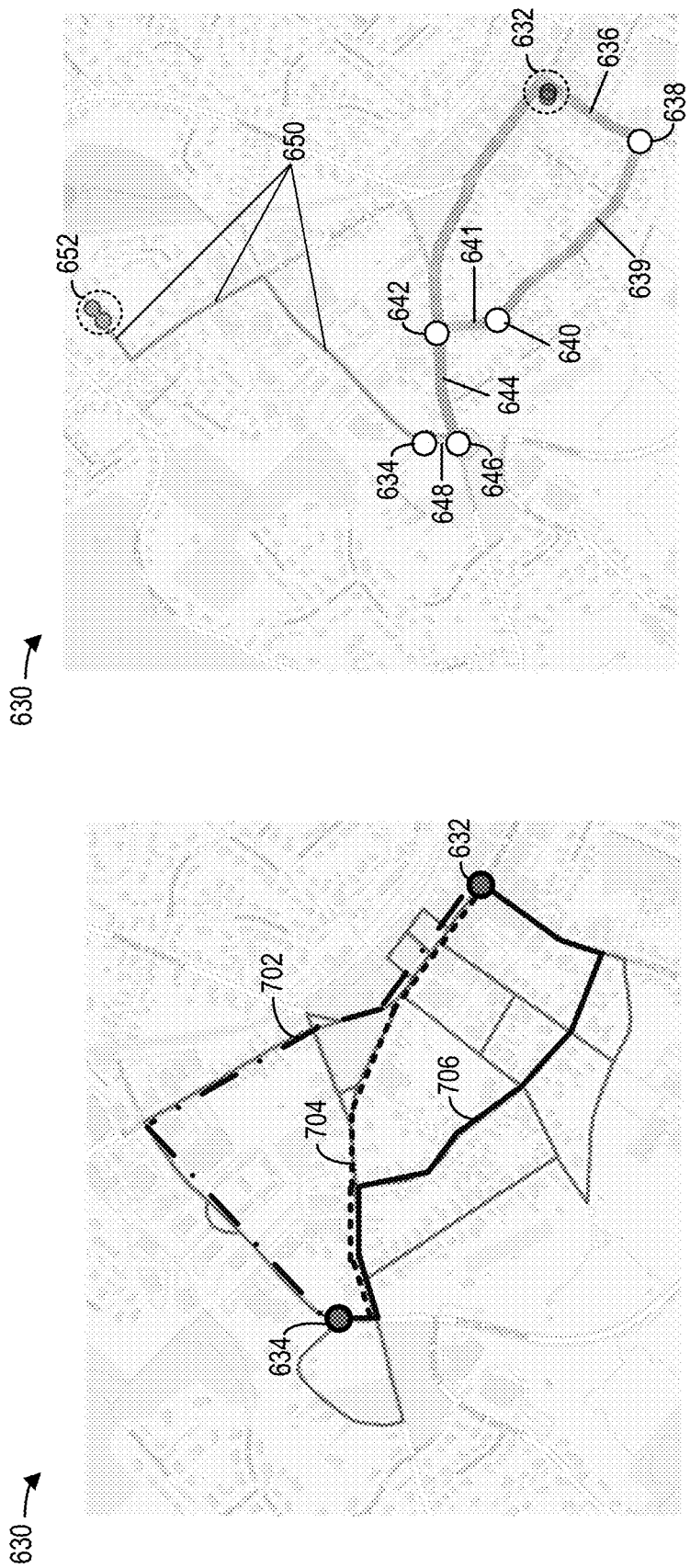
FIG. 7A, FIG. 7B, FIG. 7C, and FIG. 7D illustrate example operations of missing route determination engine of FIG. 4, according to some aspects of the present disclosure.
Figure 7B:
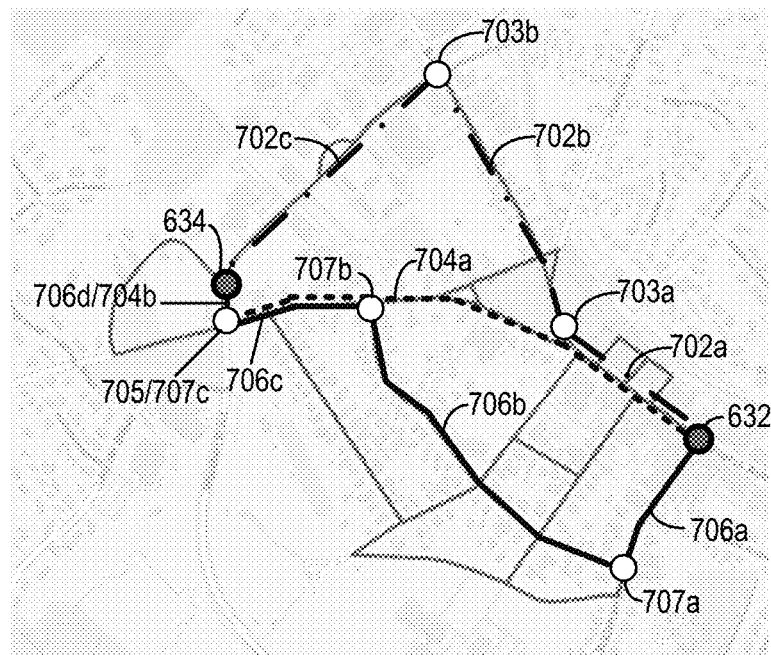
Figure 7B:
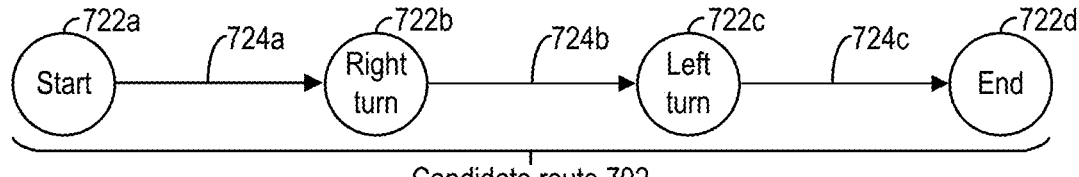
Figure 7B:
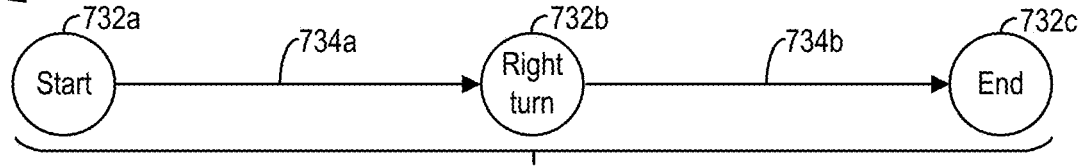
Figure 7B:
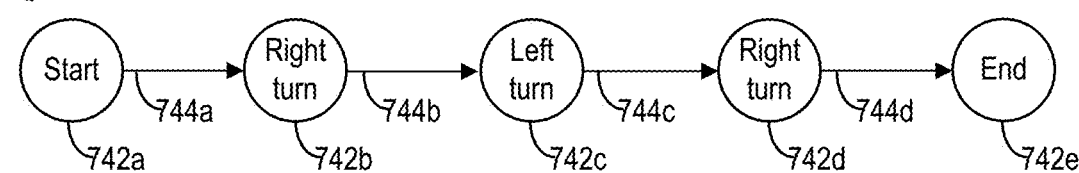

FIG. 7A and FIG. 7B illustrate examples candidate routes and their representations. As shown on the left of FIG. 7A, from map data of map 630, candidate routes determination module 414 can determine a set of candidate routes between start point 632 and end point 634, including candidate routes 702, 704, and 706 which are each represented by different types of dotted lines. One of them can be selected as the route that has the closest matching to the missing route comprising path segments 636, 639, 641, 644, and 648 on the right.

FIG. 7B illustrates directed graph representations of candidate routes 702, 704, and 706. Each directed graph including nodes representing start, end, and turns, as well as edges representing path segments and their distances. As shown in FIG. 7B, candidate route 702 includes a path segment 702a, a right turn 703a, a path segment 702b, a left turn 703b, and a path segment 702c. Candidate route 702 can be represented by a directed graph 720 including a start node 722a representing start point 632, an edge 724a representing path segment 702a, a node 722b representing right turn 703a, an edge 724b representing path segment 702b, a node 722c representing left turn 703b, an edge 724c representing path segment 702c, and a node 722d representing end point 634. In addition, candidate route 704 includes a path segment 704a, a left turn 705, and a path segment 704b. Candidate route 704 can be represented by a directed graph 730 including a start node 732a, an edge 734a representing path segment 704a, a node 732b representing right turn 705, an edge 734b representing path segment 704b, and a node 732c representing end node 732c.

Further, candidate route 706 includes a path segment 706a, a right turn 707a, a path segment 706b, a left turn 707b, a path segment 706c, a right turn 707c, and a path segment 706d. Candidate route 706 can be represented by a directed graph 740 including a start node 742a, an edge 744a representing path segment 706a, a node 742b representing right turn 707a, an edge 744b representing path segment 706b, a node 742c representing left turn 707b, an edge 744c representing path segment 706c, a node 742d representing right turn 707c, and an edge 744d representing path segment 706d.

Figure 7C:
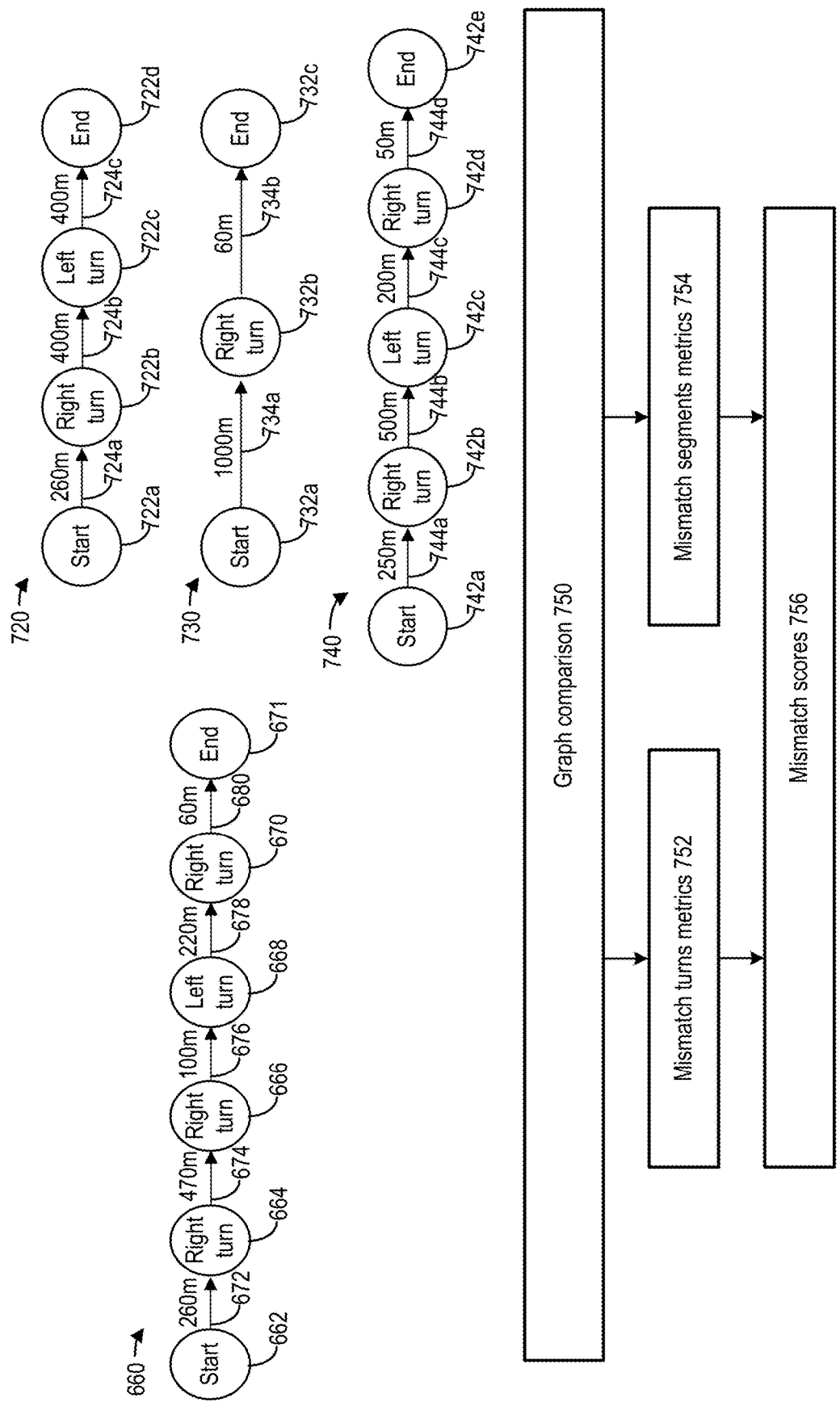
Figure 7D:
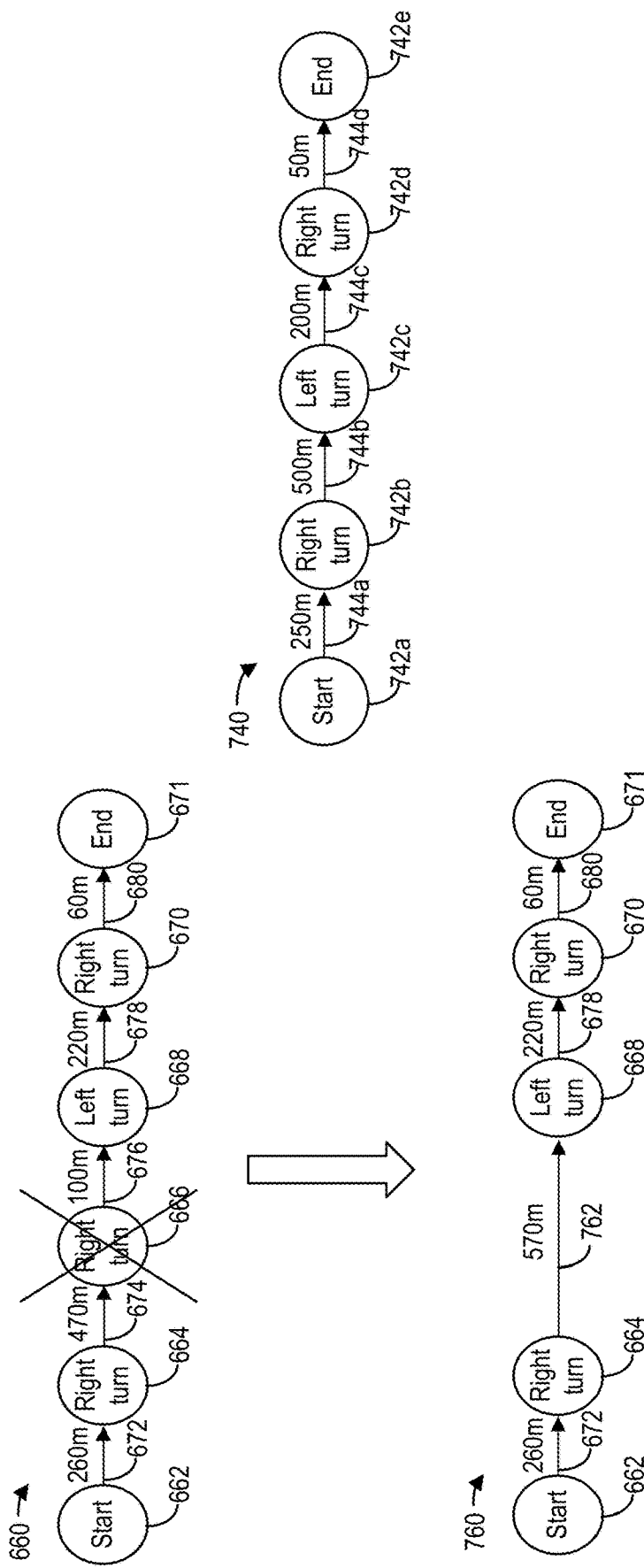

After directed graph 660 of the estimated route and the directed graphs 720, 730, and 740 of candidate routes are generated, missing route determination module 416 can select one of candidate routes as the missing route based on a comparison between directed graph 660 and each of the directed graphs 720, 730, and 740. FIG. 7C and FIG. 7D illustrate examples of operations to select one of the candidate routes as the missing route. Referring to FIG. 7C, missing route determination module 416 can perform a graph comparison operation 750 between directed graph 660 and each of the directed graphs 720, 730, and 740 to determine, for example, mismatch turns metrics 752 and mismatch segment metrics 754, and compute a mismatch score 756 for each of directed graphs 720, 730, and 740 based on the mismatch turns metrics 752 and mismatch segments metrics 754 for each graph.

Specifically, to determine mismatch turns metrics 752, missing route determination module 416 can compare between the sequence of turns represented in directed graph 660 with the sequence of turns in each of the directed graphs 720, 730, and 740 and identify mismatch turns. For example, in FIG. 7C, directed graph 660 has a sequence of right turn, right turn, left turn, and right turn. Using the sequence of turns of directed graph 660 as a reference, missing route determination module 416 can determine that directed graph 720 has two missing right turns, directed graph 730 has two missing right turns and a missing left turns, whereas directed graph 740 has a missing right turn. Missing route determination module 416 can then determine mismatch turns metrics 752 for each of the directed graphs 720, 730, and 740 based on the number of missing/extra turns. For example, mismatch turns metrics 752 for directed graph 730 may have a higher value than mismatch turns metrics 752 for directed graph 720, which in turn have a higher value than mismatch turns metrics 752 for directed graph 740 due to directed graph 730 having a highest number of mismatch turns, followed by graph 720, with directed graph 740 having the minimum number of mismatch turns.

In addition, to determine mismatch segments metrics 754, missing route determination module 416 can determine a difference between a segment distance in directed graph 660 and the corresponding segment distance in each of the directed graphs 720, 730, and 740 and compute a metric based on the differences in the distances between pairs of path segments in the directed graphs. The corresponding segments can be based on, for example, an order of traversal of the edges. For example, between directed graph 660 and directed graph 720, the corresponding path segments are represented by a pair of edge 672 of directed graph 660 and edge 724a of graph 720, a pair of edge 674 of directed graph 660 and edge 724b of graph 720, and a pair of edge 676 of directed graph 660 and edge 724c of graph 720, and there is no corresponding path segments for edges 678 and 680 of directed graph 660 in graph 720. For each pair of edges, missing route determination module 416 can compute a square of the distance difference, and then sum the square of distance differences, to compute a segments mismatch metric between directed graphs 660 and 720 as follows:

$$\text{Mismatch\_segments\_metric}_{660\text{-}720} = (260-260)^2 + (470-400)^2 + (100-400)^2 \quad \text{(Equation 1)}$$

Missing route determination module 416 can also compute segment mismatch metrics based on corresponding path segments between directed graphs 660 and 730 and between directed graphs 660 and 740, as follows:

$$\text{Mismatch\_segments\_metric}_{660\text{-}730} = (260-1000)^2 + (470-60)^2 \quad \text{(Equation 2)}$$

$$\text{Mismatch\_segments\_metric}_{660\text{-}740} = (260-250)^2 + (470-500)^2 + (100-200)^2 + (220-50)^2 \quad \text{(Equation 3)}$$

Missing route determination module 416 can then compute a mismatch score 756 for each of directed graphs 720, 730, and 740 based on a combination of mismatch turns metrics 752 and mismatch segments metrics 754 for each directed graph. The combination can be based on, for example, a weighted average between the two metrics. Missing route determination module 416 can then rank the directed graphs based on the mismatch scores and select the directed graph, as well as the candidate route, having the lowest mismatch score, which can indicate that the candidate route is the closest match to the estimated route represented by directed graph 660.

FIG. 7D illustrates another example of mismatch score computation. As shown in FIG. 7D, prior to computing mismatch segments metrics 754, missing route determination module 416 can remove one or more turns represented in directed graph 660 of the estimated route to match with the sequence of turns represented in the directed graphs of the candidate routes. Such arrangements can reduce the effect of wrong or missing turns in the estimated route on finding the matching candidate route. Referring to FIG. 7D, missing route determination module 416 can remove right turn node 666 to generate a revised directed graph 760. In revised directed graph 760, edges 674 and 676 separated by the right turn node 666 can be merged into a single edge 762 and associated with a total distance of path segments represented by edges 674 and 676 (570 meters).

In FIG. 7D, missing route determination module 416 can compute mismatch turns metrics 752 for directed graph 740 based on counting a number of turns removed from directed graph 660 to match directed graph 740 (one). Moreover, for mismatch segments metrics 754, missing route determination module 416 can determine a sum of difference between distances of corresponding path segments between directed graphs 760 and 740. The corresponding path segments can be represented by a pair of edge 672 of directed graph 760 and edge 744a of directed graph 740, a pair of edge 762 of directed graph 760 and edge 744b of directed graph 740, a pair of edge 678 of directed graph 760 and edge 744c of directed graph 740, and a pair of edge 680 of directed graph 760 and edge 744d of directed graph 740. Mismatch segments metrics 754 for directed graph 740 (based on comparing with directed graph 760) can be computed based on the following Equation:

$$\text{Mismatch\_segments\_metric}_{660\text{-}740}=(260\text{-}250)^2+(570\text{-}500)^2+(220\text{-}220)^2+(60\text{-}50)^2 \quad \text{(Equation 4)}$$

Compared with Equation 3 above, the updated mismatch segments metrics 754 in Equation 4 can be reduced substantially due to removal of the extra right turn, which can improve the correspondence in the path segments between directed graphs representing the estimated route and the matching candidate route. Such arrangements can increase the likelihood of selecting candidate route 706 (represented by directed graph 740), as the missing route between start point 632 and end point 634.

In FIG. 7C and FIG. 7D, some of the candidate routes can be filtered prior to being provided for selection. For example, candidate routes for which mismatch turns metrics 752 and/or mismatch segments metrics 754 exceed predetermined thresholds can be filtered out and not provided for selection. In addition, in some examples, the mismatch scores of some of the candidate routes can be adjusted down to favor their selection based on, for example, past trip data 404 indicating that user/vehicle has undertaken those candidate routes before.

Example Applications Supported by Missing Route Determination Engine

Figure 8A:
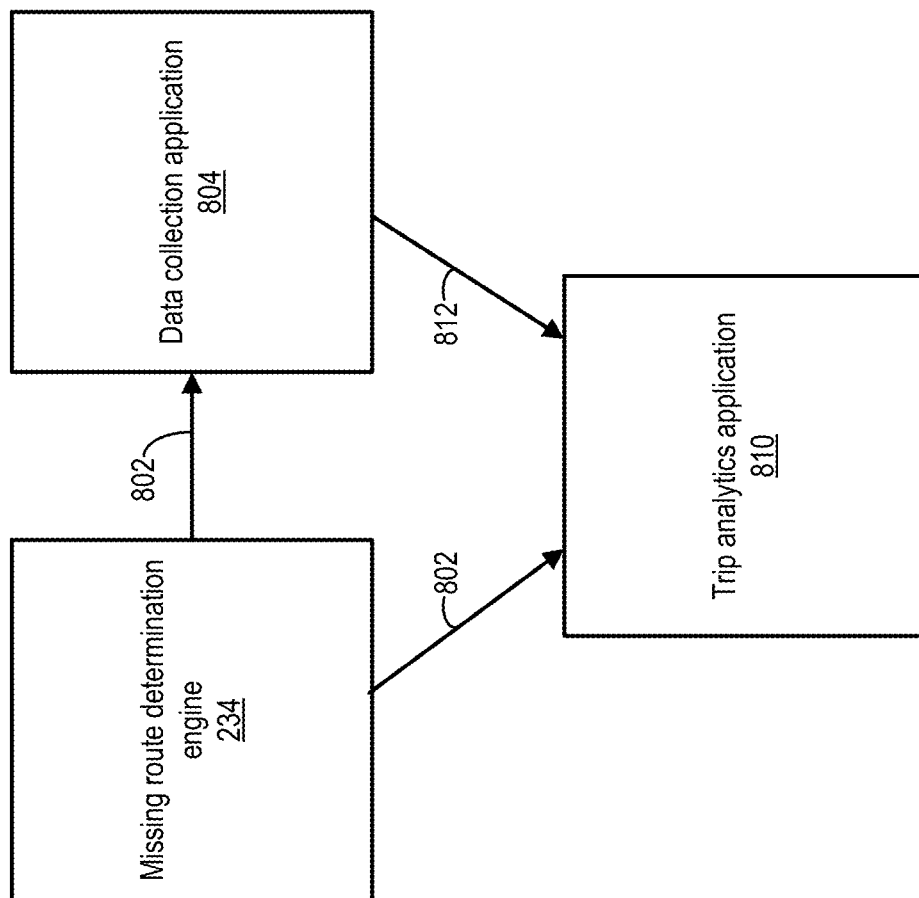
FIG. 8A and FIG. 8B illustrate example applications of missing route determination engine of FIG. 4, according to some aspects of the present disclosure.
Figure 8B:
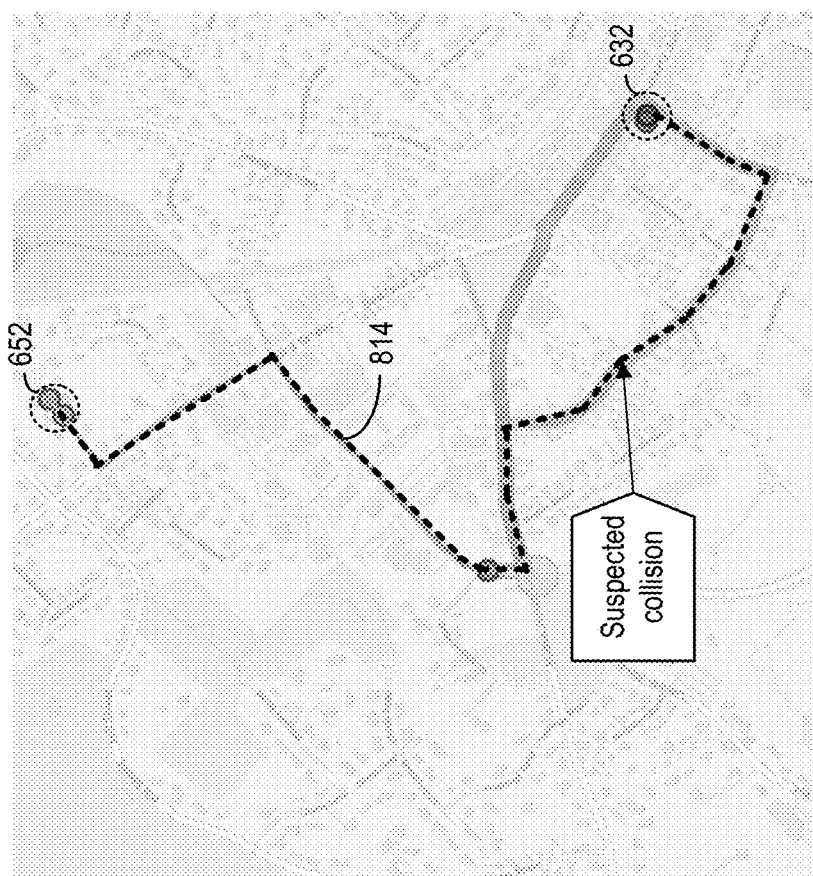

FIG. 8A and FIG. 8B illustrate examples of applications supported by missing route determination engine 234. As shown in FIG. 8A, missing route determination engine 234 can provide missing route information 802 to a data collection application 804, which can combine the missing route with the routes determined based on GPS speed data, and display the combined routes as the complete trip in a map on mobile device 104. Missing route determination engine 234 can also provide the missing route information to other components of electronic device 204 and/or mobile device 104, such as a trip analytics application 810. Trip analytics application 810 can determine various events, such as distracted driving events, vehicle crash events, etc., in from missing route information 802, as well as the rest of the routes 812, and generate outputs based on those events. For example, referring to FIG. 8B, trip analytics application 810 can detect that a vehicle crash event occurred at a part of trip 814 where the GPS speed data is not available based on the outputs of missing route determination engine 234.

Figure 9:
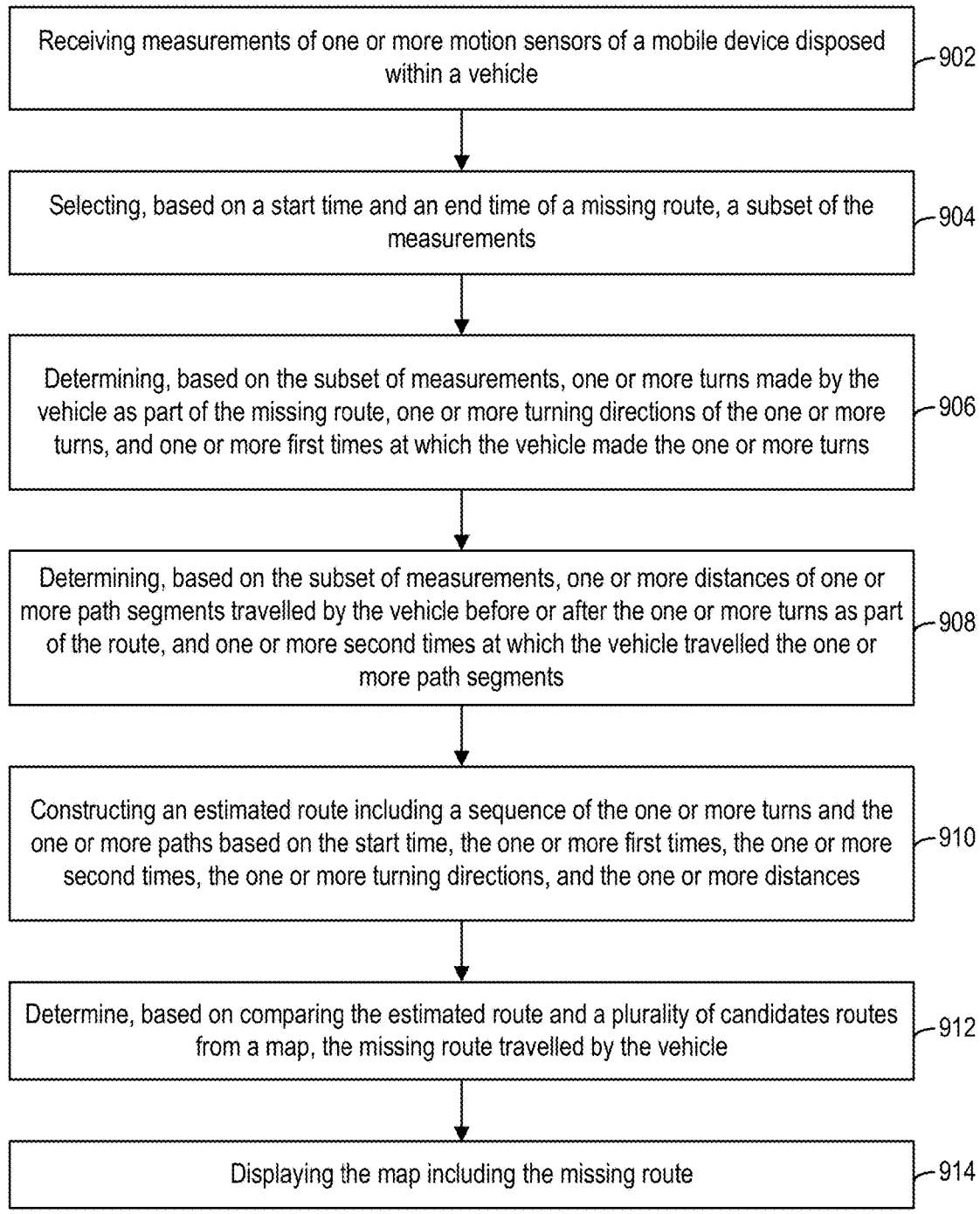
FIG. 9 illustrates an example of a method of route determination based on motion data, according to some aspects of the present disclosure.

FIG. 9 is a flowchart of illustrating an example of a method 900 for determining a missing route. Method 900 can be performed by, for example, missing route determination engine 234 of FIG. 4.

In block 902, missing route determination engine 234 may receive measurements of one or more motion sensors of a mobile device disposed with a vehicle (e.g., mobile device 104). The motion sensors may include, for example, accelerometers, speedometers, etc. The measurements can be cached in a memory and fetched by missing route determination engine 234. In some examples, missing route determination engine 234 can perform a speed prediction and determine the predicted speed of the user/vehicle with respect to time based on the accelerometer.

In block 904, missing route determination engine 234 may select, based on a start time and an end time of a missing route, a subset of the measurements. As described above, missing route determination engine 234 can determine the end time of the missing route based on when the data collection application wakes up and starts receiving GPS data, when location information from GPS data starts becoming available, etc. Moreover, missing route determination engine 234 can use the detection of a prior visit or the end of a prior trip as a starting time and search for when the speed data first exceeds a threshold, or when the activity engine first outputs a signal indicating that the mobile device is in a vehicle. The earliest timestamp of when the speed data first exceeds the threshold and when the activity engine first outputs a signal indicating that the mobile device is in a vehicle can be used as a start time of the missing route. In some examples, missing route determination engine 234 may further filter the measurements to identify speed data for candidate segments where the speed data exceeds a threshold, to select the subset of the measurements, as described in FIG. 6A.

In block 906, missing route determination engine 234 can determine, based on the subset of measurements, one or more turns made by the vehicle as part of the missing route, one or more turning directions of the one or more turns, and one or more first times at which the vehicle made the one or more turns.

Referring to FIG. 6A, missing route determination engine 234 can determine a course rate of the user/vehicle based on accelerometer data $a_x$, $a_y$, and $a_z$, and the L2 norm of each. In some examples, a neural network can be used to process the accelerometer data and L2 norms to determine a course rate, using similar techniques as speed prediction as to be described below. Missing route determination engine 234 can determine the course rate with respect to time between the start time and the end time of the missing route, and identify turns where the rate of change exceeds a threshold, as well as the timestamps at which the turns are made.

In block 908, missing route determination engine 234 can determine, based on the subset of measurements, one or more distances of one or more path segments travelled by the vehicle before or after the one or more turns as part of the route, and one or more second times at which the vehicle travelled the one or more path segments. Referring to FIG. 6B, missing route determination engine 234 can fetch motion data between timestamps of the turns, and perform integration operations on the motion data to compute the distance between the turns as the distance of a path segment.

Missing route determination engine 234 can also determine the timestamps when the path segment is travelled by the user/vehicle.

In block 910, missing route determination engine 234 can construct an estimated route including a sequence of the one or more turns and the one or more paths based on the start time, the one or more first times of the turns, the one or more second times of the path segments, the one or more turning directions, and the one or more distances of the path segments.

Specifically, referring to FIG. 6B, the estimated route can be represented by a directed graph of a sequence of the turns and paths for the estimated route. The nodes of the directed graph can represent the start point, the end point, and the turns, whereas the edges can represent a path segment and is associated with a distance.

In block 912, missing route determination engine 234 can determine, based on comparing the estimated route and a plurality of candidate routes from a map, the route travelled by the vehicle.

Specifically, referring to FIG. 7A-FIG. 7D, the set of candidate routes can represent a set of shortest alternative routes between the start point of the missing route and an end point of the missing route from map data. The comparison can be based on a graph comparison operation and includes determining a number of missing turns, as well as distance mismatches between corresponding path segments of the estimated route and each of the set of candidate routes. The distance mismatch can be based on a sum of square of distance differences of corresponding path segments. In some examples, the estimated route graph can also be updated to remove or add extra turns to reduce the effect of extra/missing turns on determining the corresponding path segments and distance mismatches. The candidate route determined to have the best match (e.g., based on a minimum number of mismatch turns, a minimum distance mismatch, etc.) can be selected as the missing route.

In block 914, missing route determination engine 234 can provide the missing route for displaying. The missing route can be displayed, in a map, together with the rest of the trip for which the data collection application obtains GPS speed data to track the user/vehicle's location in the trip. In some examples, additional events (e.g., a vehicle collision) can be determined based on the motion data of the missing route and displayed in the map shown on the mobile device. The displaying of the map can be in a mobile device, or in a portal accessible by other people other than the user of the mobile device, such as a claim adjuster.

Figure 10:
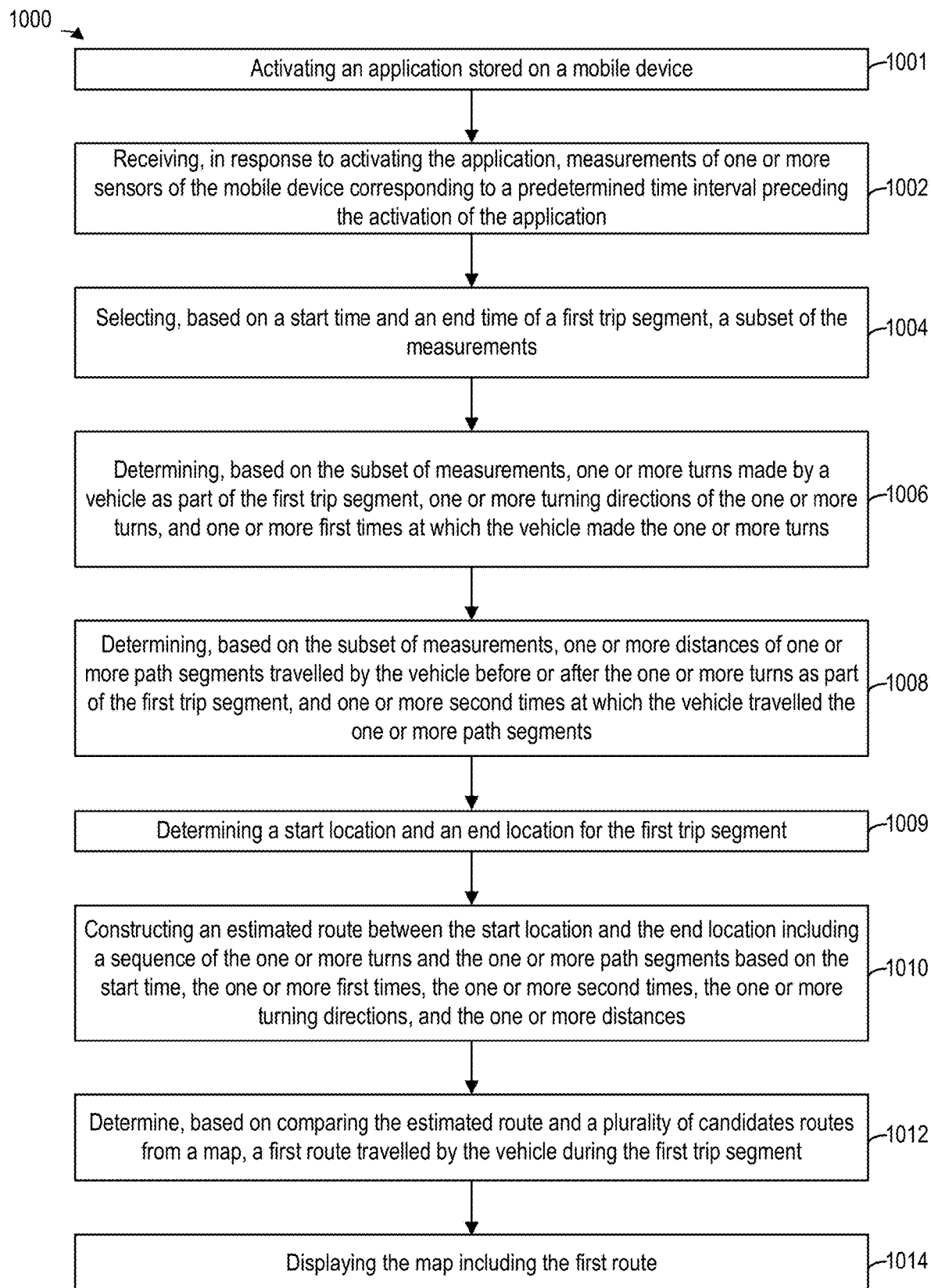
FIG. 10 illustrates an example of a method of route determination based on cached data, according to some aspects of the present disclosure.

FIG. 10 is a flowchart of illustrating an example of a method 1000 for determining a missing route. Method 1000 can be performed by, for example, missing route determination engine 234 of FIG. 4.

In block 1001, an application stored on a mobile device can be activated. The application may be the same, or function in a similar manner, as the data collection application as described above. Activating the application can include executing the application or causing the application to return from a suspended state (e.g., threads of the application resume active execution). In some embodiments, the application is activated in response to the detection of a waking event. The waking event may be detected while the application is not executing (e.g., terminated or otherwise not loaded into memory) or is in a suspended state (e.g., process threads of the application are paused). In some instances, a background process of the application monitors events of the mobile device to detect the waking event. The background process may be the only portion of the application that may be executing. In other instances, the application registers with a monitoring application executing on the mobile device or the operating system of the mobile device to detect particular events when the application is not executing or is suspended.

The waking event may be any predetermined event detectable by the application, monitoring application, and/or operating system. For example, the application may generate a geo-fence that triggers the waking event when the geofence is crossed by the mobile device. A geo-fence may be a virtual perimeter of any size that surrounds the mobile device or any other point of interest. Other waking events can include, but are not limited to, detection that the mobile device is exceeding a speed threshold (e.g., a threshold that indicates the mobile device is positioned in a moving vehicle), expiration of a timer, a predetermined time, detection of a vibration exceeding a threshold, detection of a magnetometer value exceeding a threshold, receiving a notification, detecting proximity to a particular location or entity (e.g., a building, a residence, a particular location of a business such as a particular coffee shop, any location of the business such as any coffee shop owned by the business, a location of interest to a user associated with the mobile device, or the like), or the like.

If the waking event corresponds to the beginning of a drive (e.g., the geo-fence was crossed, sensor data indicates the mobile device is positioned in a moving vehicle, user input, or the like), the application begins collecting sensor data, such as inertial measurement sensor data from sensor data block 108 of FIG. 1, for the current drive. In some instances, the waking event may not be detected until after the drive starts. For instance, there may be delay between when the drive begins and when sufficient sensor data can be collected to indicate that the waking event has occurred. In those instances, the application may request sensor data collected and cached by the operating system over a previous time interval that preceded the waking event. The previous time interval may be included in a recorded time interval that was previously requested by the application.

For instance, the application may request sensor data for a ten minute time interval that immediately preceded the waking event. The application may request any sensor data collected during a time interval that immediately precedes the waking event. In some instances, the time interval may be dynamically selected (e.g., at the time in which the waking event is detected) based at least in part on sensor data received at or immediately after the waking event. For instance, if the sensor data indicates the vehicle has been driving for a while (e.g., is already driving at high speed, is already a predetermined distance from a starting point or the geo-fence, or the like), then the application may increase the length of the time interval to ensure the entire drive is captured. The length of the time interval may be dynamically determined using current sensor data and/or previous active or missed trips. For instance, previous trips may be used to determine if the application should increase the length of the time interval. The previous trips may be previous trips captured or detected by the mobile device or by other mobile devices. The other mobile devices may be similar mobile devices (e.g., being of a same class of devices, having a same operating system, having similar hardware, etc.). The application may continue to capture sensor data until it is determined that the drive has terminated (e.g., the sensor data indicates that the mobile device is not moving in a vehicle for a duration that exceeds a threshold).

In block 1002, measurements of one or more sensors of the mobile device corresponding to a predetermined time interval preceding the activation of the application are received in response to activating the application. In some embodiments, the measurements may be received by missing route determination engine 234 described above. The sensors may include, for example, accelerometers, speedometers, etc. The measurements can be cached in a memory and fetched by missing route determination engine 234. In some examples, missing route determination engine 234 can perform a speed prediction and determine the predicted speed of the user/vehicle with respect to time based on the accelerometer. In some embodiments, the measurements include activity data. Activity data can include, but is not limited to, an activity and a probability that the mobile device is involved in that activity, such as: stationary, walking (e.g., the mobile device is with a user who is walking), a low probability of automotive activity (e.g., a low probability that the mobile device is with a user that is driving), a medium probability of automotive activity (e.g., a medium probability that the mobile device is with a user who is driving), a high probability of automotive activity (e.g., a high probability that the mobile device is with a user that is driving), cycling (e.g., the mobile device is with a user that is cycling and therefore a low probability of automotive activity), and the like.

In block 1004, a subset of the measurements can be selected based on a start time and an end time of a first trip segment. In some embodiments, missing route determination engine 234 may select, based on the start time and an end time, a subset of the measurements. As described above, missing route determination engine 234 can determine the end time of the missing route based on when the data collection application wakes up and/or is activated and starts receiving GPS data, when location information from GPS data starts becoming available, etc. Moreover, missing route determination engine 234 can use the detection of a prior visit or the end of a prior trip as a starting time and search for when the speed data first exceeds a threshold, or when the activity engine first outputs a signal indicating that the mobile device is in a vehicle. The earliest timestamp of when the speed data first exceeds the threshold and/or when the activity engine first outputs a signal indicating that the mobile device is in a vehicle can be used as a start time of the missing route. In some examples, missing route determination engine 234 may further filter the measurements to identify speed data for candidate segments where the speed data exceeds a threshold, to select the subset of the measurements, as described in FIG. 6A.

As described above, a trip may refer to the operation of a vehicle over an interval of time. For example, a trip may include travel from an origin to a destination. The trip may be made up of multiple trip segments, such as the first trip segment. For example, the first trip segment may include travel from an origin to an intermediary location while a second trip segment includes travel from the intermediary location to the destination. In some embodiments, the first trip segment corresponds with a portion of the trip during which the application is not active on the mobile device. For example, the application may be in a suspended state during the first trip segment.

In block 1006, one or more turns made by a vehicle as part of the first trip segment, one or more turning directions of the one or more turns, and one or more first times at which the vehicle made the one or more turns can be determined based on the subset of measurements. In some embodiments, missing route determination engine 234 makes these determinations.

Referring to FIG. 6A, missing route determination engine 234 can determine a course rate of the user/vehicle based on accelerometer data $a_x$, $a_y$, and $a_z$, and the L2 norm of each. In some examples, a neural network can be used to process the accelerometer data and L2 norms to determine a course rate, using similar techniques as speed prediction as to be described below. Missing route determination engine 234 can determine the course rate with respect to time between the start time and the end time of the missing route, and identify turns where the rate of change exceeds a threshold, as well as the timestamps at which the turns are made.

In block 1008, one or more distances of one or more path segments travelled by the vehicle before or after the one or more turns as part of the route, and one or more second times at which the vehicle travelled the one or more path segments can be determined based on the subset of measurements. In some embodiments, missing route determination engine 234 can determine the one or more distances of one or more path segments travelled by the vehicle before or after the one or more turns as part of the route, and one or more second times at which the vehicle travelled the one or more path segments. Referring to FIG. 6B, missing route determination engine 234 can fetch motion data between timestamps of the turns, and perform integration operations on the motion data to compute the distance between the turns as the distance of a path segment. Missing route determination engine 234 can also determine the timestamps when the path segment is travelled by the user/vehicle. For example, each path segment may start at a first time and end, after the vehicle traveled the determined distance, at a second time. The first time and the second time corresponding to the beginning and end of each path segment may correspond with the times at which the one or more turns are determined to have occurred.

In block 1009, a start location and an end location for the first trip segment can be determined. In some embodiments, missing route determination engine 234 can determine the start location and end location. In some embodiments, the start location is determined based on the end location of a previous trip. For example, after being activated, the application may retrieve a history of previous trips and identify an ending location from the most recent trip. The ending location may then be used as the start location for the first trip segment. Additionally, or alternatively, the application may access the most recently collected location information for the mobile device. The end location for the first trip segment may be determined based on the location of the mobile device upon activation of the application. For example, after activating the application, the application may begin collecting location measurements from a GPS sensor. The first location measurement may then be used as the end location of the first trip segment. Additionally, or alternatively, the end location for the first trip segment may be the current location of the mobile device. For example, after activating the application, it may be determined that a trip started and ended while the application was not active. After determining that the trip is no longer occurring and/or has recently ended, the current location of the mobile device may be used as the end location for the first trip segment.

In block 1010, an estimated route between the start location and the end location including a sequence of the one or more turns and the one or more path segments can be constructed based on the start time, the one or more first times, the one or more second times, the one or more turning directions, and the one or more distances. In some embodiments, missing route determination engine 234 can construct the estimated route. Specifically, referring to FIG. 6B, the estimated route can be represented by a directed graph of a sequence of the turns and paths for the estimated route. The nodes of the directed graph can represent the start point, the end point, and the turns, whereas the edges can represent a path segment and is associated with a distance.

In block 1012, a first route travelled by the vehicle during the first trip segment can be determined based on comparing the estimated route and a plurality of candidate routes from a map. In some embodiments, missing route determination engine 234 determines the first route travelled by the vehicle. Specifically, referring to FIG. 7A-FIG. 7D, the set of candidate routes can represent a set of shortest alternative routes between the start location and end location for the first trip segment from map data. The comparison can be based on a graph comparison operation and can include determining a number of missing turns, as well as distance mismatches between corresponding path segments of the estimated route and each of the set of candidate routes. The distance mismatch can be based on a sum of square of distance differences of corresponding path segments. In some examples, the estimated route graph can also be updated to remove or add extra turns to reduce the effect of extra/missing turns on determining the corresponding path segments and distance mismatches. The candidate route determined to have the best match (e.g., based on a minimum number of mismatch turns, a minimum distance mismatch, etc.) can be selected as the first route travelled by the vehicle during the first trip segment.

In block 1014, the map including the first route can be displayed. In some embodiments, missing route determination engine 234 provides the missing route for display. The first route can be displayed, in a map, together with the remainder of a trip for which the data collection application obtains GPS speed data to track the user/vehicle's location in the trip. In some examples, additional events (e.g., a vehicle collision) can be determined based on the motion data of the missing route and displayed in the map shown on the mobile device. The map can be displayed by the mobile device, or in a portal accessible by other people other than the user of the mobile device, such as a claims adjuster.

Example Techniques for Accessing Cached Data

In some instances, routes may be determined from previously collected data cached on a mobile device for later analysis and/or transmission. Further disclosure regarding the collection and transmission of data for use in route determinations can be found in U.S. patent application Ser. No. 17/379,682, entitled "METHODS AND SYSTEMS OF ACCESSING SENSOR-BASED DRIVING DATA" ("the '682 application"), filed Jul. 19, 2021, and U.S. patent application Ser. No. 17/505,353, entitled "METHOD AND SYSTEM FOR ACCESSING HISTORICAL SENSOR DATA WITHOUT LOCATION SERVICES" ("the '353 application"), filed Oct. 19, 2021, the disclosures of which are herein incorporated by reference in their entireties.

FIGS. 11A-11D depict example diagrams for scheduling transmission of historical sensor measurements according to certain embodiments of the present disclosure. Resource consumption of the mobile device may be reduced by reducing the number of processes executed by the mobile device. In some instances, sensor measurement collection may be performed by the operating system in addition to or in place of the data collection application. In those instances, the data collection application may execute periodically (rather than continuously) by using the operating system to collect measurements and the data collection application to manage the collected sensor measurements and transmit the collected sensor measurements to a server.

Each time the data collection application executes, the data collection application may transmit a new request to the operating system to collect sensor measurements for a subsequent time interval. The data collection application may then transmit sensor measurements collected over the preceding time interval (e.g., prior to execution of the data collection application). The data collection application may then terminate to reduce the number of active processes and the resource consumption of the mobile device.

The mobile device, data collection application, and/or server may establish a schedule by which the data collection application is to execute and transmit collected sensor measurements. The schedule may indicate a time and/or frequency in which the data collection application is to execute and transmit collected sensor measurements. Alternatively or additionally, the schedule may indicate conditions (e.g., such as an occurrence of an event) that may trigger the data collection application to execute and transmit collected sensor measurements.

Figure 11A:
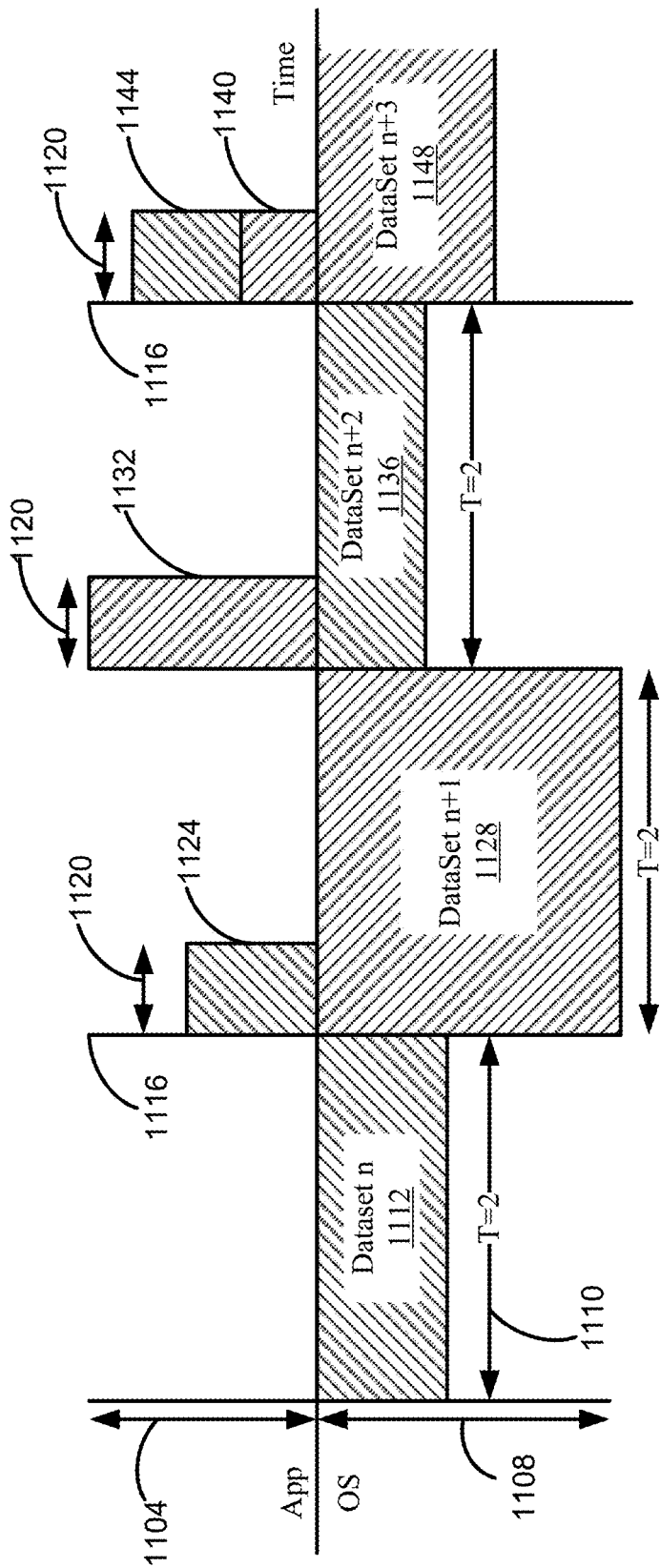
FIGS. 11A-11D depict example diagrams for scheduling transmission of historical sensor measurements according to certain embodiments of the present disclosure.

FIG. 11A depicts a first example diagram for scheduling transmission of historical sensor measurements. Since the data collection application may execute for limited time intervals (e.g., over an execution time interval 1120), the data collection application may be limited to a data limit 1104 that can be transmitted to the server. An operating system of the mobile device may be configured to collect up to a threshold quantity of sensor measurements 1108 during collection time interval 1110 (which may be equal to the time interval between the beginning 1116 of each execution time interval. The predetermined time interval may be based on a request to the operating system to collect sensor measurements or on a predetermined threshold of data size or data volume of the sensor measurements. In this example, the collection time interval 1110 is a fixed time interval that is equal to two hours.

A server may transmit a communication (e.g., such as a silent notification, or the like) to the mobile device that causes the mobile device to execute a data collection application. The notification may be received in regular intervals that is equal to the collection time interval length (e.g., every two hours). Upon receiving the first communication, the data collection application executes and transmits a request to the operating system to begin collecting sensor measurements in a sensor cache. The request can include a collection time interval over which sensor measurements are to be collected, one or more sensor types to collect sensor measurements from, and/or the like. Since this is the first time the data collection application executes, there are no previously collected sensor measurements for the data collection application to obtain from the operating system. After transmitting the request, the data collection terminates.

The operating system begins collecting sensor measurements in dataset n 1112 over the collection time interval while data collection application is terminated. Upon receiving the next communication, the data collection application executes again over an execution time interval 1120. The data collection application transmits a new request to the operating system to collect sensor measurements over the next collection time interval. The data collection application then begins transmission 1124, which includes the sensor measurements of dataset n 1112 collected over the previous collection time interval. The operating system continues to collect sensor measurements in response to the new request. The data collection application may transmit dataset n 1112 to the server in parallel with the operating system's collection of the new set of sensor measurements: dataset n+1 1128.

Since the data collection application may execute over a limited execution time interval 1120, the transmission 1124 may include as much of dataset n 1112 as can be transmitted over the execution time interval. Once the execution time interval terminates, the data collection application terminates. Since the data size of dataset n 1112 is less than the data limit 1104, the data collection application is able to transmit the entire dataset n 1112 during the executing time interval 1120. The data collection application then terminates again until the next communication is received from the server.

Upon receiving the next communication, the data collection application requests sensor measurements over the next time interval (e.g., dataset n+2 1136). The data collection application initiates transmission 1132, which includes the dataset n+1 1128 collected over the previous collection time interval. Dataset n+1 1128 may include more data than can be transmitted during the limited execution time interval 1120. The transmission 1132 may include a portion of dataset n+1 1128, which corresponds to the quantity of dataset n+1 1128 that can be transmitted during the execution time interval 1120. In some instances, the data collection application may include the oldest sensor measurements of dataset n+1 1128 in transmission 1132. In other instances, the data collection application may include the most recently collected sensor measurements of dataset n+1 1128 in transmission 1132. If the data collection application cannot transmit the entire dataset n+1 1128, the data collection application may store an indication as to the last sensor measurement of dataset n+1 1128 that was transmitted to enable transmission of the remaining portion of dataset n+1 1128 during the next execution time interval.

Upon receiving the next communication, the data collection application requests collection of sensor measurements over the next time interval (e.g., resulting dataset n+3 1148). The data collection application then initiates transmission 1140 and transmission 1144. Since the data collection application could not transmit all of dataset n+1 1128, the data collection application may initiate a first transmission 1140 that includes the remaining portion of dataset n+1 1128 then a second transmission 1144 that includes dataset n+2 1136 (e.g., the new set). Alternatively, the data collection application may initiate the second transmission 1144 first followed by the first transmission 1140 (e.g., which includes the remaining portion of dataset n+1 1128). Once the execution time interval 1120 expires, the data collection application terminates until the next communication is received.

As shown, the first transmission 1140 and the second transmission 1144 are able to be completed with the execution time interval 1120. However, if the first transmission 1140 and the second transmission 1144 cannot be transmitted within the execution time interval, the data collection application may transmit as much of the first transmission 1140 and the second transmission 1144 (e.g., starting with the first transmission 1140) as is possible and transmit the remaining portion of the transmission(s) in a subsequent execution time interval.

Figure 11B:
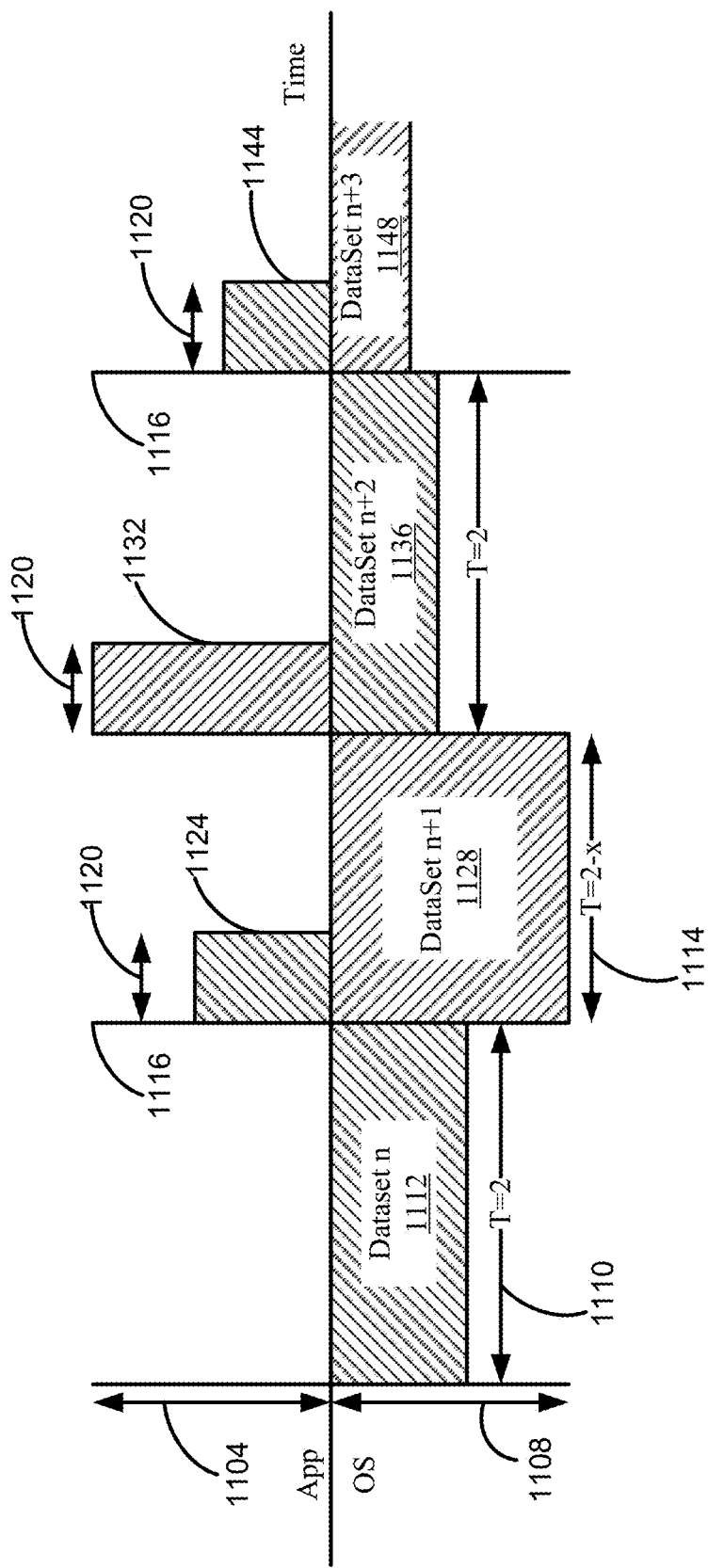

FIG. 11B depicts a second example diagram for scheduling transmission of historical sensor measurements. In this example, the execution frequency of the data collection application may be dynamically adjusted based on the state of the sensor measurement collection. If the data collection application and/or the server determines that the operating system may collect more sensor data over the collection time interval 1110 than can be transmitted over the execution time interval 1120, the data collection application and/or the server may dynamically alter the collection time interval, which may cause the data size of each dataset to be set to the data limit 1104 that can be transmitted over the execution time interval 1120. For example, based on previously transmitted sensor measurements being larger or smaller than a threshold, the data collection application and/or the server may decrease or increase the collection time interval.

For example, operating system collects dataset n 1112 during a first collection time interval. This collection time interval may be of the default length of time (e.g., two hours) set by the data collection application or the server. At the end of the collection time interval, the mobile device receives a communication that causes the data collection application to execute. Data collection application may request that the operating system continue to collect sensor measurements and initiates transmission 1124 to transmit the previous dataset (e.g., dataset n 1112).

During the next collection time interval 1114, the operating system may collect sensor measurements until the data size of the next data set (e.g., dataset n+1 1128) is equal to the data limit 1104. The data collection application may then be executed early (e.g., at two hours minus some time x that occurs when dataset n+1 reaches the data limit 1104), enabling the data collection application to initiate transmission 1132 to transmit the previous dataset (e.g., dataset n 1112). The operating system may execute the data collection application when the size of dataset n+1 1128 is equal to data limit 1104 to enable the entirety of dataset n+1 1128 to be transmitted during transmission 1132. The data collection application may then terminate. The subsequent collection time interval may revert to the default length of two hours (unless the dataset collected during that time interval is greater than or equal to the data limit 1104). The data collection application may be executed each time a dataset reaches a size that is equal to the data limit 1104.

Dynamic scheduling may be defined by the data collection application or the server. In some instances, the data collection application or the server may cause the operating system to monitor the data size of sensor measurements collected by the operating system for the data collection application. When the operating system detects that data size reaches a threshold (e.g., data limit 1104), the operating system can execute the data collection application. In other instances, the server may determine, based on sensor measurements collected by the operating system over a previous time interval, the sampling rate of sensors, the expected length of a current drive, combinations thereof, and the like, that the data size of the dataset collected during the next collection time interval will exceed the data limit 1104. The server may then transmit the next communication at a time in which it is estimated that the size of the dataset is equal to or less than the data limit 1104.

Figure 11C:
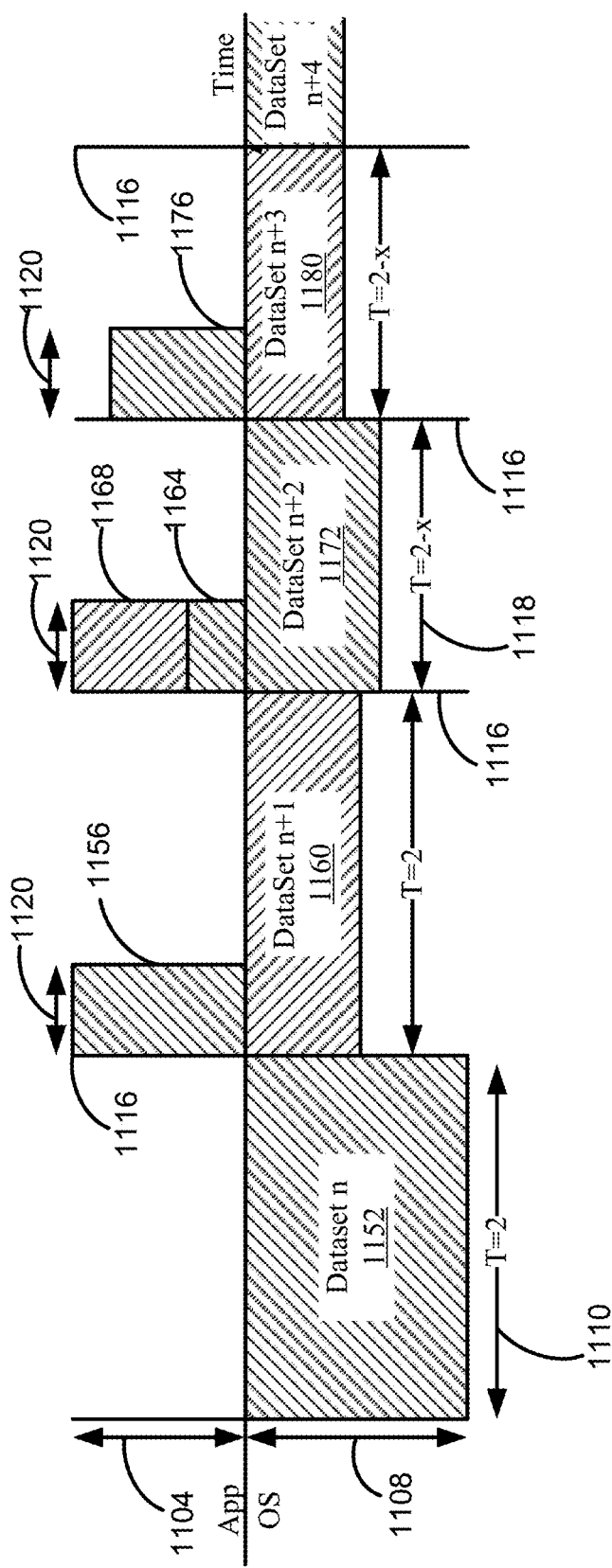

FIG. 11C depicts a third example diagram for scheduling transmission of historical sensor measurements. In this example, the collection time interval 1110 may be dynamically adjusted based on data size of previously collected datasets. If the data collection application determines that a dataset cannot be entirely transmitted during an execution time interval, the data collection application may transmit a communication to the server (e.g., with the dataset) to cause server to increase the frequency with which the server transmits communications that cause the execution of the data collection application. Alternatively, the server may, upon inspection of received datasets, increase the frequency with which communications that cause the execution of the data collection application are transmitted. The frequency may reduce the collection time interval 1110, which may reduce the size of subsequent datasets such that the subsequent datasets may be transmitted within the execution time interval (e.g., the size may be reduced to the data limit 1104). For example, during a long distance drive, the mobile device may collect a greater quantity of sensor measurements during each collection time interval, which may be greater than the data limit 1104. The data collection application and/or the server can then cause an increase in the frequency of communications, which may decrease the collection time interval and the data size of each dataset.

A communication may be received that causes the data collection application to execute. The data collection application may request that the operating system continue collecting sensor measurements, then initiate transmission 1156 of the previous dataset (e.g., dataset n 1152). Since dataset n 1152 includes more data than the data limit 1104, transmission 1156 may only include a portion of dataset n 1152. The data collection application may then terminate. When the next communication is received, the data collection application may initiate two transmissions, the first transmission 1164 may correspond to the portion of dataset n 1152 that could not be included into transmission 1156 and the second transmission 1168 may correspond to the next dataset (e.g., dataset n+1 1160). The data collection application may then terminate.

It may be determined, as a result of transmitting two transmissions during an execution time interval, that the execution time interval may be too small to transmit the volume of data collected by the operating system. As a result, the frequency with which subsequent communications (that cause the execution of the data collection application) are transmitted may be increased. This may have the effect of decreasing the collection time interval 1110 to a reduced collection time interval 1118 (e.g., two hours minus some value x). Subsequent collection time intervals may remain at the reduced length until it is determined that the size of subsequent datasets collected during the reduced length is smaller than the data limit 1104. This may indicate that the data size of future datasets over the full collection time interval may be less than or equal to the data limit 1104. Other factors may be used to determine the frequency of communications that may be transmitted such as, but limited to, quantity of sensor measurements in the dataset, length of the drive, data size of the dataset, user input, GPS measurements, a selected route, or the like.

For example, if it is determined that a mobile device is in a vehicle during a long distance drive (e.g., per a route selection by a user, volume of sensor measurements collected, user input, etc.), the server (or the data collection application) may expect a larger data size (e.g., amount of data) for each dataset. The server (or the data collection application) may increase the frequency of communications (which increases the frequency of transmissions) to decrease the collection time interval such that the data size of the sensor measurements collected during the decreased collection time interval is equal to or less than the data limit 1104 and could be transmitted within the execution time interval.

If it is determined that a mobile device is not on a long-distance drive, the server (or the data collection application) may expect a smaller data size for each dataset. The server (or the data collection application) may decrease the frequency of communications (which decreases the frequency of transmissions) to increase the collection time interval provided that the data size of the sensor measurements collected during the increased collection time interval continues to be less than or equal to the data limit 1104. In some instances, the server may include an upper communication frequency limit (e.g., the server may not increase the frequency higher than the upper communication frequency limit), a lower communication frequency limit (e.g., the server may not decrease the frequency below the lower communication frequency limit), and/or a default communication frequency (e.g., the communication frequency that causes the collection time interval to be equal to the collection time interval 1110 or another communication frequency set by the server, user input, the mobile device, or the like).

In some instances, the data collection application may determine that the frequency that the data collection application executes should be increased (and the collection time interval be reduced). The data collection application may transmit an indication that the communication frequency be increased within one or more of the multiple transmissions that are transmitted during a single execution time interval (e.g., the first transmission 1164 and/or the second transmission 1168). In other instances, the server, upon receiving two transmissions over an execution time interval, may increase the frequency that subsequent communications (that cause the data collection application to execute) are transmitted to the mobile device.

The next communication may be received early (e.g., at the reduced collection time interval 1118). The communication may cause the data collection application to execute, request that the operating system continue to collect sensor measurements (e.g., resulting in dataset n+3 1180), initiate transmission 1176 of the previous dataset (e.g., dataset n+2 1127), and terminate at the end of the execution time interval.

Figure 11D:
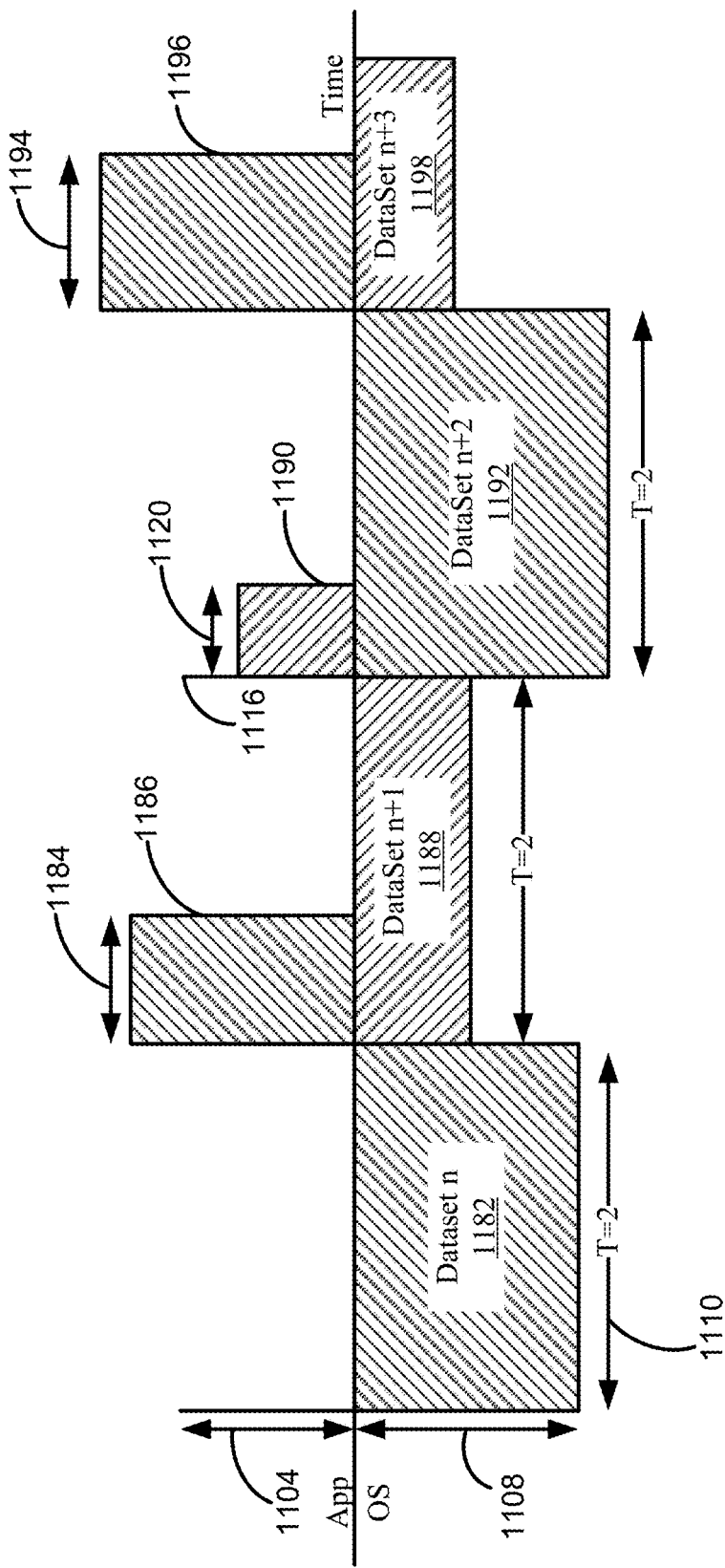

FIG. 11D depicts a fourth example diagram for scheduling transmission of historical sensor measurements. In this example, the execution time interval may be dynamically adjusted based on the data size of each dataset to enable the data collection application to transmit the entire dataset during each execution time interval. In some instances, the execution time interval may be set by the operating system based on the type of communication that causes the execution of the data collection application. For instance, a silent push notification can be transmitted to the mobile device, for example, from a server. When received, the silent push notification is not presented to a user of the mobile device. Instead, the silent push notification may cause the mobile device to execute the data collection application in a background process. The operating system of the mobile device may limit how long the data collection application may execute (e.g., execution time interval 1120) in the background process. In some instances, the data collection application may request that the execution time interval be increased. The data collection application may transmit one request that affects each subsequent execution time interval or may transmit a new request that only affects the current (or subsequent) execution time interval.

For example, dataset n 1182 may be greater than the data limit 1104. When the next communication is received that triggers execution of the data collection application, the data collection application may detect that the dataset n 1182 may be too large to transmit over the execution time interval. The data collection application may request from the operating system that the execution time interval 1184 be increased to accommodate transmission 1186. During the next collection time interval, the dataset n+1 1188 may be less than the data limit 1104 for transmission 1190. When the next communication is received the data collection application may execute and detect that no increase in the execution time interval is needed. Execution time interval may remain the default length (e.g., execution time interval 1120).

The next communication causes the data collection application to execute, and again detect that the previously collected dataset (e.g., dataset n+2 1192) is larger than data limit 1104. The data collection application may request that the execution time interval 1194 be increased to accommodate transmission 1196. During the next collection time interval, the dataset n+3 1198 may be than the data limit 1104. The subsequent execution time interval may return to the default length (e.g., execution time interval 1120).

The execution time interval may include a default length (e.g., execution time interval 1120) that may be increased (e.g., execution time interval 1184, execution time interval 1194) or decreased (not shown) based on the size of the previously collected dataset. The amount that execution time interval may be increased or decreased may be based on a data size of the dataset to be transmitted, a signal quality of a radio of the mobile device, network bandwidth of the mobile device, signal-to-noise ratio (e.g., that may indicate a clear signal or a signal likely to result in dropped data packets), combinations thereof, and the like.

The examples of FIGS. 11A-11D including transmitting remaining portions of datasets during subsequent execution time intervals (e.g. FIG. 11A), decreasing the length of collection time interval when the data size of the dataset collected during the time interval is greater than or equal to the data limit 1104 (e.g., FIG. 11B), increasing the frequency of communications that cause the data collection application to execute (which increases the frequency of transmissions and decreases the length of the collection time interval) (e.g., FIG. 11C), and increasing the execution time interval to transmit larger datasets (e.g., FIG. 11D) may be combined with other examples forming any combination. For instance, the frequency of communications that cause the data collection application to execute may be increased along with increasing the execution time interval. Any combination of the examples of FIGS. 11A-11D may be formed to provide a dynamic schedule for the execution of the data collection application, transmission of previously collected (e.g., historical) sensor measurements, and the termination of the data collection application.

In some instances, the mobile device may process the sensor measurements to reduce the data to be transmitted. For instance, the mobile device may process the sensor measurements to derive events that occurred while the vehicle was in operation. Examples of events can include, but are not limited to, speeding, distracted driving, a collision, hard braking, swerving, departing the road, aggressive driving (e.g., frequent lane changes or changes in speed), and the like. The mobile device may also derive metadata that characterizes the events or other aspects of the time in which the vehicle was in operation such as a timestamp of each event, other characteristics of the vehicle at the time, etc. The mobile device may then transmit the events and/or metadata during the execution time interval instead of transmitting the collected sensor measurements, which may substantially reduce the volume of data that will be transmitted. For instance, if one event occurred, then the mobile device may transmit an indication of the one event and/or the metadata rather than all of the sensor measurements that were collected before the execution time interval. Alternatively, the mobile device may not transmit the sensor measurements and instead use the execution time interval to process the sensor measurements (e.g., to derive characteristics of the drive, events, and/or metadata). The mobile device may then store the processed sensor measurements for later use (e.g., display, other processes, further analysis, transmission, etc.).

Figure 12:
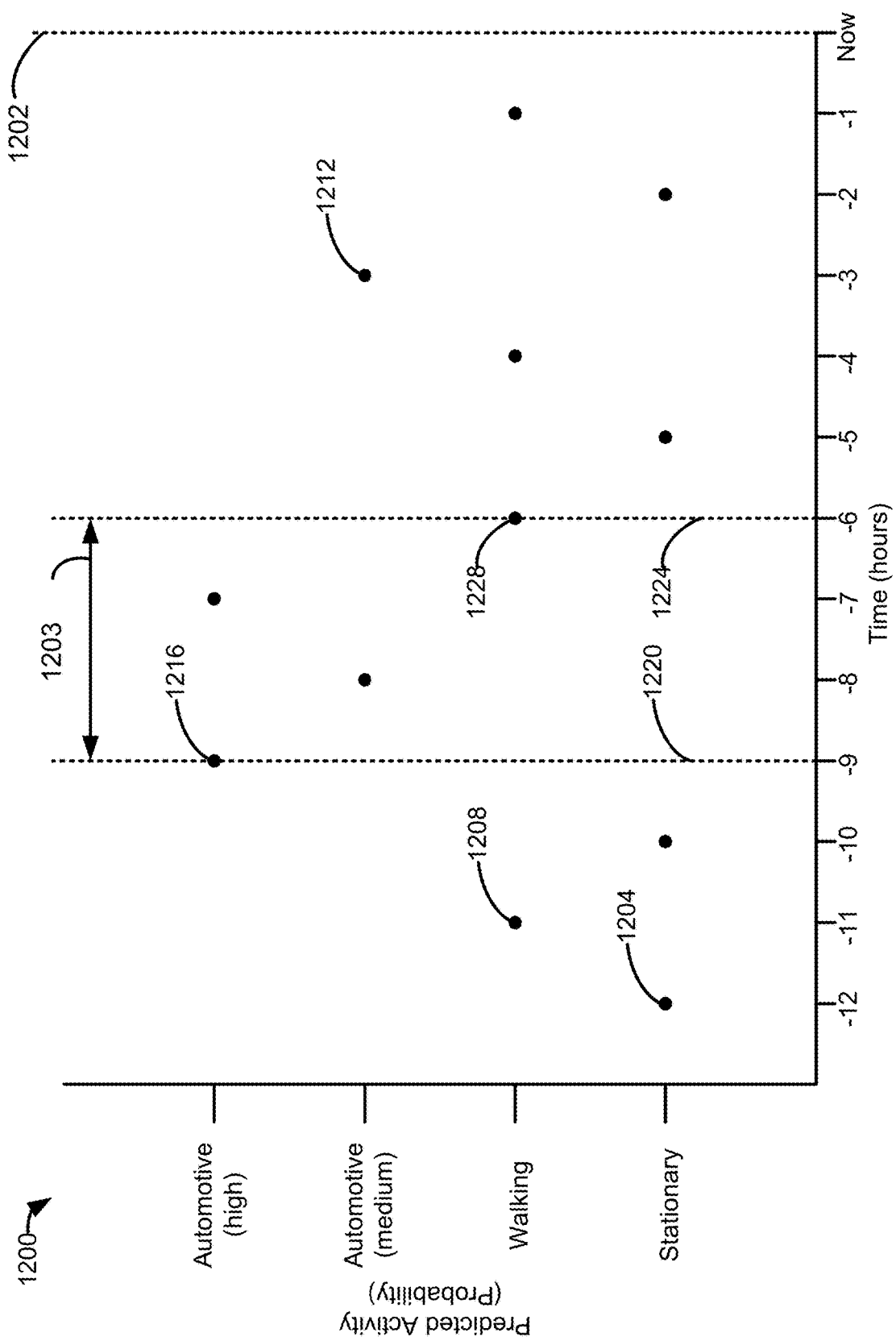
FIG. 12 is an exemplary representation of a graph data structure generated by an activity detection engine according to some embodiments.

FIG. 12 is an exemplary representation of a graph data structure 1200 generated by an activity detection engine according to some embodiments. A data collection application executing on the mobile device collects measurements from one or more sensors (e.g., such as sensors from sensor data block 108 of FIG. 1). While executing, the data collection application may consume resources (e.g., processing, network bandwidth, power, and the like) of the mobile device. In some instances, the data collection application may only intend to capture sensor data that corresponds to a predetermined activity type (e.g., such as a drive or the like). Capturing sensor data of other activities (e.g., when the mobile device is stationary) may waste the resources of the mobile device. To reduce the resource consumption of applications of the mobile device, the operating system of the mobile device may capture and cache sensor data from some or all of the sensors of the mobile device over a predetermined, discrete time interval (e.g., twelve hours). When the data collection application executes (or returns from a suspended state), the data collection application may request the sensor data collected by the operating system over the preceding predetermined, discrete time interval (e.g., up to the preceding twelve hours) during which the data collection application was not executing.

The operating system of the mobile device may also generate a probability of a contemporaneous activity of the mobile device (e.g., a probability that the mobile device is with a user who is stationary, walking, running, driving, flying, or the like, or an otherwise low probability of automotive activity) over the predetermined, discrete time interval. The activity detection engine accesses the activity data generated by the operating system over the predetermined, discrete time interval and uses the activity data to identify potential missed drives (e.g., drives in which the data collection application did not obtain sensor data). The activity detection engine may access the activity data from a cache memory of the operating system. This prevents the data collection application from analyzing all of the sensor data over the predetermined time interval. Instead, the activity detection engine may identify the missed drive and collect the portion of the sensor data that corresponds to the missed drive.

In some instances, the data collection application may request that the operating system collect sensor data. The activity detection engine may indicate a time interval over which the sensor measurements are requested (e.g., up to a maximum allowed by the operating system, such as twelve hours). The operating system may then cache sensor data over the time interval while the data application is not executing (or is suspended). When the data collection application executes (or returns from suspension), the activity detection engine accesses the activity data collected by the operating system (e.g., through an application programming interface exposed by the operating system). The activity detection engine may access the activity data from a cache memory of the operating system. The data collection application may also generate a new request to the operating system to collect sensor data for a subsequent time interval such that the sensor data is always being collected, either by the data collection application (when executing), or the operating system (when the data collection application is not executing).

The activity detection engine generates a graph data structure using the activity data received from the operating system. The activity detection engine may access the activity data from a cache memory of the operating system. As previously described, the activity data includes, but is not limited to, an activity and a probability that the mobile device is involved in that activity, such as: stationary, walking (e.g., the mobile device is with a user who is walking), a low probability of automotive activity (e.g., a low probability that the mobile device is with a user that is driving), a medium probability of automotive activity (e.g., a medium probability that the mobile device is with a user who is driving), a high probability of automotive activity (e.g., a high probability that the mobile device is with a user that is driving), cycling (e.g., the mobile device is with a user that is cycling and therefore a low probability of automotive activity), and the like. Any activity may also be represented by the graph data structure such as those enumerated by a user (e.g., through user input or the like) or those detected by another application of the mobile device. The activity detection engine may receive identification of any quantity of activities over the preceding time interval. The activity detection engine may obtain an indication of an activity in regular intervals (e.g., by polling the operating system). Alternatively, the activity detection engine may receive an indication of an activity each time the operating system detects a new activity (e.g., push notification from the operating system).

In some instances, the activity detection engine may receive a probability (e.g., a confidence that the activity is occurring) for each of multiple activities. In those instances, the activity detection engine represents, in the graph data structure, the activity with the highest probability. Alternatively, the activity detection engine may represent only those activities with a probability that exceeds a threshold. For instance, the activity detection engine may only represent activities with a probability that exceeds 40% in the graph data structure. If no activities exceed the 40% threshold, the graph data structure may not include activities at that time (e.g., the activity may be represented as a null value). Alternatively, the data collection engine may represent all activities in the graph data structure with the corresponding probability of each activity.

The graph data structure 1200 includes a preceding time interval of twelve hours from a wake event 1202 (e.g., a time in which the data collection application is executed or wakes from suspension). The ordinate of graph data structure 1200 represents predicted activities and their associated probability. The abscissa of graph data structure 1200 represents time going backwards from a waking event, such as wake event 1202. A waking event may be any predetermined event such as, but not limited to, the mobile device crossing, or otherwise going outside of, a geofence (or any particular boundary), a visit notification, a notification from a notification service (e.g., known as a "push notification"), a scheduled time, detecting sensor data indicative of movement, or the like. A visit may be a notification from the operating system of the mobile device indicating that the mobile device is located at a location for long enough that the operating system determines that the mobile device is "visiting" the location. The visit may correspond to any location at which the mobile device is positioned for longer than a threshold time interval. For example, a location may correspond to an establishment (e.g., a business, public institution, residence, or the like). In some embodiments, the activity detection engine receives activity data for each hour of the preceding twelve hour time interval and represents, in the graph data structure, the activity having the highest probability (if more than one activity was received). For instance, at minus twelve hours (e.g., twelve hours prior to execution of the data collection application) the activity 1204 corresponds to stationary, at minus eleven hours the activity 1208 corresponds to walking, at minus three hours the activity 1212 corresponds to a medium probability of automotive activity, and at minus nine hours the activity 1216 corresponds to a high probability of automotive activity.

The activity detection engine identifies a missed trip 1203 using the activity data of the graph data structure 1200. For instance, the activity detection engine identifies a first time 1220, which is an earliest time in which an activity drive high is detected. The activity detection engine identifies activity 1216 as the activity that corresponds to the first time 1220. In some instances, the activity detection engine identifies the earliest time of any automotive activity (e.g., a medium or high probability of automotive activity). In the graph data structure 1200, the first time 1220 was detected at minus nine hours (e.g., nine hours prior to execution of the data collection application). The activity detection engine then identifies a second time 1224, which is the earliest time after the first time in which a different activity is detected. For example, the activity detection engine identifies activity 1228 as being the next activity that is not automotive activity. The different activity may be any activity other than an automotive activity, such as walking or stationary in the example described by graph data structure 1200. In some instances, the activity detection engine identifies a second time that corresponds to an activity that is associated with anything other than a high probability of automotive activity (e.g., a medium probability of automotive activity, walking, cycling, or stationary). For instance, the second time may correspond to automotive activity, even if the probability of automotive activity occurring is medium, low, or zero. The activity detection engine then identifies a missed trip that occurred over a time interval that includes the time period between first time 1220 and second time 1224 (e.g., minus nine hours to minus six hours).

The activity detection engine may then identify if another missed trip occurred by identifying a third time, which is an earliest time after the second time in which a driving activity is detected and a fourth time, which is an earliest time after the third time in which an activity other than a drive was detected. The process may continue until all missed trips are identified. Although the process of identifying missed trips begins by analyzing from an earliest time (e.g., minus twelve hours) to a waking time, the process may operate by analyzing activity data from the waking time towards the earliest time.

The data collection application may receive the sensor data from the operating system over the discrete time intervals in which a missed trip occurred (e.g., from minus nine hours to minus six hours as depicted in graph data structure 1200). This prevents the data collection application from having to analyze sensor data that corresponds to time intervals that do not correspond to a missed drive.

Figure 13:
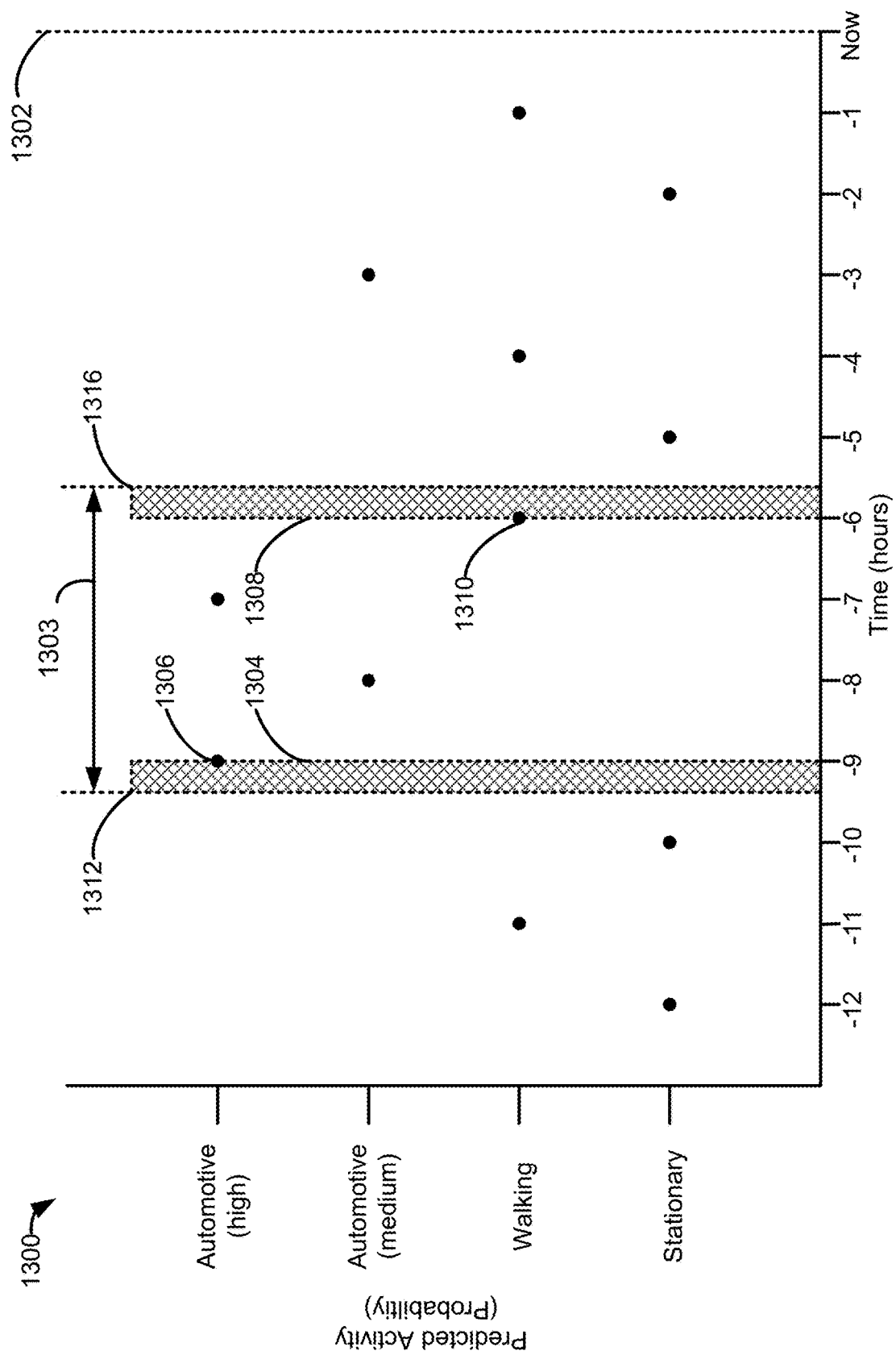
FIG. 13 is another exemplary representation of a graph data structure generated by an activity detection engine according to some embodiments.

FIG. 13 is another exemplary representation of a graph data structure 1300 generated by an activity detection engine data according to some embodiments. The graph data structure 1300 is an alternative example of the graph data structure 1200 of FIG. 12 in which the missed drive time interval is altered to collect additional sensor data. In some instances, there may be a delay between the time when a drive begins and when the operating system detects driving high. The operating system receives sensor data and classifies the sensor data according an activity. The operating system may wait until a predetermined amount of sensor data is received to generate a probability of a particular activity. Alternatively, the operating system may not generate a probability of a particular activity until a given confidence threshold is exceeded. For example, if there is insufficient sensor data for the operating system to generate a probability with a given confidence, then the operating system may wait until more sensor data is received. The operating system may then generate a probability of a particular activity with a greater confidence.

If the activity detection engine identifies drives based on the activity detected by the operating system, then the delay between the beginning of a drive and a detection of a drive activity may cause the data collection application to miss sensor data associated with the drive. For instance, if a drive begins five minutes before the operating system detects a driving high activity, then the activity detection engine will miss the sensor data from the first five minutes of the drive.

The data collection application may correct for the delay by requesting sensor data over a larger time interval than the time interval during which the drive occurred. For instance, in the example of graph data structure 1300, the activity detection engine indicates that a drive occurred over a first time interval 1303 that includes a first time 1304 (e.g., minus nine hours) based on activity 1306 and a second time 1308 (e.g., minus six hours) based on activity 1310. The data collection application receives the sensor data from the operating system over a second time interval that begins at third time 1312 prior to the first time and ends at a fourth time 1316 after the second time. For example, the third time 1312 may be ten minutes prior to the first time and the fourth time 1316 may be ten minutes after the second time. The time interval between the first time 1304 and third time 1312 and the second time 1308 and fourth time 1316 may be the same or different. The time interval between the first time 1304 and third time 1312 and the second time 1308 and fourth time 1316 may be of any predetermined length (e.g., thirty seconds, ten minutes, thirty minutes, etc.), or dynamically determined based on previously detected or identified missed trips, available set of sensors, particular sensor values, or the like.

Figure 14:
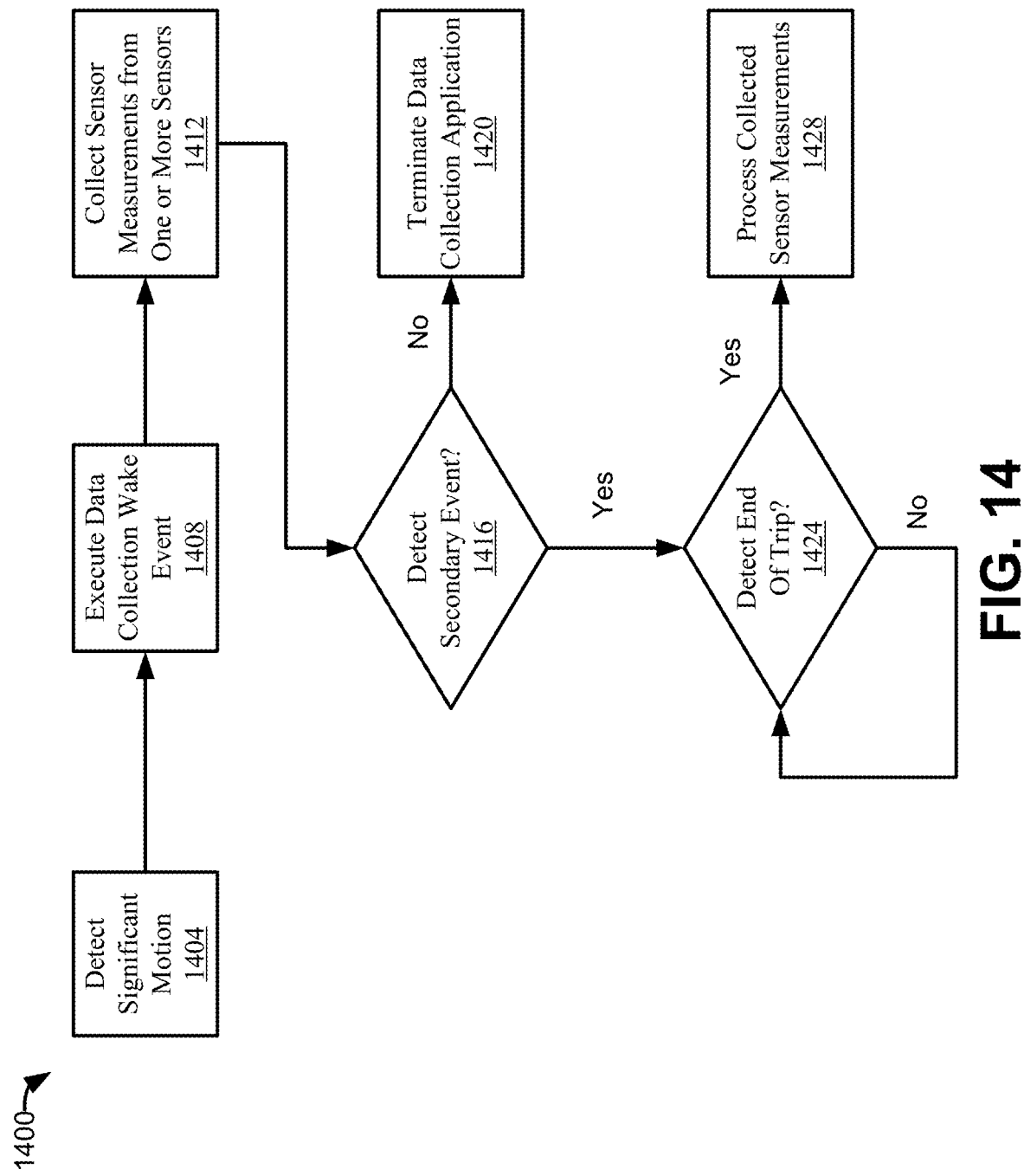
FIG. 14 depicts a flowchart of an exemplary process for collecting sensor measurements based on a sensor of a mobile device according to certain embodiments of the present disclosure.

FIG. 14 depicts a flowchart of an exemplary process 1400 for collecting sensor measurements based on a sensor of a mobile device according to certain embodiments of the present disclosure. In some embodiments, one or more steps of process 1400 may be performed by a mobile device, as described above. At block 1404, process 1400 involves detecting significant motion. For example, a mobile device may receive an indication from the operating system, that significant motion has been detected. This indication is based on data obtained from one or more sensors of the mobile device. The sensor may be a raw sensor (e.g., such as an accelerometer) or a virtual sensor (e.g., a construct that derives measurements from measurements collected from one or more other sensors). An example of a virtual sensor is a significant motion sensor that outputs an indication of significant motion by the mobile device, e.g., motion of the mobile device that exceeds a threshold. The indication of significant motion may be a Boolean value (e.g., significant motion detected or no significant motion detected), a numerical value (e.g., between 0 and 1 or 1 and 10, etc.), a range, or the like. The sensor may indicate when the mobile device is moved more than a threshold amount. In some instances, the output from the sensor may be used to detect the occurrence of an event. For instance, upon detecting significant motion, another process of the mobile device may interpret the significant motion as corresponding to an event type. Examples of event types include, but are not limited to, walking, running, cycling, driving, flying, or the like and may be determined by the magnitude of the motion detected by the sensor.

In some instances, the other process may define success thresholds to interpret the measurements collected from the sensor. For instance, if the significant motion is greater than a first threshold, then a walking event type may be detected. If the significant motion is greater than a second threshold, then a running event type may be detected. If the significant motion is greater than a third threshold, then a cycling event type may be detected. If the significant motion is greater than a fourth threshold, then a driving event type may be detected. If the significant motion is greater than a fifth threshold, then a flying event type may be detected. Other thresholds may be set to identify other event types. Thus, the sensor that indicates significant motion of the mobile device may be a physical sensor, a virtual sensor, an application running on the mobile device, e.g., in the background, that processes data obtained from one or more physical and/or virtual sensors and generates an output indicating that significant motion has occurred, or the like.

The sensor may be correlated with a location services sensor (e.g., from a GPS sensor, Wi-Fi, cellular tower triangulation, or any other service of the mobile device or a remote device that determines a location of the mobile device) to further improve the accuracy of the detection of the occurrence of the event type. In some instances, the use of location services may be avoided to maintain resource consumption of the mobile device at a particular level.

At block 1408, process 1400 involves executing a data collection wake event. The data collection wake event may be executed on the mobile device. The data collection wake event initiates execution of a data collection application that was not executing (or was in a suspended state). The data collection wake event may be as a result of a notification from a sensor of the mobile device indicating that significant motion has been detected. The notification can be generated using a significant motion sensor of the mobile device. The sensor may be a raw sensor (e.g., such as an accelerometer) or a virtual sensor (e.g., a construct that derives measurements based on measurements collected from one or more sensors including the accelerometer or separate from the accelerometer). Thus, both hardware and software can be components of the sensor. The sensor may indicate when the mobile device has moved or is moving more than a threshold amount. In some instances, the sensor may be used to detect an occurrence of an event. For example, the notification from the sensor may be analyzed in conjunction with accelerometer measurements to detect the occurrence of an event, may trigger a process in which other sensors or activity data is used to determine whether the user is engaging in behavior of interest, such as driving, or the like. Continuing the example above, the data collection wake event may causes the mobile device to execute the data collection application.

At block 1412, process 1400 involves collecting sensor measurements from one or more sensors. The one or more sensors may be a part of the mobile device. Alternatively, or additionally, the one or more sensors may be distributed across the mobile device and a device external to the mobile device. In some embodiments, the data collection application begins collecting sensor measurements from one or more sensors of the mobile device. The data collection application may select which sensors to obtain sensor measurements from based on the event type. For example, the data collection application may collect sensor measurements from an accelerometer and a gyroscope when the event type is a driving event type and collect sensor measurement from just the accelerometer when the event type is a walking event type. Alternatively or additionally, the data collection application may select a sampling rate for each sensor based on the event type. For example, the data collection application may select a higher sampling rate when the event type is a driving event type and a lower sampling rate when the event type is a walking event type. The data collection application may continue to collect sensor measurements until another event type is detected (e.g., during the drive), the sensor indicates that the mobile device is stationary for a predetermined time interval, user input, or the like.

At block 1416, process 1400 involves detecting a secondary event. In some embodiments, the mobile device determines whether a secondary event is detected. A secondary event may be an event that increases or decreases the probability that a drive is occurring. For instance, the secondary event may include the mobile device crossing a geofence (e.g., a virtual fence that surrounds the mobile device and triggers a notification when the mobile device cross it). If the geofence is crossed, then it is more likely that the mobile device is positioned within a moving vehicle. If the sensor indicates that a drive is occurring, but the geofence is never crossed, then it is less likely that a drive is occurring (e.g., likely that the sensor issued a false positive). The secondary event may include detecting sensor measurements (e.g., accelerometer data measured at a given frequency such as 50 Hz, or the like) that are greater than a threshold, detecting change in location (e.g., using an accelerometer, GPS sensor, or the like), detecting the crossing of a geofence, user input (e.g. such as a selection of a route to a destination location, messages indicating traveling or a change in location, or user selection of a route, connecting to a Bluetooth beacon in a vehicle, or the like), a notification, or the like.

At block 1420, if a secondary event is not detected (e.g., the significant motion may have been a false positive), process 1400 involves terminating the data collection application (block 1420). Terminating the data collection application may include returning to a hibernation state and/or running the data collection application as a background process of the mobile device. In some embodiments, the data collection application will terminate until a subsequent significant motion is detected again at block 1404 after which a new data collection wake event will be executed.

At block 1424, if a secondary event is detected at block 1416, then the process 1400 involves detecting the end of a trip (block 1424). In some embodiments, the data collection application continues to collect sensor measurements until an end of the drive is detected. The end of the drive may be detected by the sensor, by sensor measurements falling below a threshold, a GPS sensor indicating no changes in location, combinations thereof, or the like.

At block 1428, process 1400 involves processing the collected sensor measurements. In some embodiments, the mobile device processes the collected sensor measurements. This may include detecting one or more events that occurred during the drive such as, but not limited to, hard braking, aggressive driving (e.g., frequency changes in acceleration that are greater than a threshold), distracted driving, swerving, speeding, mobile phone use, other driving behaviors, combinations thereof, and the like. Alternatively or additionally, the mobile device may transmit the collected sensor measurements to a server for processing. In some instances, the mobile device may process the collected sensor measurements and/or transmit the collected sensor measurements as the sensor measurements are being received by the mobile device. Once the collected sensor measurements are processed (and/or transmitted to the server), the data collection application terminates.

It should be appreciated that the specific steps illustrated in FIG. 14 provide a particular method for collecting sensor measurements based on a sensor of a mobile device according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15:
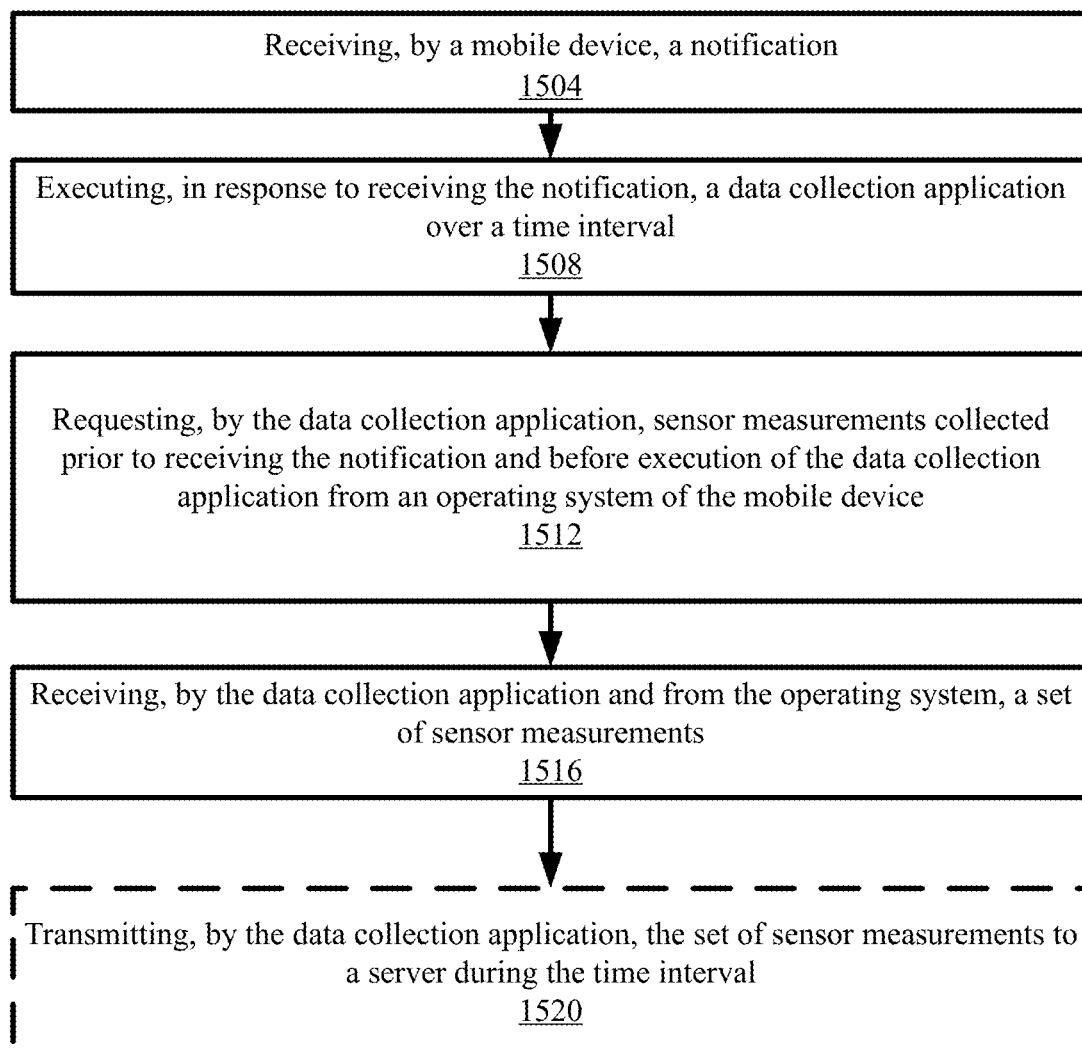
FIG. 15 depicts a flowchart of an exemplary process for collecting and transmitting historical sensor measurements according to certain embodiments of the present disclosure.

FIG. 15 depicts a flowchart of an exemplary process 1500 for collecting and transmitting historical sensor measurements, according to certain embodiments of the present disclosure. At block 1504, process 1500 involves receiving a notification by a mobile device. The notification may be a communication transmitted from an internal process of the mobile device or from a remote device, for example, a remote cloud server, that includes an identification of an application of the mobile device that was designated by the data collection application, a remote application, or operating system to transmit a notification to the data collection application upon detecting an event. Examples of events may be detecting sensor measurements that are greater than a threshold (e.g., from a significant motion sensor, accelerator, and/or other sensors), detecting that time interval has expired, detecting a communication (e.g., from an inter-process communication or from a remote device), combinations thereof or the like. For instance, the data collection application may request that the internal process transmit a notification to the data collection application in regular intervals. In another example, the notification may be a push notification or a silent push notification transmitted from a remote device such as a server. In some embodiments, the notification is generated by a local process of the mobile device based on an increase in the likelihood of motion of the mobile device.

In some instances, the notification may be received according to a schedule. For instance, the notification may be received at regular intervals, dynamic intervals (that change over time based on the collected sensor measurements, processing or network bandwidth of the mobile device, or the like), or the like. For example, if the data size of previously collected sensor measurements is greater than a threshold (e.g., such as the data limit), then the frequency in which subsequent notifications may be received may be increased (e.g., to decrease the collection time interval). Increasing the notification frequency increases the frequency of transmissions and the likelihood that the sensor measurements that are collected can be transmitted within the executing time interval. In some instances, the notifications may be timed such that a notification is received upon collecting a predetermined quantity or data size of sensor measurements. For example, the predetermined quantity or data size of sensor measurements may be based on an amount of data that can be transmitted during the execution time interval.

At block 1508, process 1500 involves executing a data collection application over a time interval in response to receiving the notification. The time interval may correspond to an execution time interval for the data collection application. The execution time interval may be based on a predetermined time interval (e.g., set by the operating system of the mobile device), a data size of sensor measurements that were previously collected, a quantity of the sensor measurements that were previously collected, or the like. While the data collection application is executing, it may transmit a request to the operating system for the operating system to collect and store additional sensor measurements over a subsequent execution time interval. The subsequent execution time interval may be of a same or different length from the execution time interval. In some embodiments, the operating system of the mobile device automatically collects sensor measurements and stores them in a cache, such as a ring buffer. In this example, process 1500 may proceed directly to block 1512 in order to request the sensor measurements previously collected by the operating system of the mobile device.

At block 1512, process 1500 involves requesting, by the data collection application, sensor measurements collected prior to receiving the notification and before execution of the data collection application from an operating system of the mobile device. Each time the data collection application executes, the data collection application may request that the operating system collect sensor measurements over a collection time interval that begins at a current time and ends at the next time the data collection application is executed. Upon executing, the data collection application may request, from the operating system, the sensor measurements collected over the preceding collection time interval (e.g., prior to receiving the notification) while the data collection application was not executing. At block 1516, process 1500 involves the data collection application receiving a set of sensor measurements from the operating system. The set of sensor measurements correspond to the requested sensor measurements that were collected over the preceding collection time interval.

At block 1520, process 1500 involves transmitting, by the data collection application, the set of sensor measurements to a server during the time interval. For example, while the data collection application is executing during the time interval, it may transmit the sensor measurements collected by the operating system prior to receiving the notification to a remote server. In some embodiments, the data collection application may terminate upon the expiration of the time interval. In some instances, the data collection application may not be able to transmit the full set of sensor measurements within the time interval. In those instances, the data collection application may identify a subset of the set of sensor measurements that cannot be transmitted within the time interval. The data collection may transmit the subset of the set of sensor measurements via a background process of the mobile device (e.g., such as background fetch, background processing task, or any process executing in the background of the mobile device). Alternatively, the data collection application may transmit the subset of the set of sensor measurements during a subsequent execution time interval (along with other sensor measurements) that begins when the mobile device receives a subsequent notification.

For example, the mobile device may receive a subsequent notification from the server and execute the data collection application over a subsequent time interval. The data collection application may request new sensor measurements collected between when the data collection application terminated and when the subsequent notification is received. The data collection application may then transmit the subset of the set of sensor measurements that the data collection application was unable to transmit during the time interval to the server along with the new sensor measurements.

In some instances, rather than transmitting the set of sensor measurements, for example, if the data collection application cannot transmit the set of sensor measurements, the data collection application may process the set of sensor measurements. For instance, the data collection application may down-sample the set of sensor measurements to reduce the data size of the set of sensor measurements to generate an abbreviated data set. After down-sampling the set of sensor measurements to create the abbreviated data set, the data collection application may then transmit the down-sampled set of sensor measurements. Alternatively, the data collection application may process the set of sensor measurements to detect one or more events, using the set of sensor measurements, that occurred when the set of sensor measurements were being collected. Examples of events include, but are not limited to, speeding, hard braking, distracted driving, swerving, aggressive driving, lane departure (e.g., driving over rumble strips or partially or entirely off-road), collisions, other driving behaviors, and the like. Detecting one or more events that occurred during collection of the sensor measurements may enable the data collection application to generate metadata that corresponds to an event or one or more events. The metadata may characterize the events. For instance, the metadata may include a timestamp of the event, sensor measurements that correspond to the event, other sensor measurements collected during the event, other events detected at the same time or within a certain temporal proximity, a relative location in which the event occurred (e.g., using location services or determined using other sensors of the mobile device), combinations thereof, or the like. The data collection application may transmit an identification of the one or more events and/or the metadata during the execution time interval in place of or in addition to the set of sensor measurements or a subset of the set of sensor measurements. If, for example, the user of the mobile device is stationary for an extended period of time, for instance, at an office during working hours, the set of sensor measurements may include long periods of negligible acceleration. In this case, processing of the set of sensor measurements may be performed to define an activity or confirm existing activity data using the set of sensor measurements.

In other instances, the data collection application may not transmit the set of sensor measurements, the one or more events, or the metadata. Instead, the data collection application may store the set of sensor measurements, the one or more events, or the metadata. The data collection application may then display the set of sensor measurements, the one or more events, and/or the metadata through a user interface on a display of the mobile device. A user, through interaction with the user interface, may process the set of sensor measurements, view the one or more events, view the corresponding metadata of an event, and selectively transmit some or all of the set of sensor measurements, some or all of the one or more events, and/or some or all of the metadata.

Notifications may continue to be received according to the schedule, with each notification causing the mobile device to execute the data collection application, obtain sensor measurements collected over a preceding time interval, transmit the sensor measurements to a server within the time interval, and terminate the data collection application until the next notification is received. Thus, the process illustrated in FIG. 15 can be repeated, enabling collection of sensor measurement data over a continuous time period. As an example, if the process illustrated in FIG. 15 is repeated every two hours, thereby collecting two hours of sensor measurements, repetition of the process 12 times will result in collection of data over a 24-hour period.

In addition to the use of a notification received by the mobile device as illustrated in FIG. 15, other mechanisms can be used to trigger the collection of historical data stored in the sensor cache. As an example, if the mobile device connects to a vehicle, for example, via Bluetooth, this connection can be detected and utilized to initiate the data collection process. Therefore, in addition to notifications and sensor-based motion detection, other indications that the likelihood of motion has increased can be utilized to trigger data collection. As an example, the Bluetooth connection discussed above can indicate that motion, such as a drive, is more likely to occur, despite the fact that only limited motion has occurred. Thus, examples of the present invention are not limited to receipt of a notification, for example, from a server, or an indication of motion of the mobile device as a trigger to initiate data collection since an indication of an increase in the likelihood of future motion can be utilized in generating a trigger. For example, a local process of the mobile device may indicate an increase in the likelihood of future motion. Moreover, as an example, a background task performed by the mobile device could be utilized to trigger the data collection process. Running at a periodic frequency, the background task could trigger the data collection application to request sensor measurements from the operating system of the mobile device. Thus, rather than initiation resulting from receipt of a notification as illustrated in FIG. 15, the processes described herein can be initiated by a background task available through the operating system of the mobile device.

It should be appreciated that the specific steps illustrated in FIG. 15 provide a particular method for collecting and transmitting historical sensor measurements according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
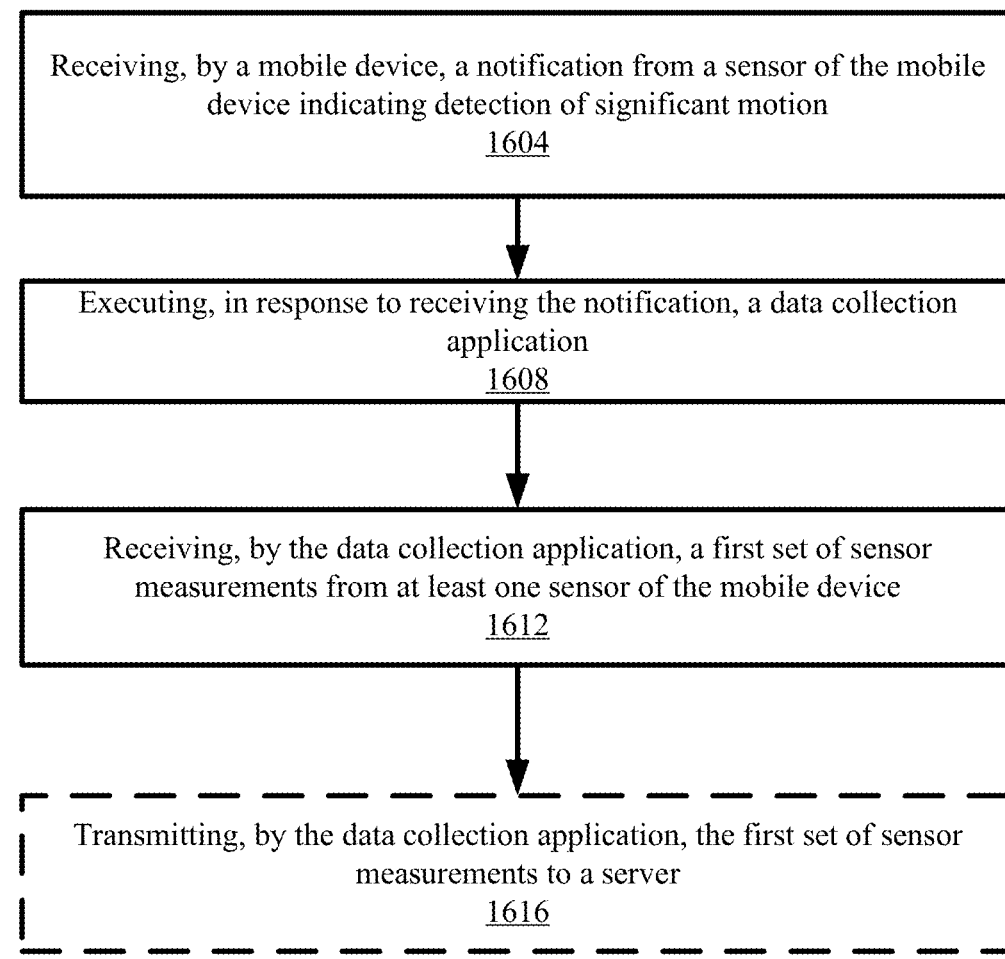
FIG. 16 depicts a flow chart of an exemplary process for collecting sensor measurements based on a sensor of the mobile device according to certain embodiments of the present disclosure.

FIG. 16 depicts a flow chart of an exemplary process 1600 for collecting sensor measurements based on a sensor of the mobile device according to certain examples of the present disclosure. At block 1604, process 1600 involves receiving, by a mobile device, a notification from a sensor of the mobile device indicating that significant motion has been detected. The notification can be generated using a significant motion sensor of the mobile device. The sensor may be a raw sensor (e.g., such as an accelerometer) or a virtual sensor (e.g., a construct that derives measurements based on measurements collected from one or more sensors including the accelerometer or separate from the accelerometer). Thus, both hardware and software can be components of the sensor. The sensor may indicate when the mobile device has moved or is moving more than a threshold amount. In some instances, the sensor may be used to detect an occurrence of an event. For example, the notification from the sensor may be analyzed in conjunction with accelerometer measurements to detect the occurrence of an event, may trigger a process in which other sensors or activity data is used to determine whether the user is engaging in behavior of interest, such as driving, or the like.

Examples of events include, but are not limited to walking, running, cycling, driving, flying, or the like. For example, the sensor may be used to determine when the mobile device is positioned within a moving vehicle so that the mobile device may capture sensor measurements that correspond to the drive. In some instances, the sensor may then disable itself for a predetermined time interval after detecting significant motion to prevent duplicate indications of the event. In some examples, once a notification that indicates that significant motion of the mobile device has occurred, data from one or more sensors may be analyzed to determine whether the motion of the mobile device (and corresponding user behavior) correlates with one or more events as discussed above. Thus, the notification based on significant motion can be utilized to initiate one or more analysis processes in addition to being used as a trigger to collect sensor data. One of ordinary skill in the art would recognize many variations, modifications, and alternatives.

At block 1608, process 1600 involves executing a data collection application in response to receiving the notification. The data collection application may be configured to execute over a predetermined time interval to collect sensor measurements. For instance, the predetermined time interval may begin upon receiving the notification and end when the measurements from the sensor associated with the notification of a significant motion event or any other sensor of the mobile device indicate that the mobile device is stationary for a threshold time interval.

At block 1612, process 1600 involves receiving, by the data collection application, a first set of sensor measurements from at least one sensor of the mobile device. The first set of sensor measurements may correspond to sensor measurements collected over the predetermined time interval. While collecting the set of sensor measurements, the data collection application and/or another process of the mobile device may be configured to detect a secondary event. The secondary event may be an event that increases or decreases the likelihood that a drive or other user behavior of interest is occurring. For instance, the secondary event may indicate that the notification generated as a result of an indication from the sensor was a false positive (e.g., the sensor indicated that the mobile device is in a moving vehicle when the mobile device is not). The secondary event may include, but is not limited to, crossing a geofence, detecting sensor measurements from other sensors that are greater than a threshold, user input, a notification, a GPS sensor, combinations thereof, and the like.

As an example, detecting that a geofence has been crossed may increase or decrease the likelihood that the notification generated as a result of an indication from the sensor was a false positive (indicating that the mobile device is more likely to be in a vehicle during a drive or less likely to be in a vehicle during a drive respectively). If the geofence is crossed, then it may be more likely that the notification generated as a result of an indication from the sensor is correct. If the geofence has not been crossed, then it may be more likely that the notification generated as a result of an indication from the sensor is a false positive. Although some examples are discussed in relation to a drive, this is not required and the data collection process and sensor data obtained thereby can be utilized independent of a detected drive. As an example, if the sensor detects significant motion, data collection can be initiated and/or historical data can be accessed to detect a crash despite the fact that no drive had been previously detected. Thus, examples of the present invention are not limited to the context of a detected driving event.

If the secondary event indicates that the notification generated as a result of an indication from the sensor was a false positive, then the data collection application may delete the set of sensor measurements and terminate. The data collection application may be executed again upon receiving a new notification from the sensor. Alternatively, the data collection application may request confirmation (e.g., via a notification to a user, user input, a user interface displayed to the user, or the like) that the trip is or is not occurring. If the drive is occurring, the process continues to block 1616. If the drive is not occurring, the data collection application may delete the set of sensor measurements and terminate.

In addition to receiving the first set of sensor measurements, historical data can additionally be accessed after receipt of the notification. As an example, referring to FIG. 15, sensor measurements stored in a sensor cache may be accessed and used to supplement the first set of sensor measurements. Accordingly, examples of the present invention enable the acquisition and use of not only data collected after receipt of the notification, but also of historical data collected prior to receipt of the notification, using the methods and systems described in relation to FIG. 15.

At block 1616, process 1600 involves transmitting the first set of sensor measurements to a server by the data collection application. In some instances, the data collection application may continuously transmit collected sensor measurements to the server (e.g., in a stream or in regular intervals). In other instances, the data collection application may wait until sensor measurements are no longer being collected (e.g., after the drive has concluded), then transmit the set of sensor measurements to the server. As discussed in relation to FIG. 15, in some examples, the set of sensor measurements can be processed before transmission of the sensor measurements, metadata associated with the sensor measurements, down sampled data based on the sensor measurements, or the like. In some instances, the data collection application may detect one or more events from the set of sensor measurements. The one or more events include, but are not limited to, hard braking, aggressive driving (e.g., frequency changes in acceleration that are greater than a threshold), distracted driving, swerving, speeding, mobile phone use, other driving behaviors, combinations thereof, and the like. In those instances, the data collection application may transmit an identification of the event and a timestamp indicative of when the event occurred. The data collection application may transmit the one or more events in addition to the set of sensor measurements or in place of the set of sensor measurements. For example, transmitting the one or more events in place of the set of sensor measurements may significantly reduce the amount of data that is transmitted to the server (e.g., reducing network usage). Once the set of sensor measurements (and/or the one or more events) is transmitted to the server, the data collection application terminates. The data collection application may be executed again upon receiving a new notification from the sensor (returning to block 1604 of the process).

It should be appreciated that the specific steps illustrated in FIG. 16 provide a particular method for collecting sensor measurements based on a sensor of the mobile device according to an embodiment of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
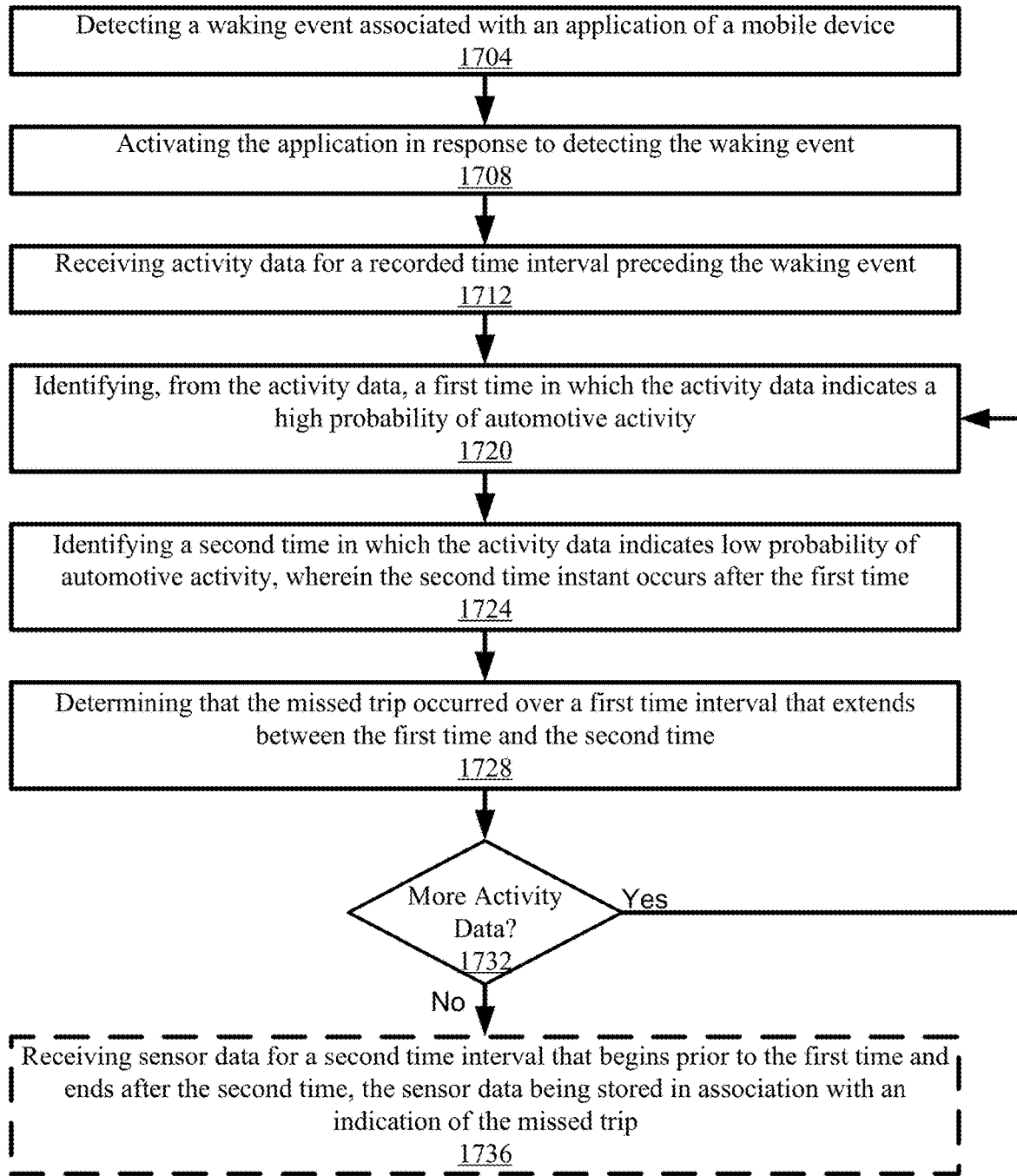
FIG. 17 is an exemplary process for detecting a missed drive from cached data according to some embodiments.

FIG. 17 is an exemplary process 1700 for detecting a missed drive from cached data according to some embodiments. At block 1704, a waking event associated with an application (e.g., such as a data collection application as previously described) of a mobile device is detected. The waking event is detected while the application is not executing (e.g., terminated or otherwise not loaded into memory) or is in a suspended state (e.g., process threads of the application are paused). In some instances, a background process of the application monitors events of the mobile device to detect the waking event. The background process may be the only portion of the application that may be executing. In other instances, the application registers with a monitoring application executing on the mobile device or the operating system of the mobile device to detect particular events when the application is not executing or is suspended.

The waking event may be any predetermined event detectable by the application, monitoring application, and/or operating system. For example, the application may generate a geo-fence that triggers the waking event when the geofence is crossed by the mobile device. A geo-fence may be a virtual perimeter of any size that surrounds the mobile device or any other point of interest. Other waking events can include, but are not limited to, detection that the mobile device is exceeding a speed threshold (e.g., a threshold that indicates the mobile device is positioned in a moving vehicle), expiration of a timer, a predetermined time, detection of a vibration exceeding a threshold, detection of a magnetometer value exceeding a threshold, receiving a notification, detecting proximity to a particular location or entity (e.g., a building, a residence, a particular location of a business such as a particular coffee shop, any location of the business such as any coffee shop owned by the business, a location of interest to a user associated with the mobile device, or the like), or the like.

At block 1708, the background process (or the process that detected the waking event) triggers activation of the application in response to detecting the waking event. Activating the application can include executing the application or causing the application to return from a suspended state (e.g., threads of the application resume active execution). In some instances, the application may request passive collection of sensor data from the operating system for a recorded time interval. The operating system collects and caches sensor data using some or all of the sensors of the mobile device while applications are not executing. The operating system may collect and cache the sensor data for the recorded time interval after a request is made. This enables the application to obtain some sensor data while the application is not executing or is suspended. The next time the application executes or returns from suspension, the application may request the data collected over the recorded time interval. In some instances, the operating system may only collect data from a subset of available sensors. For example, the operating system may collect sensor data from sensors that are inaccessible to other data collection applications (e.g., reserved for the operating system and other system processes). In some instances, the operating system may limit the sampling rate of the sensor data collection. For example, the sampling rate of the sensor data collection may be fixed by the operating system. Alternatively, the sampling rate may be adjustable up to a limit defined by the operating system.

If the waking event corresponds to the beginning of a drive (e.g., the geo-fence was crossed, sensor data indicates the mobile device is positioned in a moving vehicle, user input, or the like), the application begins collecting sensor data, such as inertial measurement sensor data from sensor data block 108 of FIG. 1, for the current drive. In some instances, the waking event may not be detected until after the drive starts. For instance, there may be delay between when the drive begins and when sufficient sensor data can be collected to indicate that the waking event has occurred. In those instances, the application may request sensor data collected and cached by the operating system over a previous time interval that preceded the waking event. The previous time interval may be included in a recorded time interval that was previously requested by the application.

For instance, the application may request sensor data for a ten minute time interval that immediately preceded the waking event. The application may request any sensor data collected during a time interval that immediately precedes the waking event. In some instances, the time interval may be dynamically selected (e.g., at the time in which the waking event is detected) based at least in part on sensor data received at or immediately after the waking event. For instance, if the sensor data indicates the vehicle has been driving for a while (e.g., is already driving at high speed, is already a predetermined distance from a starting point or the geo-fence, or the like), then the application may increase the length of the time interval to ensure the entire drive is captured. The length of the time interval may be dynamically determined using current sensor data and/or previous active or missed trips. For instance, previous trips may be used to determine if the application should increase the length of the time interval. The previous trips may be previous trips captured or detected by the mobile device or by other mobile devices. The other mobile devices may be similar mobile devices (e.g., being of a same class of devices, having a same operating system, having similar hardware, etc.). The application may continue to capture sensor data until it is determined that the drive has terminated (e.g., the sensor data indicates that the mobile device is not moving in a vehicle for a duration that exceeds a threshold).

At block 1712, the application receives activity data for a recorded time interval preceding the waking event. The activity data may include activity data that was detected during a time interval that was previously requested by the application. The activity data includes a probability (e.g., a confidence) of an activity associated with the mobile device (e.g., that a user of the mobile device is performing an activity). In some instances, the activity data may include multiple probabilities, one for each activity. In other instances, the activity data may include the activity with the highest probability. Examples of such activities include, but are not limited to, stationary, walking, running, a drive, cycling, flying, and the like. A drive can include multiple activities such as operating a vehicle, being a passenger in a vehicle, or the like.

In some instances, the activity data may be pushed to the application every time a currently predicted activity changes. For instance, the application may receive first activity data indicating a first activity. The application may then receive second activity data when a different activity compared to the first activity is detected. The time interval between receiving the first activity and the second activity corresponds to an amount of time of the first activity. For example, first activity data is received indicating an activity of walking. Thirty minutes later, activity data is received indicating an activity of stationary. The application may determine that the mobile device was located with a user who was walking for thirty minutes. In other instances, the activity data may be polled such that a probability of an activity may be determined at regular predetermined time intervals within the recorded time interval such as, but not limited to, every fifteen minutes, thirty minutes, hour, two hours, or the like. For instance, the application may transmit a request for activity every predetermined time interval.

At block 1720, the application identifies a first time in which the activity data indicates a high probability of automotive activity. The first time may be the earliest time in which an activity of a drive occurs with a probability that exceeds a threshold (e.g., a high probability of automotive activity as compared to a medium or low probability of automotive activity). In some instances, the activity detection engine identifies the earliest time of any automotive activity (e.g., a medium or low probability of automotive activity). In some instances, the application may use the activity data to identify activities and their probabilities for determining the first time. In other instances, the application may use the activity data to identify an activity (without corresponding probability) for determining the first time.

At block 1724, the application identifies a second time after the first time in which the activity data indicates a low probability of automotive activity. The second time may be the earliest time after the first time in which an activity other than a drive is indicated. For example, the second time may indicate a high probability of walking, or being stationary. In some instances, the second time may correspond to an activity that can include a drive, provided that the probability of driving does not exceed the threshold. In some instances, the application may use the activity data to identify activities and their probabilities for determining the second time. In those instances, the application may use the activities and their corresponding probabilities to determine that the drive (or any particular activity) is continuing. In other instances, the application may use the activity data to identify an activity (without corresponding probability) for determining the second time.

At block 1728, the application determines that a missed drive has occurred over a first time interval that includes the first time and the second time. For example, an activity detection engine may determine, based at least in part on the activity data at the first time (e.g., driving activity) and the activity data at the second time (e.g., walking activity), that there was a missed drive during the period of time between the first time and the second time.

At block 1732, the application determines if there is more activity data to analyze for missed trips over the recorded time interval. If there is more activity data to analyze, then the process may return to block 1720 to determine if there is another missed drive provided that a threshold portion of the recorded time interval remains to be analyzed. For example, if the second time is less than the waking time, then it may be determined that there is more activity data to analyze for possible missed trips. In some instances, the process may simply continue to block 1736 after determining that a first missed drive has occurred. The processes of block 1720 through block 1732 may repeat until all possible missed drives have been detected.

At block 1736, the application optionally receives, in response to detecting the missed drive, sensor data collected and cached by the operating system (or another application) of the mobile device over a second time interval. The sensor data may be stored in association with an indication of the missed trip. The second time interval may be larger than the first time interval to account for delays in the detection of activities in the activity data. A delay between an activity occurring and the mobile device identifying that the activity is occurring may cause some sensor data associated with the activity to be lost. For instance, if a drive begins a few minutes prior to the mobile device indicating a high probability that a drive is occurring or that there is automotive activity, the application may not obtain all of the sensor data that corresponds to the drive (e.g., the first few minutes of the drive prior to the first time). The second time interval may include a third time that is prior to the first time and a fourth time that is equal to or later than the second time. In some instances, the third time may be ten minutes prior to the first time and the fourth time may be ten minutes after the second time. The application may dynamically determine the third time and the fourth time.

The sensor data over the second time interval may be used to analyze characteristics of the drive such as user behavior, vehicle collisions, drive events, user ratings such as driver ratings, or the like. The sensor data may be analyzed according to the processes described in any of the applications or patents incorporated herein by reference or for any purpose as described in any of the applications or patents incorporated herein by reference. The data may be analyzed by the mobile device or transmitted to a server for analysis.

For example, the sensor data may be analyzed to generate one or more speed predictions of the vehicle over the missed drive. One or more sensor signals (e.g., discrete sensor measurements) may be generated from the sensor data. Statistical features may be extracted from the sensor signals and passed as input into a machine-learning model. The machine-learning model may predict, using the statistical features, a speed of at a particular time during the missed trip.

The sensor data may also be used to determine a route of the vehicle over the missed trip. The application may determine a first location as corresponding to a location of the mobile device at the termination of a previous trip (e.g., the trip preceding the missed trip) and second location as the location of the mobile device at the waking event. The sensor data may be used to determine visit data for one or more visits during the missed trip. A visit may be a notification from the operating system indicating that the mobile device is located at a location (e.g., an establishment or the like) for longer than a threshold time interval. The visit data may be determined from GPS data that may be correlated with a map and/or user information. The application may then reconstruct a route of the vehicle during the missed trip that begins at the first location, extends along the one or more visits, and ends at the second location.

It should be appreciated that the specific steps illustrated in FIG. 17 provide a particular method for detecting a missed drive from cached data according to an embodiment of the present invention. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 18:
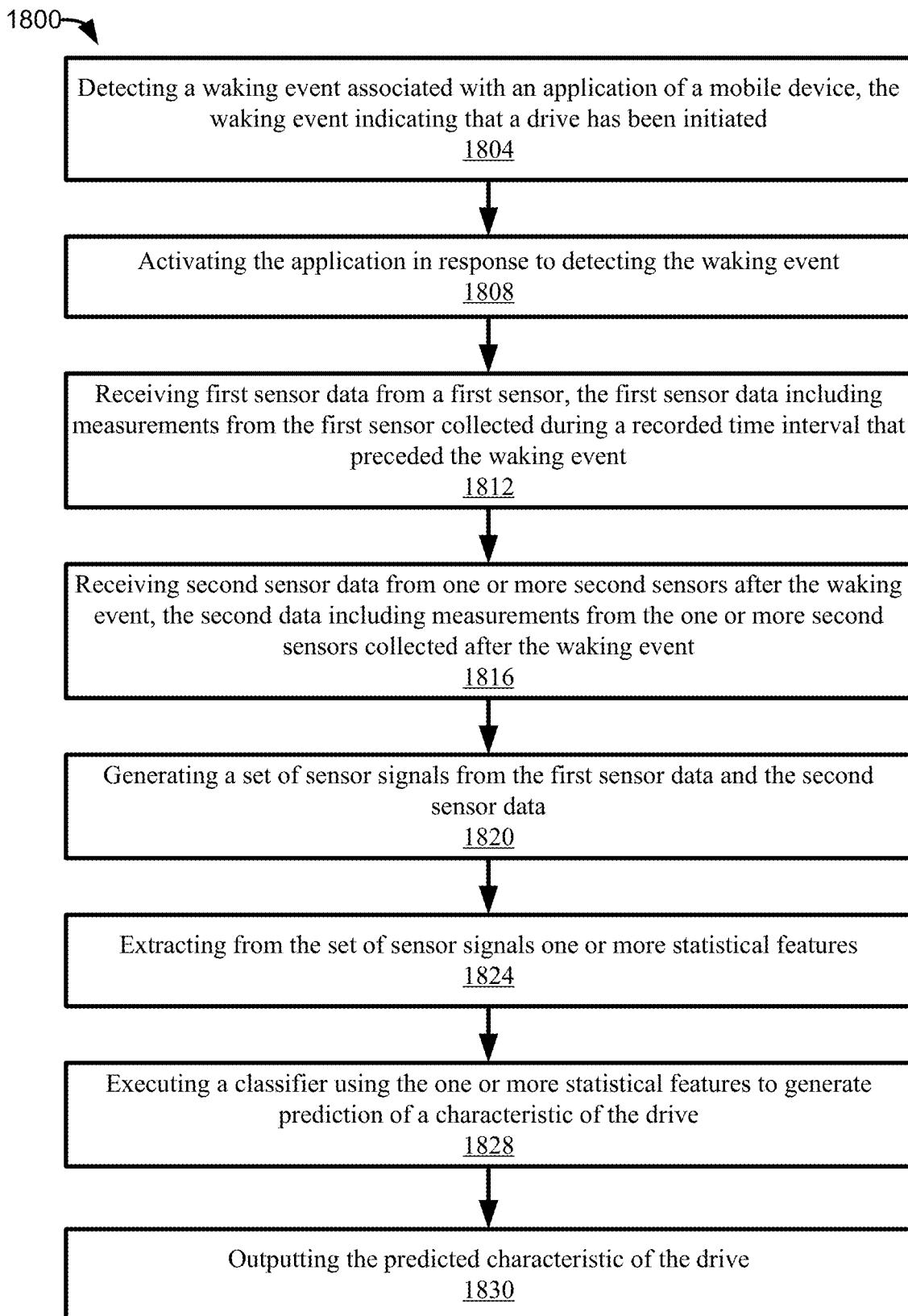
FIG. 18 is an exemplary process for detecting characteristics of a vehicle from cached data according to some embodiments.

FIG. 18 is an exemplary process 1800 for predicting characteristics of a drive from cached data according to some embodiments. At block 1804, a waking event associated with an application (e.g., such as a data collection application as previously described) of a mobile device is detected. The waking event is detected while the application is not executing (e.g., terminated or otherwise not loaded into memory) or is in a suspended state (e.g., process threads of the application are paused). In some instances, a background process of the application monitors events of the mobile device to detect the waking event. The background process may be the only portion of the application that may be executing. In other instances, the application registers with a monitoring application executing on the mobile device or the operating system of the mobile device to detect particular events when the application is not executing or is suspended.

The waking event may be any predetermined event detectable by the application, monitoring application, and/or operating system. For example, the application may generate a geo-fence that triggers the waking event when the geofence is crossed by the mobile device. A geo-fence may be a virtual perimeter of any size that surrounds the mobile device or any other point of interest. Other waking events can include, but are not limited to, detection that the mobile device is exceeding a speed threshold (e.g., a threshold that indicates the mobile device is positioned in a moving vehicle), expiration of a timer, a predetermined time, detection of a vibration exceeding a threshold, detection of a magnetometer value exceeding a threshold, receiving a notification, detecting proximity to a particular location or entity (e.g., a building, a residence, a particular location of a business such as a particular coffee shop, any location of the business such as any coffee shop owned by the business, a location of interest to a user associated with the mobile device, or the like), or the like. Some or all of these waking events may correspond to the initiation of a drive. For instance, the mobile device may be positioned within a vehicle. When the vehicle begins to move (e.g., as the drive begins), a monitoring application (e.g., such as an operating system of the mobile device or the like) detects the movement and triggers the waking event.

At block 1808, a background process (or the process that detected the waking event) triggers activation of the application. Activating the application can include executing the application or causing the application to return from a suspended state (e.g., threads of the application resume active execution). In some instances, the application may request passive collection of sensor data from the operating system for a recorded time interval. The operating system collects and caches sensor data using some or all of the sensors of the mobile device while applications are not executing. The operating system may collect and cache the sensor data for the recorded time interval after a request is made. This enables the application to obtain some sensor data while the application is not executing or is suspended. The next time the application executes or returns from suspension, the application may request the data collected over the recorded time interval. In some instances, the operating system may only collect data from a subset of available sensors. For example, the operating system may collect sensor data from sensors that are inaccessible to other data collection applications (e.g., reserved for the operating system and other system processes). In some instances, the operating system may limit the sampling rate of the sensor data collection. For example, the sampling rate of the sensor data collection may be fixed by the operating system. Alternatively, the sampling rate may be adjustable up to a limit defined by the operating system.

If the waking event corresponds to the beginning of a drive (e.g., the geo-fence was crossed, sensor data indicates the mobile device is positioned in a moving vehicle, user input, or the like), the application begins collecting sensor data, such as IMU sensor data from sensor data block 108 of FIG. 1 for the current drive. In some instances, the waking event may not be detected until after the drive starts. For instance, there may be delay between when the drive begins and when sensor data can be collected to indicate that the waking event has occurred. In those instances, the application may request sensor data collected and cached by the operating system over a previous time interval that preceded the waking event. The previous time interval may be included in a recorded time interval that was previously requested by the application.

For instance, the application may request sensor data for a ten minute time interval that immediately preceded the waking event. The application may request any sensor data collected during a time interval that immediately precedes the waking event. In some instances, the time interval may be dynamically selected (e.g., at the time in which the waking event is detected) based at least in part on sensor data received at or immediately after the waking event. For instance, if the sensor data indicates the vehicle has been driving for a while (e.g., is already driving at high speed, is already a predetermined distance from a starting point or the geo-fence, or the like), then the application may increase the length of the time interval to ensure the entire drive is captured. The length of the time interval may be dynamically determined using current sensor data and/or previous active or missed trips. For instance, previous trips may be used to determine if the application should increase the length of the time interval. The previous trips may be previous trips captured or detected by the mobile device or by other mobile devices. The other mobile devices may be similar mobile devices (e.g., being of a same class of devices, having a same operating system, having similar hardware, etc.). The application may continue to capture sensor data until it is determined that the drive has terminated (e.g., the sensor data indicates that the mobile device is not moving in a vehicle for a duration that exceeds a threshold).

At block 1812, the application receives first sensor data from a first sensor of the mobile device. The first sensor data may include measurements from the first sensor collected during a recorded time interval that preceded the waking event. The application may request sensor data from a passive data collection process such as another application of the mobile device or an operating system of the mobile device. For example, the passive data collection process may collect sensor data from the first sensor while the application is not executing or is suspended. In response to the waking event, the application may request the sensor data collected while the application was not executing. The first sensor may be a sensor that is inaccessible to the application, such as sensors reserved for system processes of the operating system. The first sensor may include any of the sensors of sensor data block 108 of FIG. 1. For example, the first sensor may include one or more of a GPS receiver, an accelerometer controlled by an operating system of a mobile device, a magnetometer, a gyroscope, a microphone, a compass, and/or a barometer. In some instances, the sampling rate of the first sensor may be limited to a predetermined sampling rate set by the data collection process. For example, the sampling rate of the sensor data collection may be fixed by the operating system. Alternatively, the sampling rate may be adjustable up to a limit defined by the operating system.

At block 1816, the application receives sensor data from one or more second sensors of the mobile device after the waking event including sensor measurements from the one or more second sensors collected after the waking event. The one or more second sensors may include the first sensor if the first sensor is accessible to the application. The one or more second sensors may include any of the sensors of sensor data block 108 of FIG. 1. For example, the one or more second sensors may include any combination of a GPS receiver, an accelerometer controlled by an operating system, a magnetometer, a gyroscope, a microphone, a compass, and/or a barometer. The application may continue to collect measurements from the one or more second sensors until the sensors indicate that the drive has terminated.

At block 1820, a set of sensor signals are generated from the first sensor data and the second sensor data. The first sensor data and the second sensor data may be processed by, for example, filtering the first sensor data and/or the second sensor data to remove outlier sensor data and noise. The remaining first sensor data and/or the second sensor data may be normalized (e.g., by averaging, weighting function, etc.). The normalized sensor data may then be converted to a frequency domain (e.g., through a Fourier transform, an infinite impulse response, or the like) to form the set of sensor signals.

At block 1824, one or more statistical features may be extracted from the set of sensors or a subset of sensors. Statistical features may include, for example, median, variance, and maximum values from sensors such as an accelerometer controlled by an operating system, a gyroscope, and/or a magnetometer. The one or more statistical features may correspond to characteristics that can be observed from the set of sensor signals. For example, the one or more statistical features may correspond to characteristics of the drive. Characteristics of a drive may include detecting a vehicle collision, a speed of the vehicle, a location of the vehicle, an operating condition of the vehicle (e.g., whether the vehicle is safe to drive), hard acceleration or declaration (e.g., hard braking), driver behavior, distracted driving, or the like.

At block 1828, the application executes a classifier using the one or more statistical features. The classifier may be a machine-learning model trained to generate a prediction of a characteristic of the drive. The classifier and/or machine-learning model may be trained using features extracted from training data of a large number of driving trips. The generated prediction of the characteristics of the drive may include, but are not limited to, detecting a vehicle collision, a speed of the vehicle, a location of the vehicle, an operating condition of the vehicle (e.g., whether the vehicle is safe to drive), hard acceleration or declaration (e.g., hard braking), driver behavior, distracted driving, or the like.

At block 1830, the application may then output the predicted characteristic of the drive. In some instances, outputting the predicted characteristic may include transmitting the predicted characteristic to another computing device such as a server. In other instances, outputting the predicted characteristic includes generating a graphical user interface that includes a representation of the predicted characteristic. The graphical user interface may include a representation of a baseline value for the predicted characteristic and if there is a significant deviation between the predicted characteristic and the baseline value, the graphical user interface may provide an alert such as visual (and our audible) indication that the predicted characteristic exceeds a standard (e.g., such as a safety standard, road conditions, legal standards such as a speed limit, or the like).

The processes of block 1816 through block 1830 may occur in real time as the measurements from the one or more sensors are collected by the application. The application may use a sliding window that generates a set of sensor signals using the measurements from the one or more second sensors collected during the sliding window. The sliding window may be of any predetermined time interval (e.g., such as 15 seconds, thirty seconds, etc.). For example, for a sliding window of 15 seconds, at a discrete time zero (when the waking event is detected), the sliding window includes measurements collected from the one or more sensors from minus 15 seconds to discrete time zero. The next discrete time (e.g., such as the next second), the sliding window includes measurements collected from the one or more sensors from minus 14 seconds to time plus 1 second. The sliding window may be incremented according to any predetermined time value such as every second (as previously described), 5 seconds, 15 seconds, etc., thereby generating a new set of sensor signals (e.g., discrete sensor measurements) from the measurements over each subsequent sliding window (e.g., at regular intervals according to the predetermined time value) and a new predictions of the characteristic using each new set of sensor signals. This process may continue for a predetermined time interval, until a prediction exceeds a threshold, or until the drive terminates.

The sensor may also be used to determine a route of the vehicle during the drive. The application may determine a first location as corresponding to a location of the mobile device at the termination of a previous trip (e.g., the trip preceding the drive) and a second location as the location of the mobile device at the end of the drive. The sensor data may be used to determine visit data for one or more visits during the drive. A visit may be a notification from the operating system indicating that the mobile device is located at a location (e.g., an establishment or the like) for longer than a threshold time interval. The visit data may be determined from GPS data that may be correlated with a map and/or user information. The application may then reconstruct a route of the vehicle during the drive that begins at the first location, extends along the one or more visits, and ends at the second location.

It should be appreciated that the specific steps illustrated in FIG. 18 provide a particular method of predicting characteristics of a drive from cached data according to an embodiment of the present invention. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

In the following example, a sliding window that is seventy-two hours in length is used and a predetermined time interval of twelve hours is used. It should be noted that embodiments of the present invention are not limited to these specific exemplary values. When the data collection application executes (or returns from suspension), the data collection application may generate a first request that the operating system collect and cache sensor measurements for a predetermined time interview, for example, the next twelve hours. In response, the operating system will begin collecting and caching sensor measurements.

Figure 19:
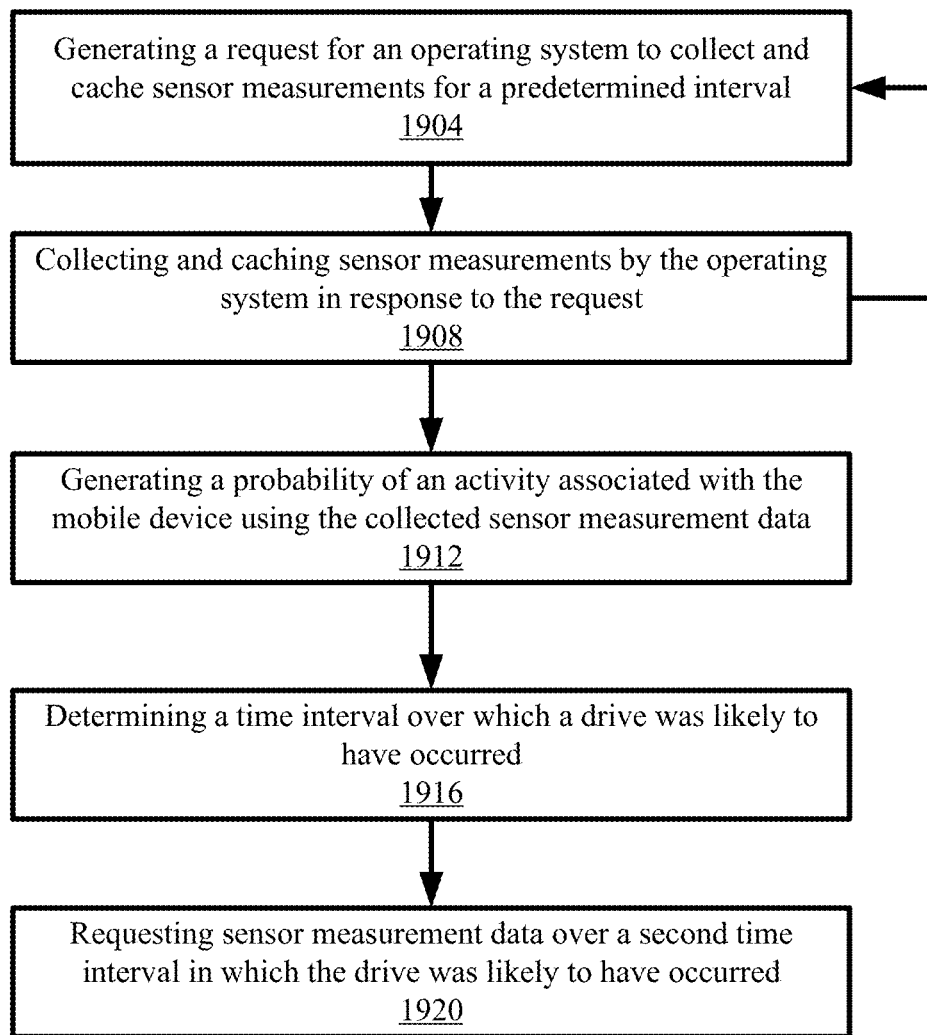
FIG. 19 is an exemplary process for collecting and caching sensor measurements used in detecting a missed drive according to some embodiments.

FIG. 19 is an exemplary process 1900 for collecting and caching sensor measurements used in detecting a missed drive according to some embodiments. At block 1904, a request is generated by an application for an operating system to collect and cache sensor measurements for a predetermined time interval. The request may be generated by a data collection application of a mobile device and sent to the operating system of the mobile device. The data collection application may generate the request in response to a waking event, such as the expiration of a timer or at a predetermined time. Prior to generating the request, and/or before the waking event, the data collection application may be in a suspended state. When the data collection application executes again (e.g., returns from suspension), the data collection application may generate the request to the operating system to collect and cache sensor measurements over the predetermined time interval. The predetermined time interval may be any amount of time in the future. For example, the predetermined time interval may extend 3 hours, 6 hours, 12, hours, 72 hours, or another period into the future. The predetermined time interval may be limited by the operating system. For example, the operating system may limit requests to collect and cache sensor measurement data for up to the next 12 hours, 6 hours, 3 hours, or fewer hours. After generating the request, the data collection application may then perform any intended operations that were the reason for its execution (or return from suspension) or terminate (or return to a suspended state).

At block 1908, the operating system collects and caches sensor measurements in response to the request. The operating system of the mobile device may collect and cache sensor measurements from some or all of the sensors of the mobile device. For example, the operating system may collect sensor data from one or more of the sensors of sensor data block 108, such as global positioning system (GPS) receiver 112, accelerometer 116, magnetometer 120, gyroscope 124, microphone 128, external (sensor) device 132, compass 136, and/or barometer 140. In some instances, the operating system may only collect data from a subset of available sensors. For example, the operating system may collect sensor data from sensors that are inaccessible to other data collection applications (e.g., reserved for the operating system and other system processes). In some instances, the operating system may limit the sampling rate of the sensor data collection. For example, the sampling rate of the sensor data collection may be fixed by the operating system. Alternatively, the sampling rate may be adjustable up to a limit defined by the operating system.

In some embodiments, process 1900 proceeds by repeating block 1904 and block 1908. Block 1904 and block 1908 may be repeated any number of times and may be performed in parallel with the remainder of process 1900. For example, at the termination of the predetermined time interval, the data collection application may execute (or return from suspension) and generate a subsequent request to the operating system for collection and caching of sensor data for a subsequent predetermined time interval. The subsequent predetermined time interval may be the same length as the first predetermined time interval or it may be shorter or longer as necessary. In some instances, the data collection application may be executed before the termination of the predetermined time interval. In that instance, the application may generate the subsequent request to the operating system for collection and caching of sensor measurement data for a predetermined time interval that begins at the time of the second request (rather than at the termination of the previous predetermined time interval).

This process may be repeated such that the operating system caches up to a maximum amount of cached sensor measurement data. In some instances, the maximum amount of cached sensor measurement data is determined by the operating system. For example, the operating system may limit the amount of cached data due to memory constraints. As another example, the application may limit the amount of cached sensor measurement data to a sliding window, such as an immediately preceding time interval of a predetermined length. The sliding window may include the preceding twenty-four hours, forty-eight hours, seventy-two hours, ninety-six hours, or any predetermined time interval.

The data collection application may continue to make requests for collection and caching of sensor measurements even when the cache includes sensor measurements over the complete sliding window. In this case, the oldest sensor measurements (e.g., sensor measurements older than the beginning of the sliding window to the present time) may be discarded as new sensor measurements are stored in the cache. Sensor measurements may be continually discarded as new sensor measurements are continually cached over the next requested time interval. With back-to-back requests by the data collection application, the data collection application may cause the operating system to perpetually cache the preceding sensor measurement data for the predetermined time interval of the sliding window.

In some instances, applications of mobile device 104, including components of mobile device 104, may request data collection by the operating system while applications of the mobile device are suspended or not executing. The operating system may collect sensor measurements over a predetermined time interval. For instance, an application may request sensor measurements from the operating system for up to twelve hours after the application is suspended or terminated. When the application is executed again, the application may request access to the sensor measurements collected by the operating system while the application was suspended or terminated.

The data collection application may access the cached sensor measurements over the entire sliding window (e.g., seventy-two hours) based on the combination of requests, even though the data collection application may be limited to sending requests for data collection and caching over smaller time intervals (e.g., twelve hours). If the data collection application sends a first request (at the zero hour mark) for twelve hours of sensor measurements, when the data collection application executes (or returns from suspension) twelve hours later, the operating system will have collected and cached twelve hours of sensor measurements that the data collection application may access). When the data collection application sends a second request to the operating system (at the twelve hour mark) for another twelve hours of sensor measurement caching, the operating system continues to collect and cache sensor measurements for the next twelve hours. When the data collection application executes twelve hours later (e.g., now at the twenty-four hour mark), the data collection application may now access twenty-four hours of sensor data even though the data collection application may only request that the operating system collect and cache sensor measurements for the next twelve hours.

At block 1912, an application generates a probability of an activity associated with the mobile device using the collected sensor measurement data. For instance, an activity detection engine, such as activity detection engine 232 as described above in relation to FIG. 2, detects when the mobile device is stationary, with a user who is walking, with a user who is running, in a vehicle that is driving, in a vehicle that is flying, and the like. In some instances, the activity detection engine outputs a probability of the activity. In those instances, the activity detection engine may output more than one probability such as a 45% probability that the mobile device is walking and a 33% probability that the mobile device is driving, and 22% probability of some other activity. The probability may be expressed as an integer or real number, a percentage, a grade (such as a low, medium, or high), or in another mechanism configured to represent the probability of a given activity. In some instances, this may be performed by the operating system itself. For instance, the operating system may output a probability that the mobile device is stationary, walking, running, driving, flying, or the like.

At block 1916, the activity data is used to determine a time interval over which a drive was likely to have occurred. For instance, an activity detection engine, such as activity detection engine 232 as described above in relation to FIG. 2, may analyze the activity data and identify a first time when the activity indicates a high probability of automotive activity, such as when the mobile device is in a car that is driving. The activity detection engine may then identify a second time after the first time in which there is a high probability of another activity occurring (e.g., stationary, walking, etc.). The activity detection engine may then define a drive as occurring from the first time to the second time. This time interval may coincide with when a data collection application was suspended or terminated.

In some embodiments, the sensor data collected by the operating system may be added to any sensor data collected by the data collection application. For example, activity detection engine 232 can detect that mobile device 104 crossed a geofence and initiates execution of a data collection application to begin collection of sensor measurements such as IMU sensors. The data collection application can then request sensor data from the operating system for a time interval prior to when the mobile device crossed the geofence. This enables the mobile device 104 to capture sensor measurements over the entire duration of the drive despite the application executing and beginning collecting sensor measurements a few minutes into the drive.

At block 1920, sensor data over a second time interval in which the drive was likely to have occurred is requested by an application. The second time interval may be larger than the first time interval to account for delays in the detection of activities in the activity data. In some instances, there may be a delay between when the drive begins and when the operating system or another application detects that a drive activity is occurring or occurred. Similarly, there may be delay between when the drive ends and the operating system or other application detects that the drive ended. To ensure that sensor data for the entire trip is collected, a data collection application may request the sensor data over a second (larger) time interval that begins prior to the first time interval (e.g., one minute, five minutes, ten minutes, or the like before the first time interval begins) and ends after the first time interval (e.g., one minute, five minutes, ten minutes, or the like after the first time interval ends).

It should be appreciated that the specific steps illustrated in FIG. 19 provide a particular method of collecting and caching sensor measurements used in detecting a missed drive according to an embodiment of the present invention. Other sequences of steps may also be performed according to alternative embodiments. For example, alternative embodiments of the present invention may perform the steps outlined above in a different order. Moreover, the individual steps illustrated in FIG. 19 may include multiple sub-steps that may be performed in various sequences as appropriate to the individual step. Furthermore, additional steps may be added or removed depending on the particular applications. One of ordinary skill in the art would recognize many variations, modifications, and alternatives.

Example Techniques for Vehicle Speed Estimation

Figure 20:
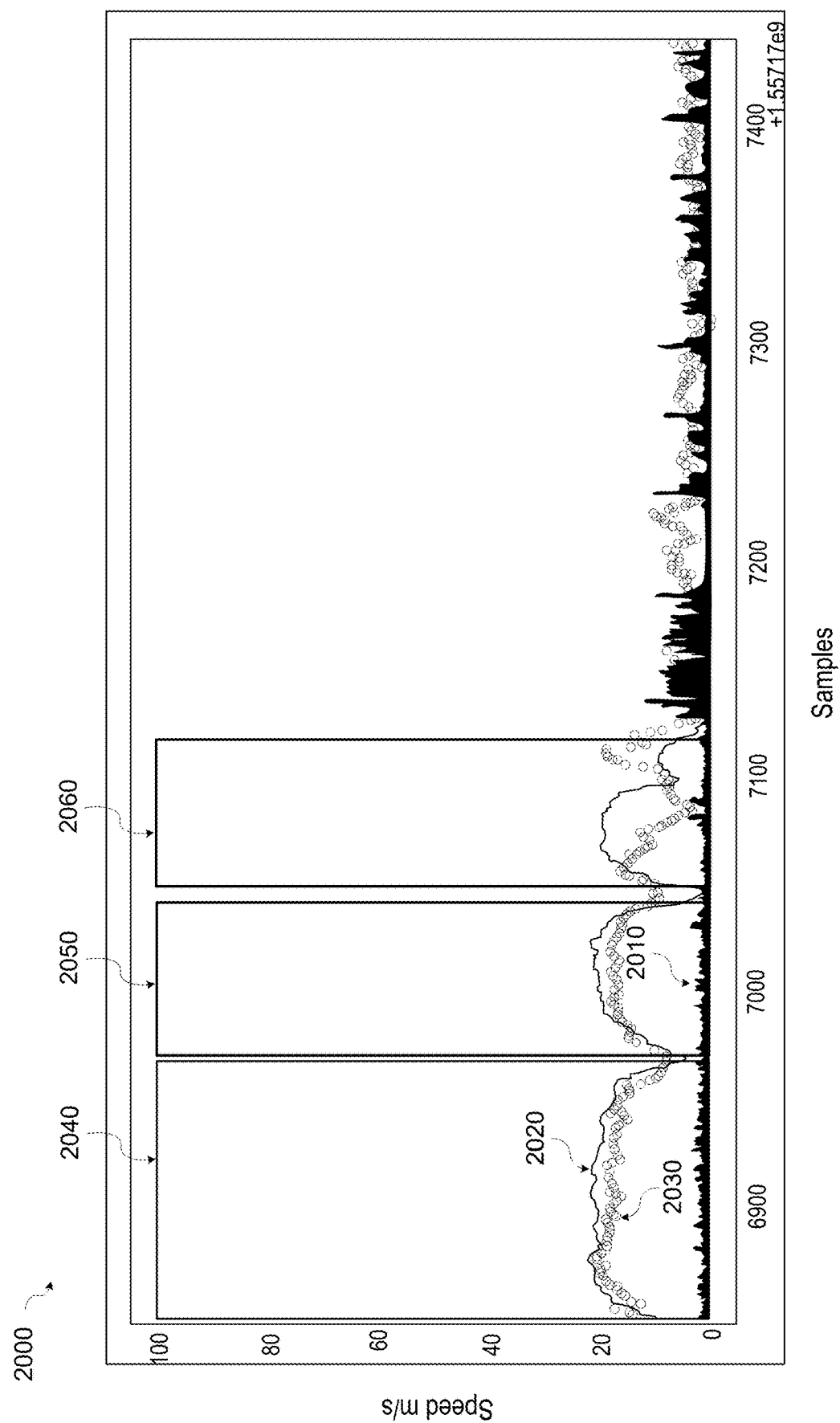
FIG. 20 is a plot illustrating an example of vehicle speed prediction by a classifier using features extracted from IMU signals sampled at 9 Hz according to various aspects of the present disclosure.

FIG. 20 is a plot 2000 illustrating an example of vehicle speed prediction by a classifier using features extracted from IMU signals sampled at 9 Hz according to aspects of the present disclosure. The vehicle speed prediction outputs can support the operations of missing route determination engine 234. FIG. 20 shows accelerometer data 2010 using user acceleration (i.e., with the gravity component of acceleration removed) and GPS vehicle speed data 2020 for a trip, as well as predicted vehicle speed 2030 generated by the classifier. The IMU signals, in particular accelerometer and gyroscope (not shown) signals, were sampled at a sampling rate of 9 Hz, and forward-backward bandpass filtered with an IIR filter using 14 equally spaced frequency bands from 0.2 Hz to 4.5 Hz. The statistical feature (e.g., median, variance, and maximum values) were extracted from the filtered signals over three window sizes (20 seconds 2040, 10 seconds 2050, 5 seconds 2060) and input to the classifier. As can be seen in FIG. 20, the predicted vehicle speed 2030 generated by the classifier approximates the GPS vehicle speed data 2020.

Figure 21:
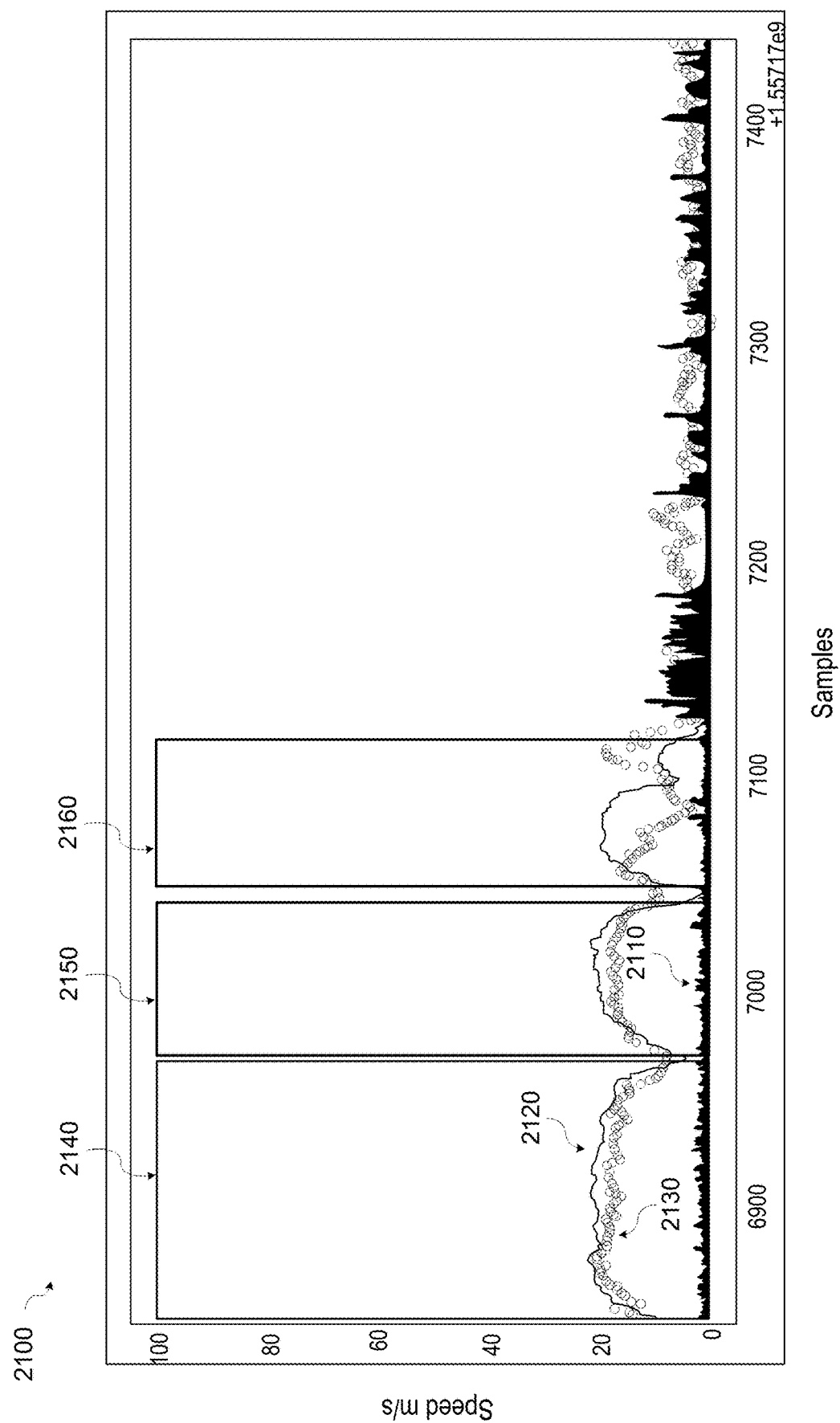
FIGS. 21 and 22 are plots illustrating examples of vehicle speed prediction by a classifier using features extracted from IMU signals sampled at 30 Hz according to aspects of the present disclosure.
Figure 22:
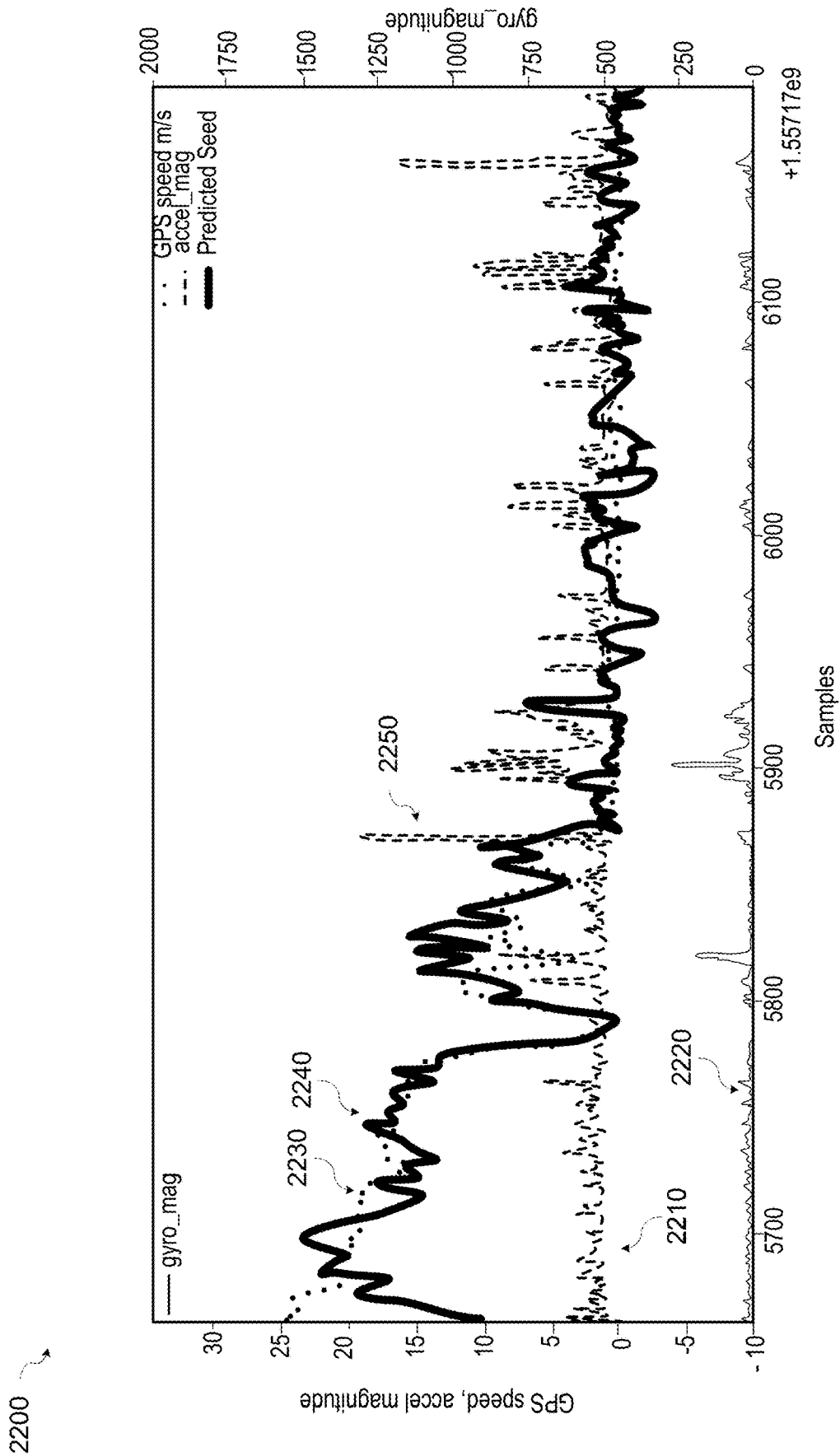

FIGS. 21 and 22 are plots 2100, 2200 illustrating examples of vehicle speed prediction by a classifier using features extracted from IMU signals sampled at 30 Hz according to aspects of the present disclosure. FIG. 21 shows accelerometer data 2110 using user acceleration (i.e., with the gravity component of acceleration removed), gyroscope data 2120, and GPS vehicle speed data 2130 for a trip, as well as predicted vehicle speed 2140 generated by the classifier. FIG. 22 similarly shows accelerometer data 2210 using user acceleration (i.e., with the gravity component of acceleration removed), gyroscope data 2220, and GPS vehicle speed data 2230 for a trip, as well as predicted vehicle speed 2240 generated by the classifier.

IMU signals, in particular accelerometer and gyroscope signals, were sampled at a sampling rate of 30 Hz, and forward-backward bandpass filtered with an IIR filter using 28 equally spaced frequency bands from 0.2 Hz to 14.8 Hz. The statistical features (e.g., median, variance, and maximum values) were extracted from the filtered signals over three window sizes (20 2140 seconds, 10 seconds 2150, 5 seconds 2160) and input to the classifier. FIGS. 21 and 22 illustrate that a closer prediction of vehicle speed may be obtained when the IMU data is sampled at a higher sampling rate. Further, as can be seen in FIG. 21, the accelerometer signal 2110 has a magnitude value exceeding a threshold value of about 10 m/s$^2$. Accordingly, filtering of the IMU sensor signals may be performed on the portions of the IMU signal up to, for example within two to five seconds or another time range, of the signal magnitude value exceeding the threshold value, but not including the signal magnitude value exceeding the threshold value or subsequent values of the signals.

Similarly, FIG. 22 illustrates the accelerometer signal 2210 having a magnitude value 2250 exceeding a threshold value of about 10 m/s$^2$. Thus, in FIGS. 21 and 22, only the portions of the IMU signals up to, but not including, the signal magnitude values exceeding the threshold value may be filtered using the IIR filter.

Figure 23:
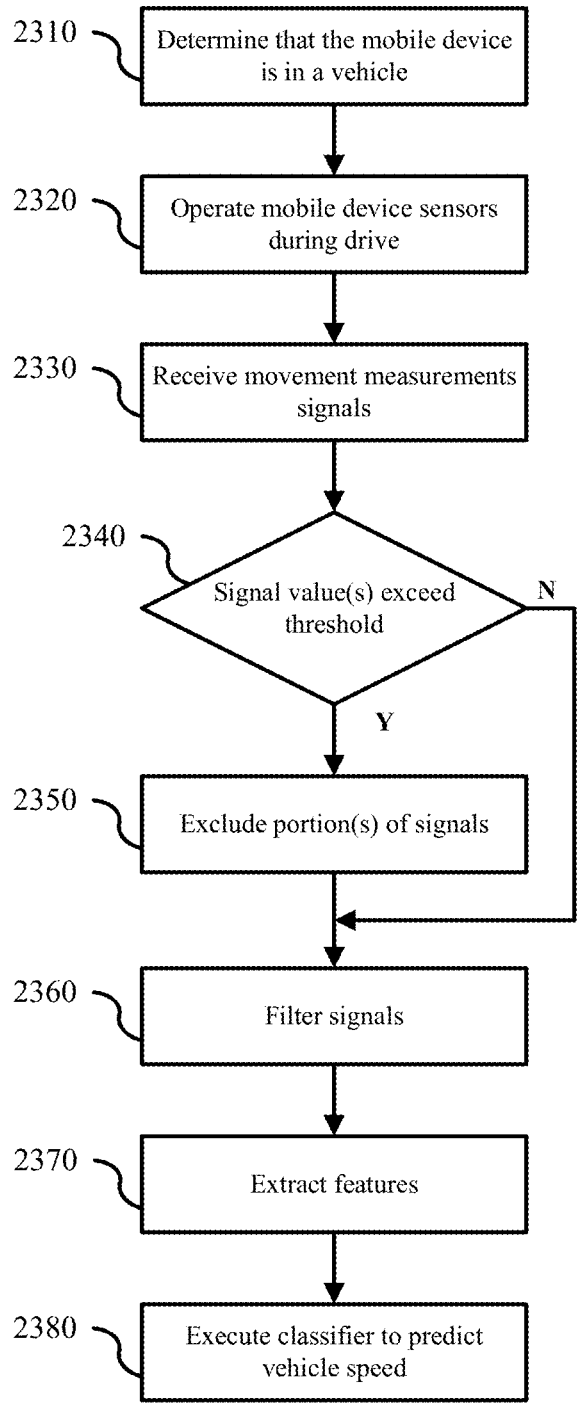
FIG. 23 is a flowchart illustrating an example of a process for estimating vehicle speed according to aspects of the present disclosure.

FIG. 23 is a flowchart illustrating an example of a method 2300 for estimating vehicle speed according to aspects of the present disclosure. At block 2310, it is determined that the mobile device is in a vehicle. For example, an accelerometer signal may be analyzed to determine a last signal pattern consistent with a user walking prior to a first accelerometer signal pattern consistent with movement of the vehicle.

At block 2320, the sensors of the mobile device may be operated to obtain movement measurements. For example, the mobile device may include an IMU having, among other things, an accelerometer, a gyroscope, and a magnetometer. One or more of the IMU sensors (e.g., the accelerometer, the gyroscope, and the magnetometer) may be operated during a drive to obtain movement measurements while the GPS receiver is inactive.

At block 2330, movement measurement signals may be received. The processor of the mobile device may receive the signals corresponding to the movement measurement from one or more of the accelerometer, the gyroscope, and the magnetometer of the IMU.

At block 2340, it may be determined whether the value of one or more of the received signals exceeds a threshold value. In response to determining that one or more of the received signals exceeds a threshold value (2340-Y), at block 2350, it may be determined to exclude that portion of received signals from subsequent filtering. The processor of the mobile device may determine to exclude a portion of the received signals within a specified time period around the portion of the received signals exceeding the threshold value from subsequent filtering. The processor may cause a portion of the received signals up to the specified time to be filtered such that the portion of the one or more of the received signals that exceeds the threshold value is excluded from subsequent filtering. For example, the processor may determine to exclude portions of the received signals for 0.5 seconds or another time period before and after the time that the one or more of the received signals exceeds the threshold value. The time period may be determined at least in part on the sampling frequency, with a shorter time period being applied for a higher sampling frequency.

In some implementations, only the portion of the one or more signals preceding the time period may subsequently be filtered. In some implementations, both the portion of the one or more signals preceding the time period and the portion of the one or more signals following the time period may subsequently be filtered, effectively excluding the portion of the received signals exceeding the threshold value. The process may continue at block 2360.

In response to determining that one or more of the received signals do not exceed a threshold value (2340-N) at block 2360 the signals may be filtered.

At block 2360, the signals may be bandpass filtered with an IIR filter using a forward-backward filtering process. The forward-backward IIR filtering filters the IMU signals normally (i.e., forward filtering), and the forward filtered signals are then "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, meaning that the result of the last step of the filter algorithm is applied to the next step. IIR filters are also advantageous, because they can isolate frequency ranges of interest with greater signal amplitude attenuation outside of a range of interest. The digital bandpass filters can be designed to isolate the amount of vibration occurring within specific frequency ranges of interest. In some implementations, a finite impulse response (FIR) filter, rather than an IIR filter, may be used for bandpass filtering of the IMU signals.

At block 2370, features may be extracted from the filtered signals. Features, for example statistical features, may be extracted from some or all of the filtered signals. The features may be extracted from time windows of different lengths. In some implementations, each of the statistical features may be extracted from the IMU signals over a 5-second time window, a 10-second time window, and a 20-second time window. The different length windows may provide levels of stability for the feature values, with longer window times producing more stable feature values. Other window lengths or a different number of windows may be used without departing from the scope of the invention. For a bandpass filtered accelerometer signal between 0.2 Hz to 1.1 Hz, nine features may be extracted, e.g., median, variance, and maximum, with each feature extracted over a 5-second time window, a 10-second time window, and a 20-second time window.

At block 2380, a classifier may be executed to predict vehicle speed. The features extracted from the filtered IMU signals may be input to the classifier, for example, an xgboost classifier. The extracted features maybe, for example, median, variance, and maximum values. Using the extracted features from the filtered IMU signals, the classifier may predict the speed of the vehicle. The vehicle speed prediction by the classifier may be quantized, for example, in increments of 5 m/s or another increment. In some implementations, the orientation of the mobile device with respect to gravity may also be determined and input to the classifier.

In some implementations, the method of FIG. 23 may be used with only the accelerometer signal. For example, while the processor may receive signals from the various IMU sensors (e.g., the accelerometer, the gyroscope, and the magnetometer), only the accelerometer signals may be further processed for predicting vehicle speed. The movement measurement signals from the accelerometer may be sampled at a specified sampling rate to obtain digital signals. A digital bandpass filter, for example, an infinite impulse response (IIR) filter, may be used to filter the accelerometer signals to isolate frequencies indicative of various vehicle activities and to remove signal magnitude values exceeding a specified threshold. Portions of the accelerometer signals having magnitude values exceeding the specified threshold may be excluded from further bandpass filtering. The digital bandpass filters can be designed to isolate the amount of vibration (i.e., frequencies) occurring within specific frequency ranges of interest.

The IIR filtering process may employ forward-backward filtering in which the portions of the accelerometer signals are filtered normally (i.e., forward filtering), and the forward filtered signals are "flipped" in time and filtered again with the IIR filter (i.e., backward filtering) producing a squared amplitude response. Features, for example statistical features, may be extracted from the filtered accelerometer signals and provided as input to the classifier to predict vehicle speed.

In some implementations, the acceleration measurements used in the prediction of vehicle speed may be user acceleration measurements. User acceleration measurements are defined as acceleration measurements for which the gravity component of acceleration has been removed. In some implementations, the acceleration measurements used in the prediction of vehicle speed may be raw acceleration measurements. Raw acceleration measurements are defined as acceleration measurements that include the gravity component.

Figure 24:
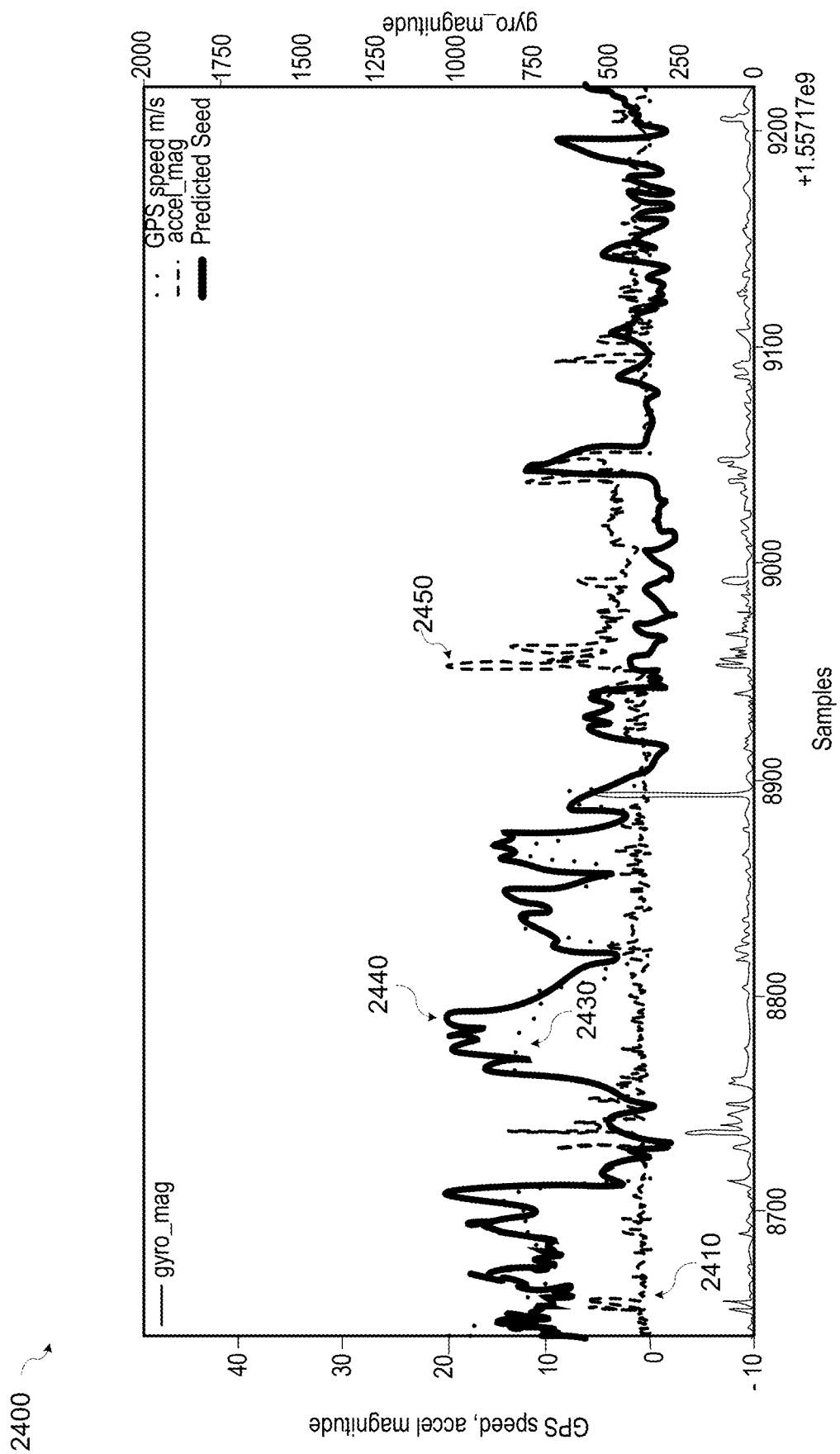
FIGS. 24 and 25 are plots illustrating examples of vehicle speed prediction by a classifier using features extracted from accelerometer signals sampled at 30 Hz according to aspects of the present disclosure.
Figure 25:
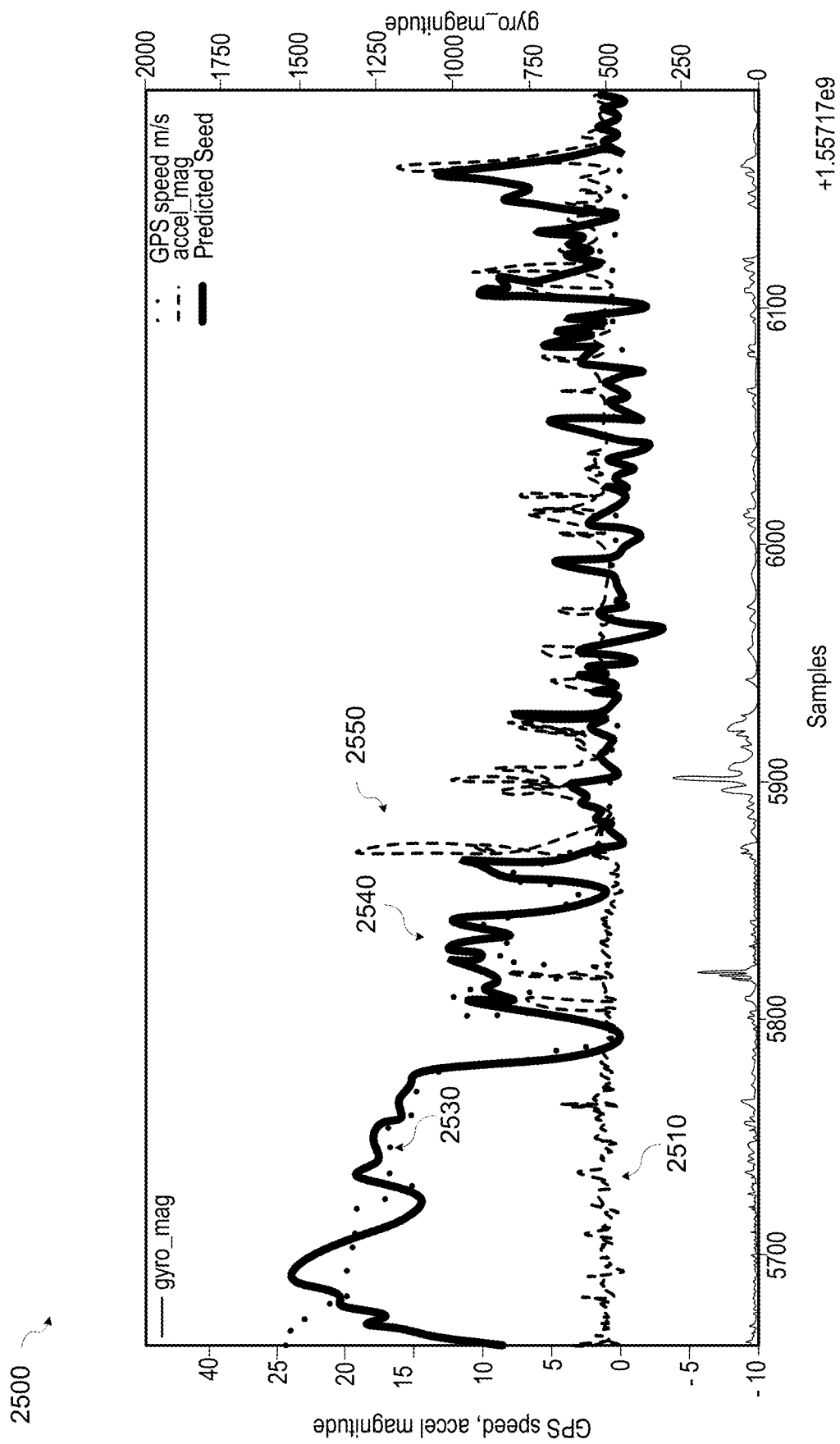

FIGS. 24 and 25 are plots 2400, 2500 illustrating examples of vehicle speed prediction by a classifier using features extracted from accelerometer signals sampled at 30 Hz according to aspects of the present disclosure. FIG. 24 shows accelerometer data 2410 using user acceleration (i.e., with the gravity component of acceleration removed), and GPS vehicle speed data 2430 for a trip, as well as predicted vehicle speed 2440 generated by the classifier. Similarly, FIG. 25 shows accelerometer signal 2510 using user acceleration (i.e., with the gravity component of acceleration removed), and GPS vehicle speed data 2530 for a trip, as well as predicted vehicle speed 2540 generated by the classifier.

The accelerometer signals were sampled at a sampling rate of 30 Hz, and forward-backward bandpass were filtered with an IIR filter. The statistical features (e.g., median, variance, and maximum values) were extracted from the filtered signals and input to the classifier. As can be FIG. 24, the accelerometer signal 2410 has a magnitude value 2450 exceeding a threshold value of about 10 m/s$^2$. Accordingly, filtering of the accelerometer signal may be performed on the portion of the accelerometer signal up to, for example, within a fraction of a second of the signal magnitude value exceeding the threshold value, but not including the signal magnitude value exceeding the threshold value or subsequent values of the signals. Similarly, FIG. 25 illustrates the accelerometer signal 2510 having a magnitude value 2550 exceeding a threshold value of about 10 m/s$^2$. Thus, in FIGS. 24 and 25, only the portions of the accelerometer signals up to, but not including, the signal magnitude values exceeding the threshold value may be filtered using the IIR filter.

It should be appreciated that the specific operations illustrated in FIG. 23 provide a particular method for estimating vehicle speed according to an embodiment of the present invention. Other sequences of operations may also be performed according to alternative embodiments. For example, alternative embodiments may perform the operations outlined above in a different order. Moreover, the individual operations illustrated in FIG. 23 may include multiple suboperations that may be performed in various sequences as appropriate to the individual operations. Furthermore, additional operations may be added or removed depending on the particular applications. One of ordinary skill in the art would recognize many variations, modifications, and alternatives.

The methods of FIG. 23 may be embodied on a non-transitory computer readable medium known to those of skill in the art, having stored therein a program including computer executable instructions for making a processor, computer, or other programmable device execute the operations of the methods.

Figure 26:
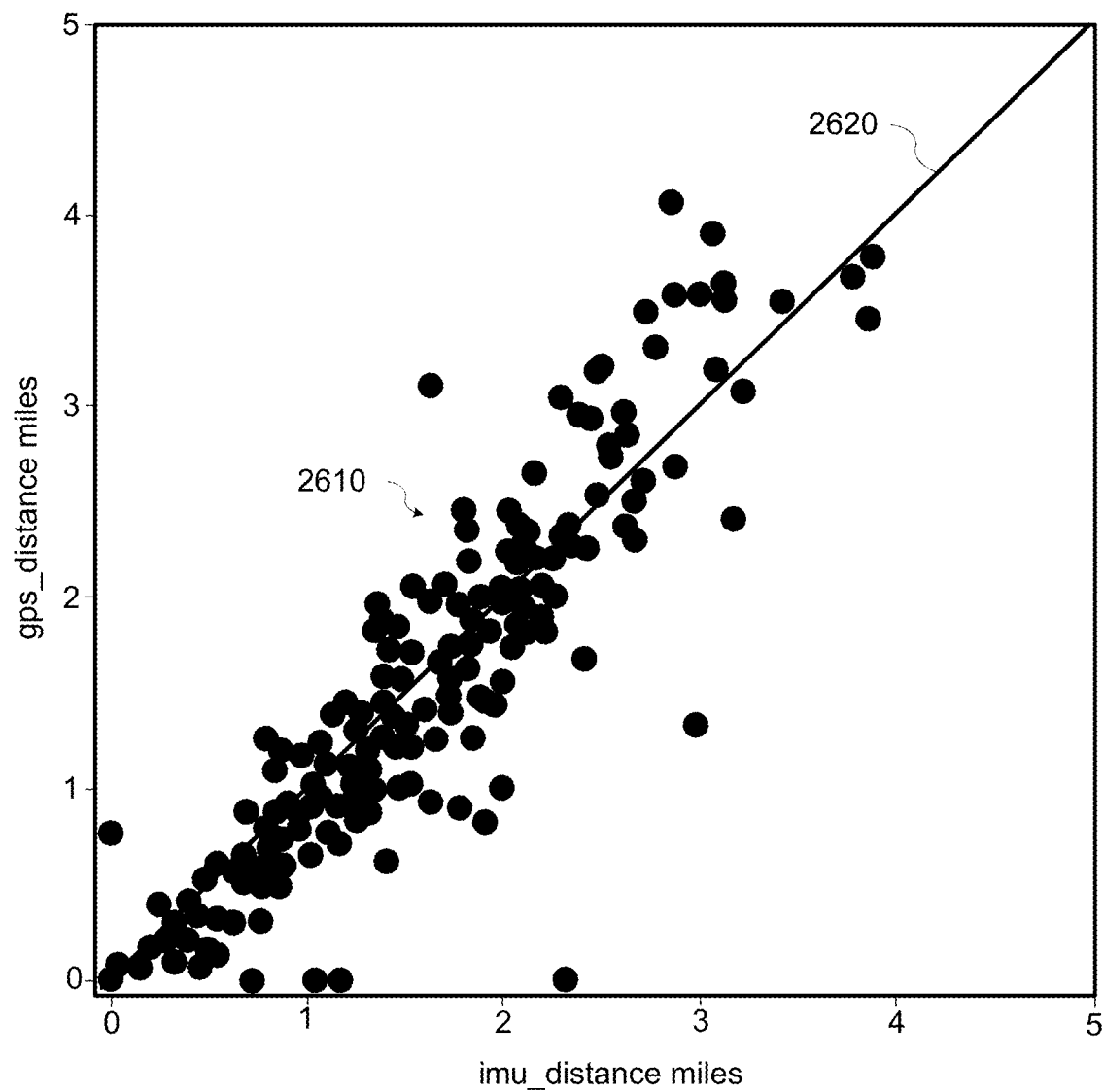
FIG. 26 is a cluster plot showing distance estimated by the classifier compared to distance measured by GPS according to aspects of the present disclosure.

In some implementations, the mobile device may be aligned to the vehicle to predict longitudinal acceleration by methods similar to the method of FIG. 23. In some implementations, other features, such as the median, variance, maximum of the velocity change derived through integrating accelerometer data and the median, variance, and maximum of the derivative of acceleration (also known as jerk), may be extracted from the bandpass filtered data and included as input to the classifier to predict vehicle speed as well as other vehicle movement characteristics. In some implementations, distance may be estimated by integrating the vehicle speed predicted by the classifier. FIG. 26 is a cluster plot 2600 showing distance estimated by the classifier 2610 compared to distance 2620 measured by GPS according to aspects of the present disclosure.

According to some aspects of the present disclosure, vehicle mileage may be calculated from IMU sensor data collected in the background. Accelerometer data may be collected in the background during a trip in the vehicle. The accelerometer data may be down sampled to a frequency lower than the sampling frequency, for example 9 Hz or another frequency, and the magnitude of the down sampled signal calculated (e.g., by the processor of the mobile device).

The down sampled signal magnitudes may be segmented into fixed size time windows, and input to a machine learning model (e.g., a classifier) to predict the distance traveled for each segment. The predicted distance traveled for each segment may be combined to determine a predicted distance traveled for the trip.

In some implementations, the predicted distance traveled (i.e., mileage) may be accumulated for all vehicle trips during a specified time period, for example, one year or another time period, to determine the total mileage traveled during that time period.

Vehicle speed estimation based on IMU signals and acceleration only signals can have applications for areas such as driving data collection, transportation mode analysis, and crash prediction, as well as other areas.

In some embodiments, vehicle crashes may be predicted based only on signals generated by the IMU. Crash detection based only on the IMU signals provides an advantage over GPS-based crash detection at least in that the IMU consumes less mobile device power than a GPS receiver. For example, IMU data can be collected in the background any time the mobile device is operational. In addition, the sampling frequency for the IMU sensors may be controlled based on detected sensor activity. For example, a low sampling frequency used during steady state conditions may be increased when sudden changes acceleration or changes in direction are sensed. Obtaining GPS data, on the other hand, requires launching and running a GPS application on the mobile device which consumes additional power.

According to aspects of the present disclosure, information normally obtained from GPS data may be inferred from IMU data. For example, using the IMU data it may be determined whether a vehicle has been stopped for a specified period of time long enough to qualify as an event that a GPS measurement would identify as the vehicle being stopped for that amount of time.

Figure 27:
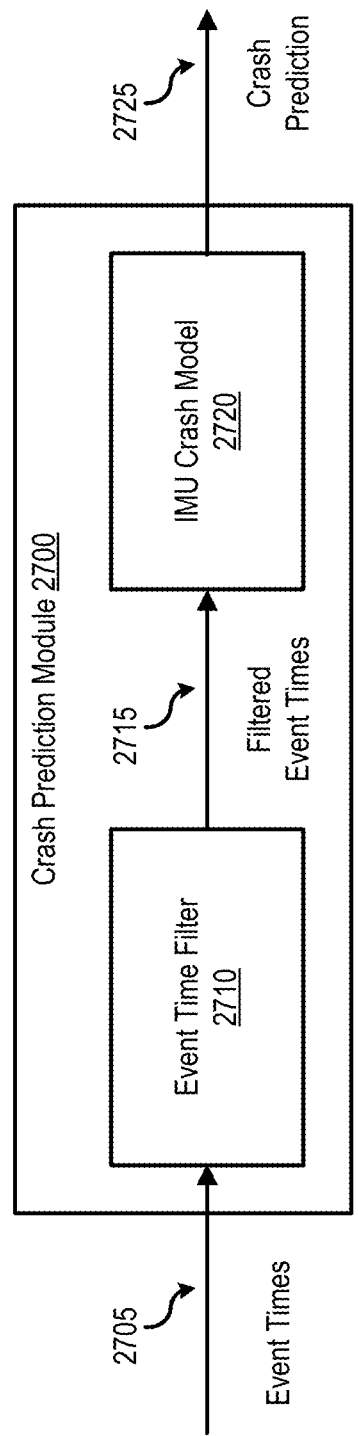
FIG. 27 is a block diagram illustrating an example of a crash prediction module according to aspects of the present disclosure.

FIG. 27 is a block diagram illustrating an example of a crash prediction module 2700 according to aspects of the present disclosure. Referring to FIG. 27, the crash prediction module 2700 may include an event time filter 2710 and an IMU crash model 2720. Both the event time filter 2710 and the IMU crash model 2720 may be machine learning models. The event time filter 2710 may be trained using IMU sensor data to identify event times that may have a higher likelihood (e.g., as determined from historical data) than neighboring times of indicating a crash.

Data from all the times recorded by the IMU sensors may be received by the crash prediction module 2700 as event times 2705. The event times 2705 may include IMU sensor data acquired during specified time windows. The event time filter 2710 may identify candidate event times. For example, the event time filter 2710 may identify candidate event times as time windows including accelerometer data exceeding a threshold magnitude (e.g., 10 m/s² or another magnitude). These candidate event times may have a higher likelihood than neighboring times of indicating a crash.

The event time filter 2710 may further filter the candidate event times by evaluating the IMU sensor data in time windows around the candidate event times to determine if various criteria are met. For example, using the IMU data, the event time filter 2710 can provide an indication equivalent to a GPS indication of vehicle speed going above a specified speed (e.g., 5 m/s or another speed) for a specified amount of time (e.g., 2 minutes or another time). As another example, the event time filter 2710 can provide an indication equivalent to a GPS indication that the vehicle traveled a specified distance (e.g., 250 meters or another distance) in a specified time (e.g., three minutes or another time). Other indications equivalent to GPS indications may be provided without departing from the scope of the present disclosure. Candidate event times and associated data that do meet the specified criteria can be filtered out by the event time filter 2710. Removing candidate event times unlikely to be crash indications can improve results (e.g., reduce false positives) of the IMU crash model.

The event time filter 2710 may output filtered event times 2715 that meet the specified criteria as input to the IMU crash model 2720. Using the filtered event times 2715, the IMU crash model 2720 may generate predictions 2725 of whether the vehicle was involved in a crash.

FIGS. 28A-28D are plots illustrating examples of crash prediction results according to aspects of the present disclosure. In FIGS. 28A-28D, the horizontal axis indicates false positive predictions per 12,000 miles driven, and the vertical axis indicates the fraction of crashes that can be detected as a function of the false positive predictions. In the U.S., 12,000 miles is the average annual mileage driven; thus, the plots in FIGS. 28A-28D may also be viewed as indicating the fraction of crashes that can be detected as a function of the false positive predictions per year (e.g., the number of false predictions that would be made for one driver-year).

In FIGS. 28A-28D, the plots 2810A-2810D represent crash prediction results generated by the IMU crash model 2720 without event times being filtered by the event time filter 2710. In other words, all the event times generated by the IMU are used as input to the IMU crash model 2720. The plots 2820A-2820D represent crash prediction results generated by the IMU crash model 2720 with the event time filter 2710 having exact knowledge of which candidate event times should be filtered out. The filtered event times fed to IMU crash model 2720 are based on GPS data known to indicate event times related to crash events. Thus, the plots 2820A-2820D indicate predictions by the IMU crash model 2720 based only on event times known to be associated with crashes, resulting in the best possible crash predictions.

The plots 2830A-2830D represent crash prediction results generated by the IMU crash model 2720 with the event time filter 2710 filtering the event times recorded by the IMU sensors and providing the filtered event times to the IMU crash model 2720. For FIGS. 28A and 28B, the candidate event time threshold for plots 2830A and 2830B was set at an acceleration spike of greater than 10 m/s². For FIGS. 28C and 28D, the candidate event time threshold for plots 2830C and 2830D was set as an acceleration spike of greater than 5 m/s².

Figure 28A:
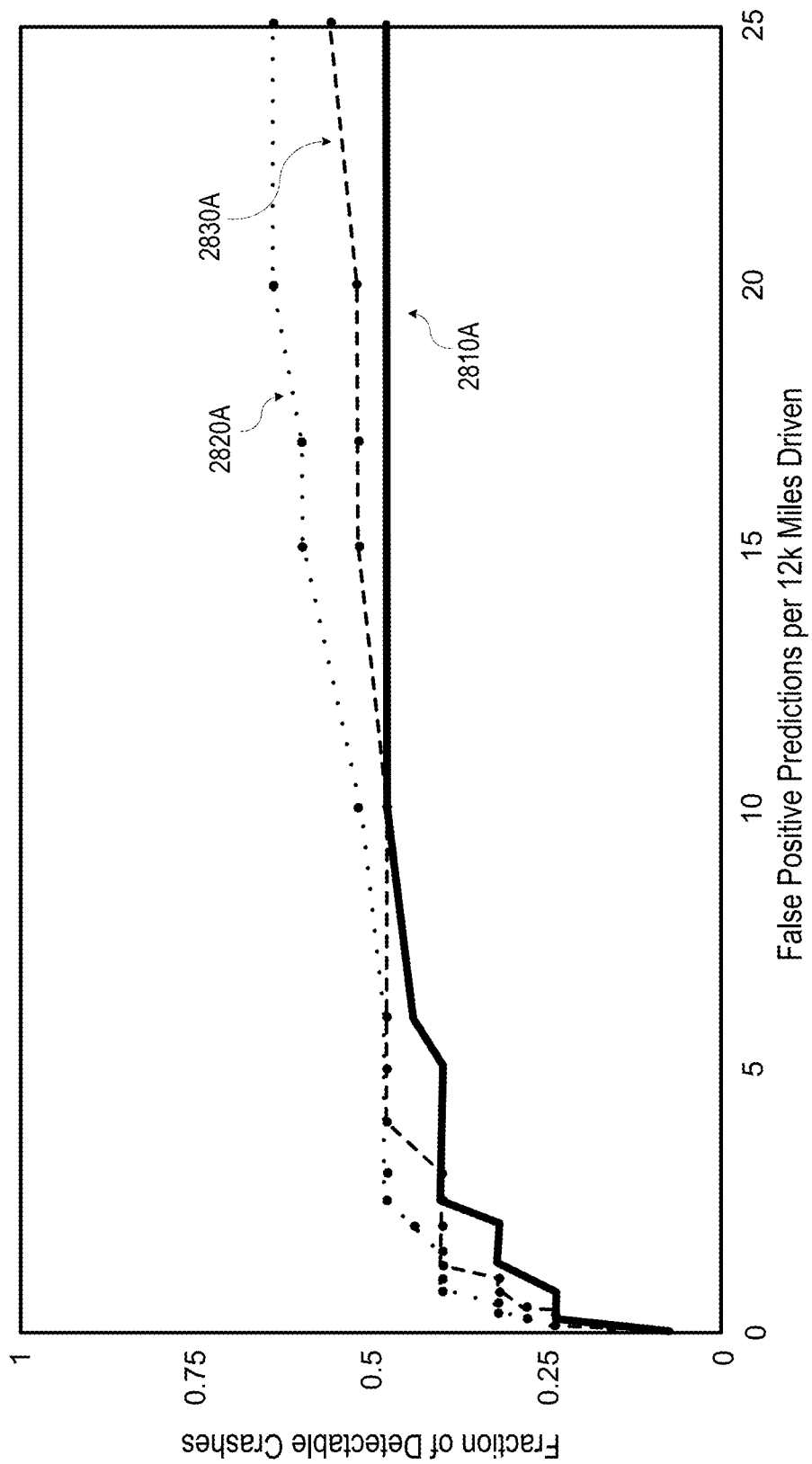
FIGS. 28A-28D are plots illustrating examples of crash prediction results according to aspects of the present disclosure.
Figure 28B:
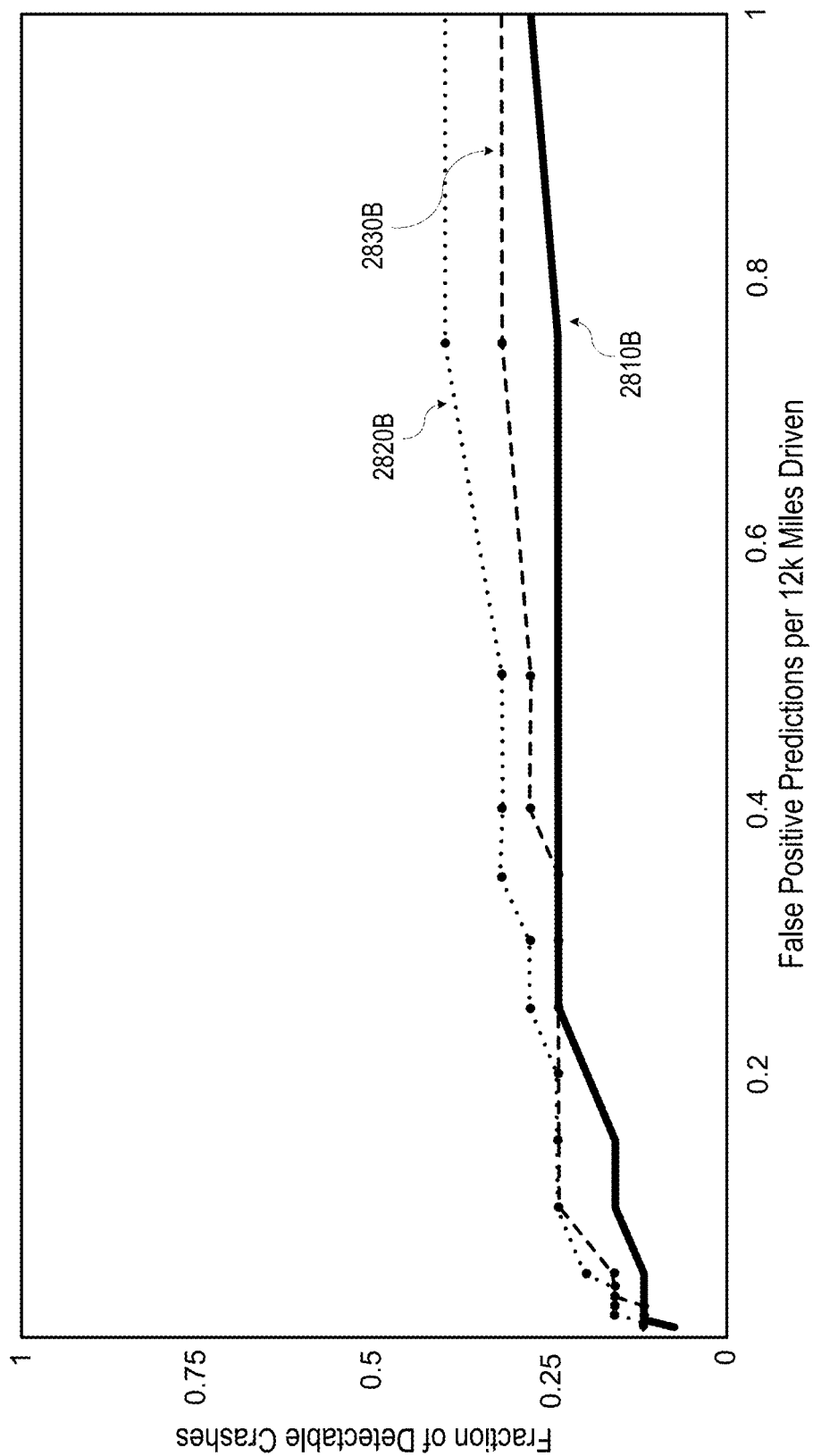
Figure 28C:
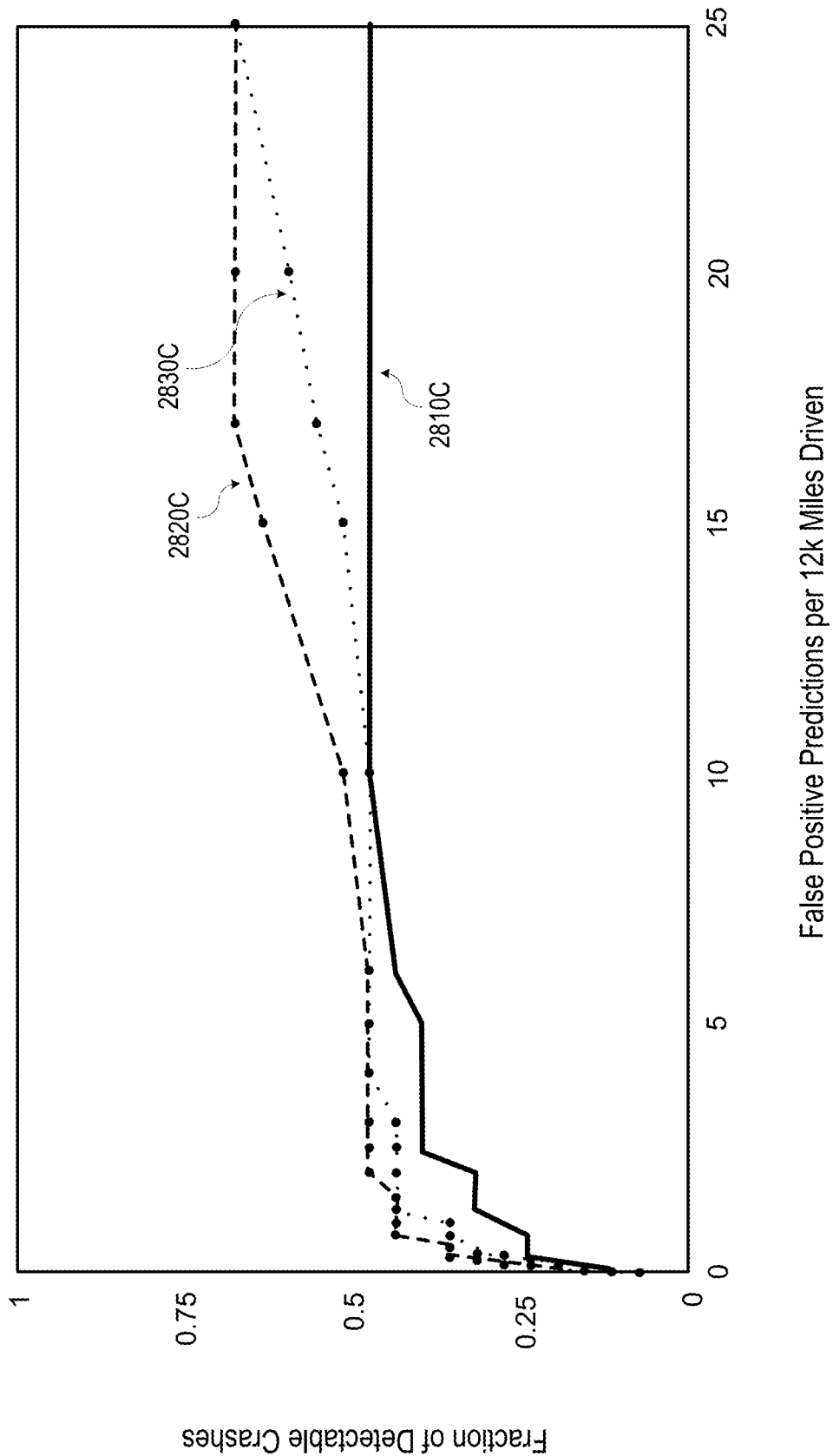
Figure 28D:
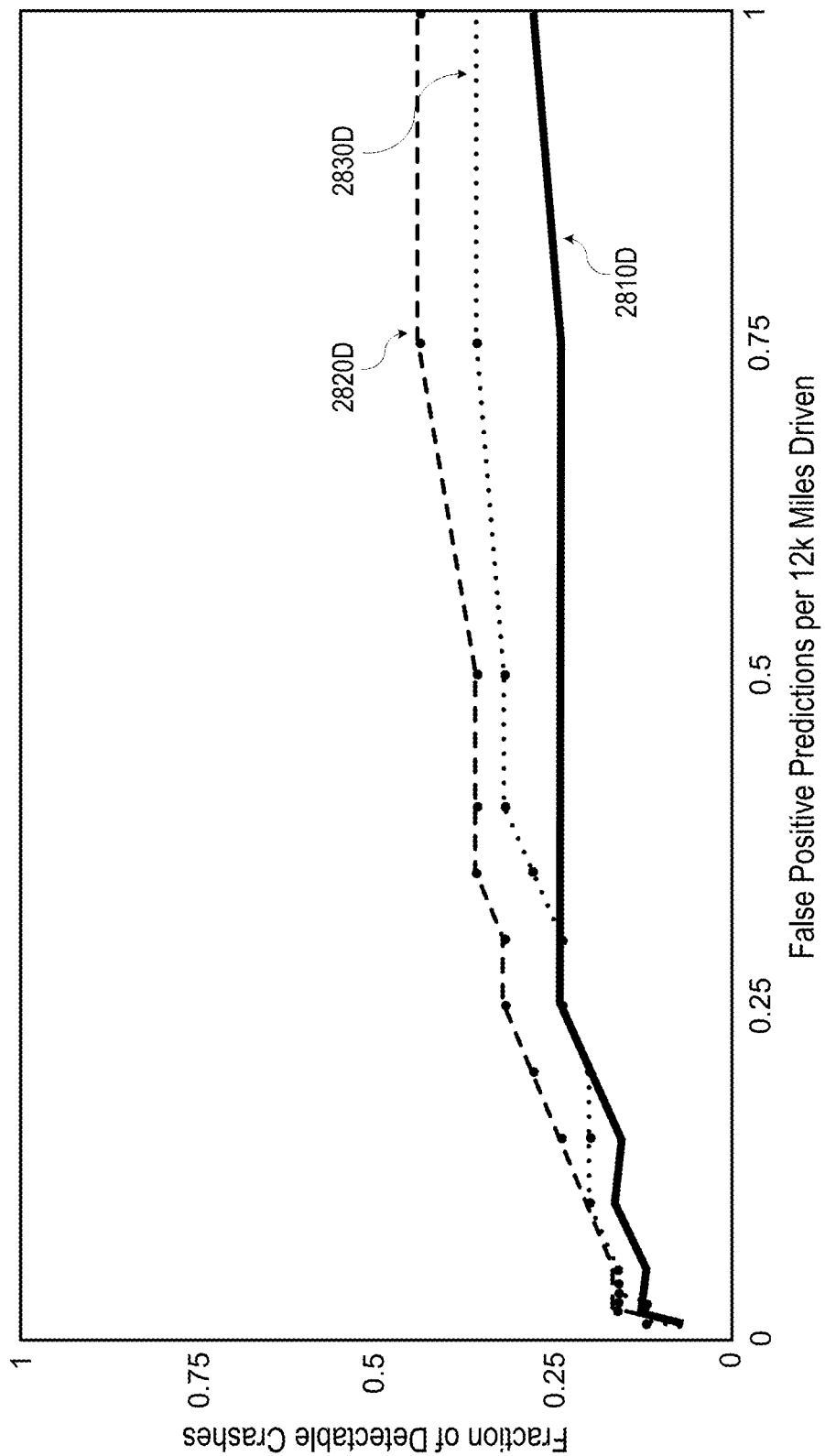

FIGS. 28A-28D illustrate that the effect of including the event time filter 2710 to filter the event times input to the IMU crash model 2720 is to increase the crash prediction accuracy of the IMU crash model 2720. As shown by the plots 2830A-2830D, including the event time filter 2710 moves the crash prediction accuracy of the IMU crash model 2720 alone (e.g., the plots 2810A-2810D) closer to the best possible crash prediction accuracy (i.e., the plots 2820A-2820D). Note that the expanded x-axis scales in FIGS. 28B and 28D illustrate false positive predictions per 12,000 miles driven is much less than one and approaching the best possible crash predictions (i.e., the plots 2820A-2820D) when the event time filter 2710 is used to filter the event times (i.e., the plots 2830A-2830D).

Figure 29:
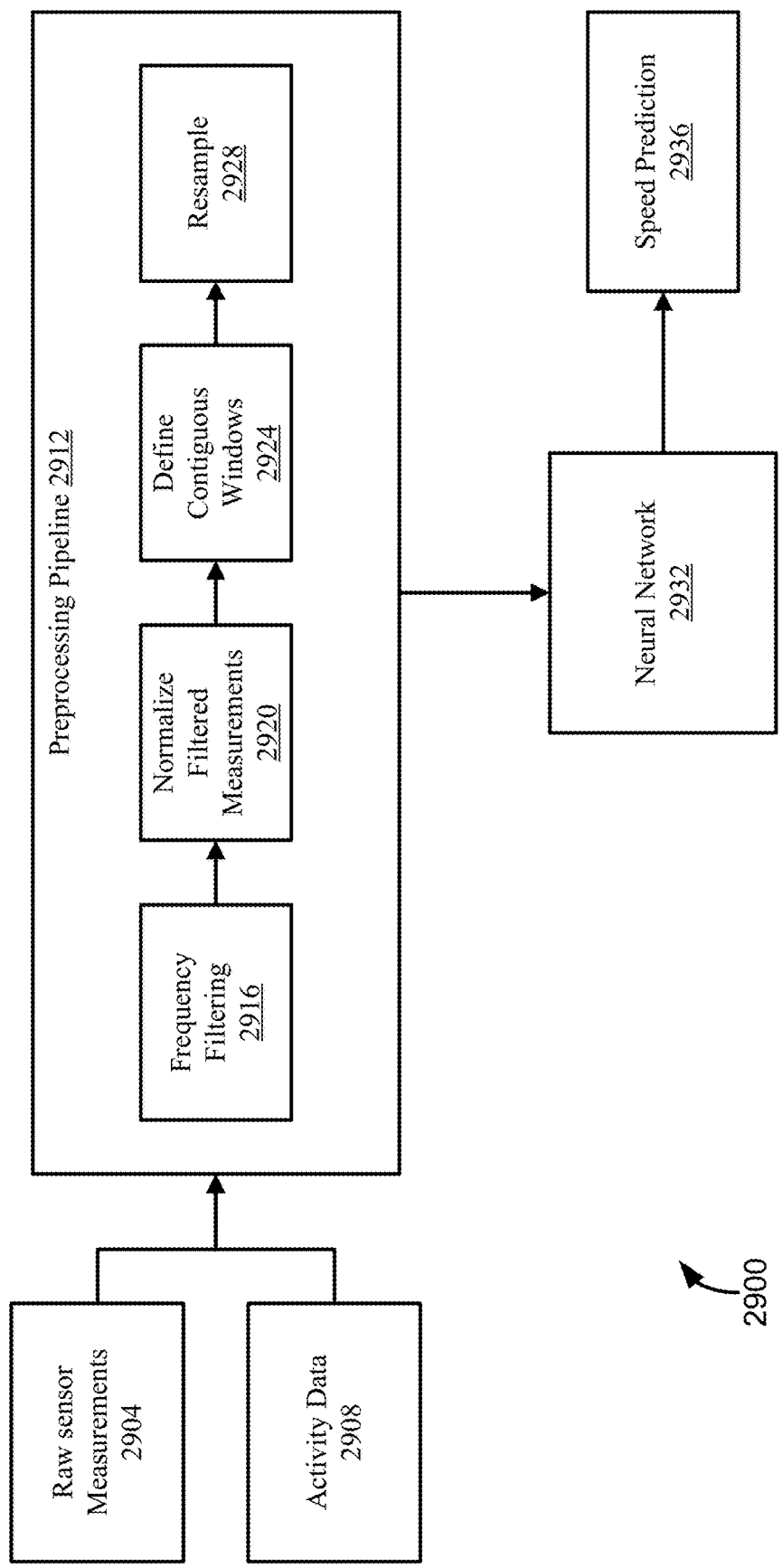
FIG. 29 is an exemplary block diagram of system for predicting the speed of a vehicle from mobile device sensor measurements according to some embodiments.

FIG. 29 is an exemplary block diagram of system 2900 for predicting the speed of a vehicle from mobile device sensor measurements according to some embodiments. System 2900 generates one or more predictions of a speed of a vehicle from sensor measurements received by a mobile device positioned within the vehicle. In some instances, the processes described in FIG. 29 are executed in real-time by the mobile device as the mobile device receives sensor measurements from sensors of the mobile device. In other instances, the process may be executed partially by the mobile device and partially by one or more other devices (e.g., such as servers, mobile devices, computing systems, or the like) or entirely by the one or more other devices.

System 2900 receives raw sensor measurements 2904 from one or more sensors of the mobile device (e.g., an accelerometer, magnetometer, or the like). The raw sensor measurements can include sensor measurements in one or more axis (e.g., x axis, y axis, and/or z axis). System 2900 also receives activity data 2908 that includes a prediction of an activity occurring at approximately a same time in which raw sensor measurements 2904 are received. For instance, the operating system (or activity detection engine) may determine a probability that the mobile device is positioned within the vehicle that is currently driving. Raw sensor measurements 2904 and activity data 2908 are input into processing pipeline 2912. Processing pipeline 2912 includes four stages: frequency filtering 2916, normalize filtered measurements 2920, define contiguous windows 2924, and resample 2928. The output of processing pipeline 2912 can be input into a neural network (or other machine-learning model), which will generate a prediction of a speed of the vehicle.

Frequency filtering 2916 includes filtering out a portion of the data values that occur at particular frequencies. For instance, the raw sensor measurements may be converted to a frequency domain using a transform (e.g., Fourier, or the like). Once in the frequency domain, the raw sensor measurements may be filtered to eliminate noise or data values that are less accurate in the vehicle speed predictions. Frequency filtering 2916 filters out frequencies that are greater than a threshold frequency. In some instances, the threshold may be, for example, a frequency from 9-50 Hz. The frequency threshold may be selected by a process of system 2900, a user, a communication received from a remote device, or the like. Processing pipeline 2912 then passes the remaining raw sensor measurements to normalized filtered measurements 2920, where the remaining raw sensor measurements are normalized to a predetermined scale.

Processing pipeline 2912 then defines contiguous windows 2924 that each include a portion of the normalized sensor measurements. The contiguous windows include a portion of a the normalized sensor measurements (in the time domain) that were received during a time interval. The time interval length may be dynamically determined based on the normalized sensor measurements. For instance, a median delta may be defined as the median difference in time between two consecutive values of the normalized sensor measurements. A contagious window may be defined each time the time interval between two consecutive values is greater than a threshold that is based on the median delta. In some instances, the threshold may be a multiple of the standard deviation from the median delta, such as a one standard deviation, two standard deviations, three standard deviations, etc. In other instances, the threshold may be selected by a user or from input received from another device. Any number of contiguous windows may be defined for the normalized sensor values including one (e.g., when a time difference between each consecutive values of the normalized sensor measurements is not greater than threshold 3012) or any number greater than one.

Alternatively, defining contiguous windows 2924 may generate uniform windows. For instance, each contiguous window may be of a predetermined time interval length such as, but limited to, five seconds, 10 seconds, 30 seconds, one minute, etc. The predetermined time interval length may be predetermined (e.g., prior to runtime), dynamically selected (at any time after runtime), selected based on user input, selected based on a value received from an remote computing device, or the like.

The last stage of processing pipeline 2912 includes resampling 2928 in which the contiguous windows are resampled to a predetermined frequency. The predetermined frequency may be a frequency selected by the processing pipeline 2912, system 2900, the mobile device, a user, a remote device, or the like. In some instances, the predetermined frequency may be a frequency from 9-50 Hz.

The output from processing pipeline 2912 may be the processed sensor measurements that correspond to each contiguous window. The processed sensor measurements that correspond to a contiguous window are passed to neural network 2932 which generates predicted speed 2936 for each time unit (e.g., defined based on the median delta, by user input, or as some division of the total time interval of the contiguous window) included in the contiguous window. For instance, if the contiguous window includes 10 seconds of processed sensor measurements and the time unit is one second, then the contiguous window would include 10 time units and the neural network 2932 may output 10 predicted speed values. If the contiguous windows are not of uniformed length (e.g., but based on a time difference between two values being greater than a multiple of the standard deviation from the time delta), then neural network 2932 may generate a different quantity of predictions for each contiguous window.

Figure 30:
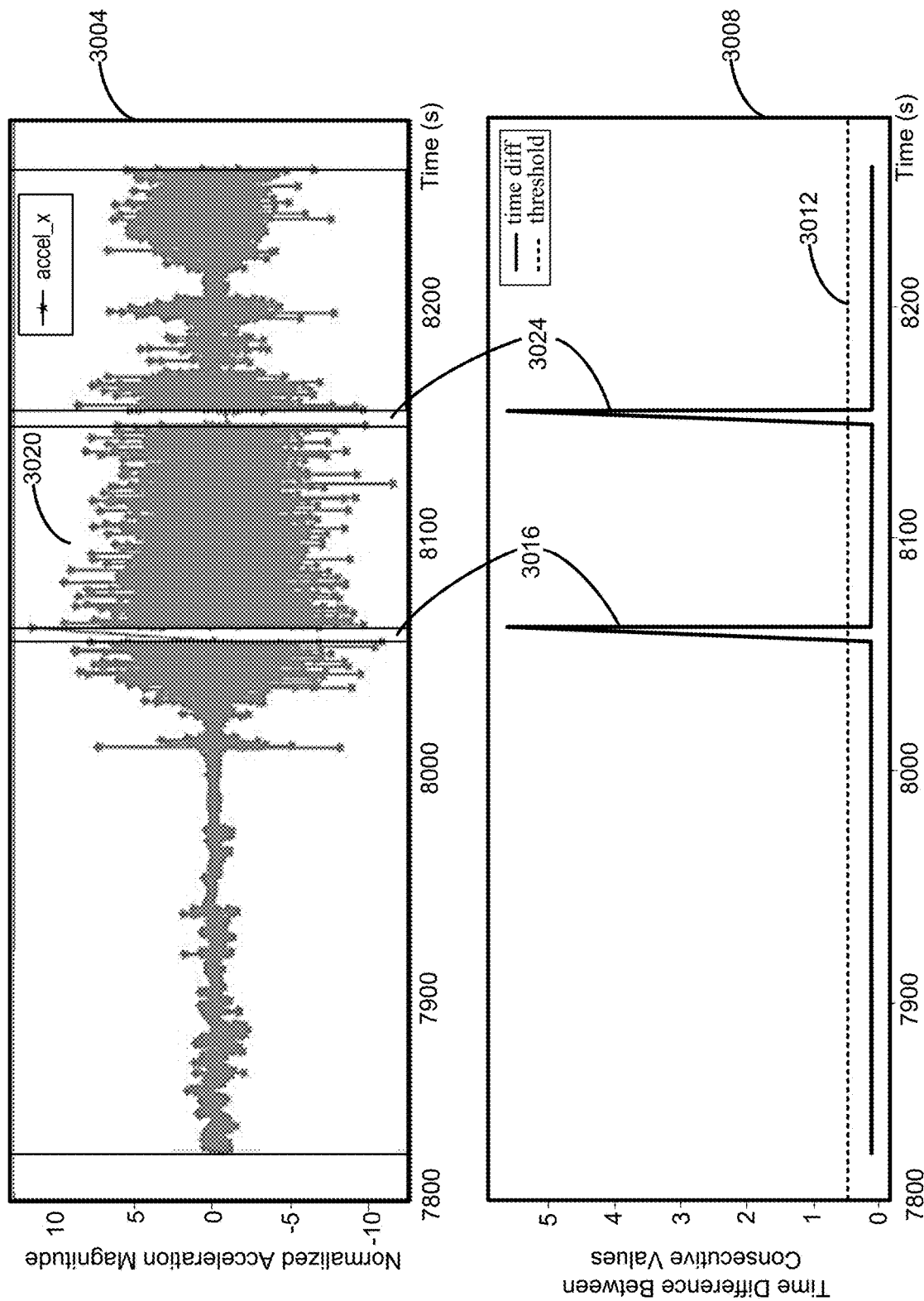
FIG. 30 is an exemplary set of graphs illustrating the division of processed sensor measurements into contiguous windows according to some embodiments.

FIG. 30 is an exemplary set of graphs illustrating the division of processed sensor measurements into contiguous windows according to some embodiments. Graph 3004 includes a plot of normalized acceleration values with the x-axis representing time. Graph 3008 includes a plot of the median difference between two consecutive values of the normalized acceleration values vs time. As a result, each set of consecutive values plotted in graph 3004 has a corresponding value plotted in graph 3008. Graph 3004 includes a first contiguous window that may be defined prior to the beginning of the plot (e.g., at some time prior to time 7800). The first contiguous window extends until the time difference between consecutive values of the normalized acceleration values exceeds threshold 3012. For example, at 3016, there is a time difference between consecutive values that is significantly larger than the threshold 3012 at time 8050, which signifies the end of the first contiguous window and the beginning of second contiguous window 3020. At 3024, there is another time difference between consecutive values that is significantly larger than the threshold 3012 at time 8150, which signifies the end of second contiguous window 3020 and the beginning of a third contiguous window. In some instances, graphs 3004 and 3008 may be rendered or displayed. In other instances, graphs 3004 and 3008 may not be rendered or displayed. In still yet other instances, graphs 3004 and 3008 may be represented as a metadata, data, a data structure or the like. Moreover, while graphs 3004 and 3008 illustrate segmenting normalized acceleration values in the x-axis into contiguous windows, other inputs may be used in addition to or in place of normalized acceleration values in the x-axis such as, but not limited to, normalized acceleration values in the y-axis, normalized acceleration values in the z-axis, normalized acceleration magnitude, activity data, or the like.

Figure 31:
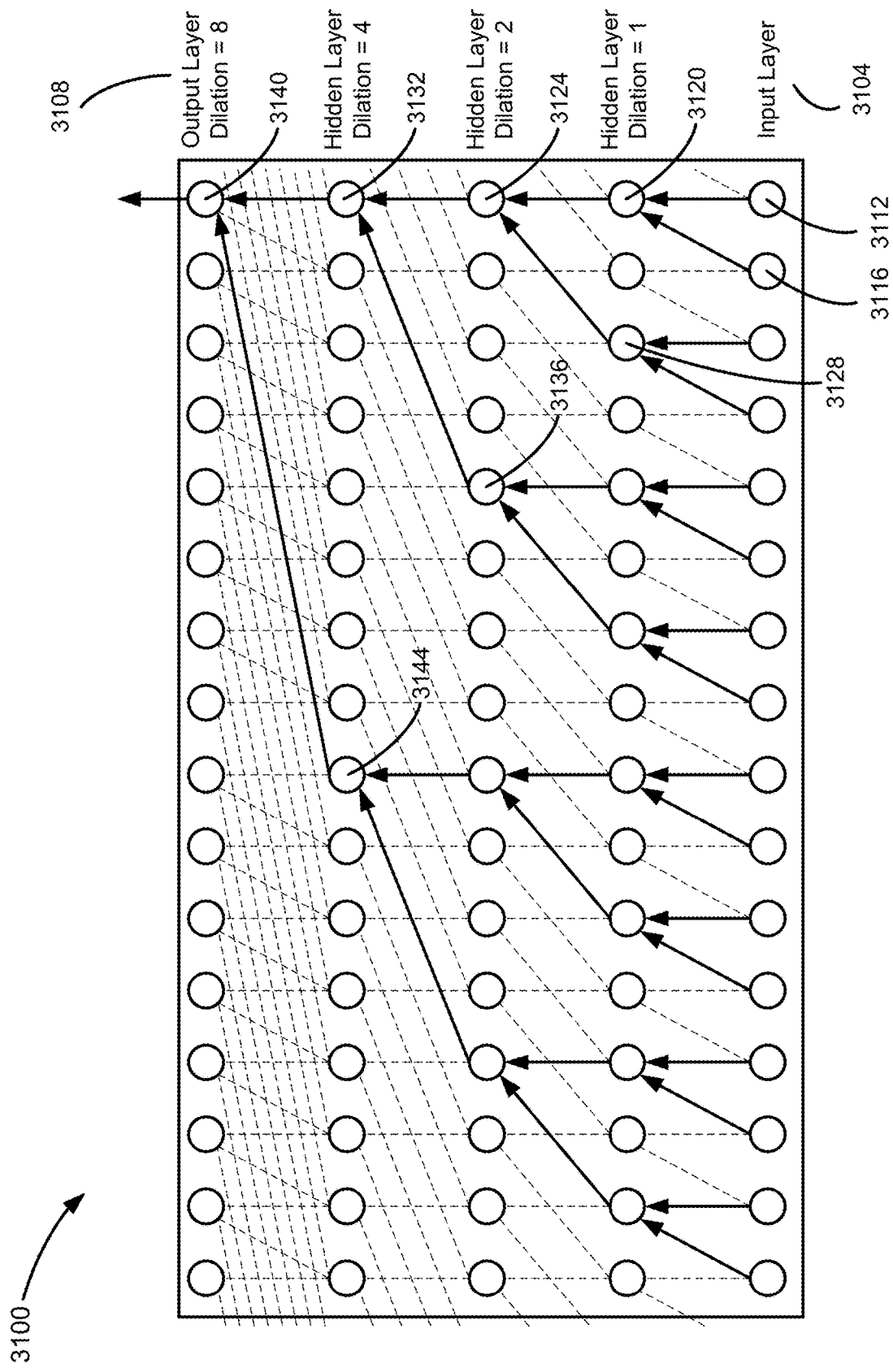
FIG. 31 is an exemplary representation of the layers of a neural network that can generate a prediction of the speed of a vehicle according to some embodiments.

FIG. 31 is an exemplary representation of the layers of a neural network that can generate a prediction of the speed of a vehicle according to some embodiments. Neural networks include input layer 3104 (e.g., where features are input to the neural network), output layer 3108, and one or more hidden layers positioned between the input layer and the output layer. Each layer includes a one or more neurons that are each connected to one or more neurons of a previous layer (except for the input layer) and one or more neurons of subsequent layer (except for the output layer). Each neuron of each hidden layer provides a non-linear transformation of the features received from a previous layer. Weights may be assigned to the connections between neurons to direct the transformation that is applied to the features.

Neural network 3100 may be a convolutional neural network, which includes one or more convolution layers, in addition to or in place of, the hidden layers. Each neuron of a convolution layer includes a kernel defined by hyper parameters that is convolved across the features received from a previous layer. In some instances, the convolution layers may be dilated convolutions in which the kernel is applied over a larger area (of input features from the previous layer) than its length (e.g., the layer's distance from the input layer). Each subsequent layer may include additional dilations. For example, a first convolution layer may include a dilation of one in which the kernel of neuron 3120 is applied over an area of one (e.g., one neuron from the neuron adjacent to neuron 3120). The kernel of neuron 3120 may be applied to neurons 3112 and 3116, also referred to as input features. The second convolution layer may include a dilation of two in which the kernel of neuron 3124 is applied over an area of two from the adjacent neuron 3120 of the previous layer. The kernel of neuron 3124 may be applied to neurons 3120 to neuron 3128.

Continuing the example, the next layer includes a dilation of four and the kernel of neuron 3132 is applied an area of four from the adjacent neuron 3124 of the previous layer. The kernel of neuron 3132 is applied from 3124 to 3136. The last layer depicted has a dilation of eight. The kernel of neuron 3140 is applied from neuron 3132 to neuron 3144 (e.g., eight neurons from neuron 3132). Neural network 3100 may include any number of neurons (e.g., 64, 128, 256, etc.), each being configured to apply a kernel. Neural network 3100 may include any number of dilations. For instance, in addition to the dilations 1, 2, 4, and 8 shown, neural network may include 16, 32, 64, etc. with each subsequent dilation being double the previous layer's dilation.

Input features 3112 and 3116 correspond to sensor measurements received over time (e.g., from right to left being from time (T) T=0 to time T=∞). For instance, input feature 3112 may correspond to accelerometer measurements collected at time T=0 and input feature 3116 may correspond to accelerometer measurements collected at the next subsequent time interval T=1 (where the time between T=0 and T=1 may be of any amount of time such as one second, one millisecond, etc.). Dilated convolutions enable the neural network to include a larger receptive field of input features, which enables selective use of sensor measurements across a larger time interval. For instance, a neural network, such as neural network 3100, that includes 128 kernels and dilations of 1, 2, 4, 8, 16, and 32, would include a receptive field of 96. This means the neural network would have 96 inputs (e.g., 96 discrete sensor measurements or the sensor measurement collected over 10.6 seconds). This improves the efficiency of the neural network by improving both the speed and accuracy of the predictions generated by the neural network (e.g., speed prediction, crash prediction, etc.).

Figure 32:
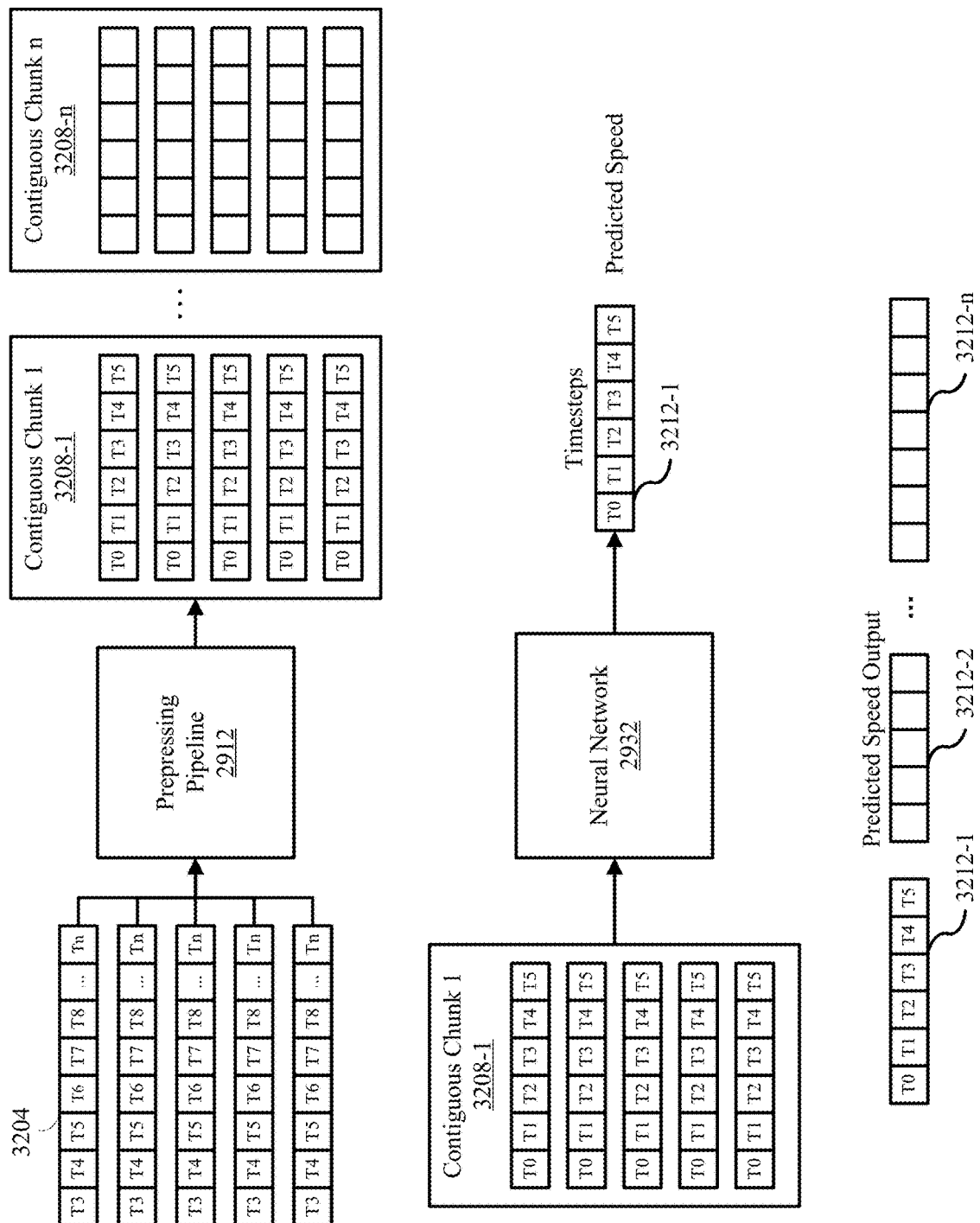
FIG. 32 is exemplary block diagram of a system for predicting speed of a vehicle that corresponds to time steps using mobile device sensor measurements according to some embodiments.

FIG. 32 is exemplary block diagram of a system for predicting speed of a vehicle that correspond to time steps using mobile device sensor measurements according to some embodiments. A set of sensor measurements 3204 may be received as input. For example, a mobile device, such as mobile device 104, collects the set of sensor measurements from sensors of the mobile device while the mobile device is disposed within the vehicle. The set of sensor measurements includes one or more sensor measurements collected over a time interval (e.g., from T0 to Tn) where each sensor measurement is associated with the time, T, in which the measurement was collected. The set of sensor measurements may include one or more acceleration measurements in the x-axis, one or more acceleration measurements in the y-axis, one or more acceleration measurements in the z-axis, one or more acceleration magnitude measurements, an identification of a current activity from Activity Data for each time in which there is an acceleration measurement, combinations thereof, and the like. In some instances, in addition to acceleration measurements, the sensor measurements may include gyroscopic measurements, magnetometer measurements, GPS measurements, combinations thereof, or the like.

Preprocessing pipeline 2912 may receive sensor measurements 3204 and generate a series of contiguous chunks 3208 of processed sensor measurements. Each contiguous chunk 3208 may correspond to processed sensor measurements that correspond to a contiguous window (e.g., as described in connection to FIGS. 29 and 30). For example, contiguous chunk 1 3208-1 may include the processed sensor measurements of sensor measurements collected over a first contiguous window. These processed sensor measurements may include one or more values for each input sensor type (e.g., acceleration measurements in the x-axis, acceleration measurements in the y-axis, acceleration measurements in the z-axis, acceleration magnitude, and activity data). Any number of contiguous chunks may be generated by preprocessing pipeline 2912. Since each contiguous chunk includes processed sensor measurements of sensor measurements collected during a contiguous window and since contiguous windows may be of varying lengths, the quantity of sensor measurements of each contiguous chunk 3208-1-3208-*n* may be different (e.g., from a single value for each sensor type to any particular quantity of values for each sensor type).

The neural network receives the contiguous chunks as input and generates, for each time for which there is sensor measurements, a predicted speed of the vehicle 3212-1-3212-*n*. For instance, since contiguous chunk 1 3208-1 includes sensor measurements for times T0-T5, neural network 2932 may generate a predicted speed 3212-1 of the vehicle for each of T0-T5. Neural network 2932 may then receive the next contiguous chunk 3208-2 (not shown) and generate predictions 3212-2 for each time unit in that contiguous chunk. This process may continue generating predictions 3212-n until there are no more contiguous chunks for the neural network.

Figure 33:
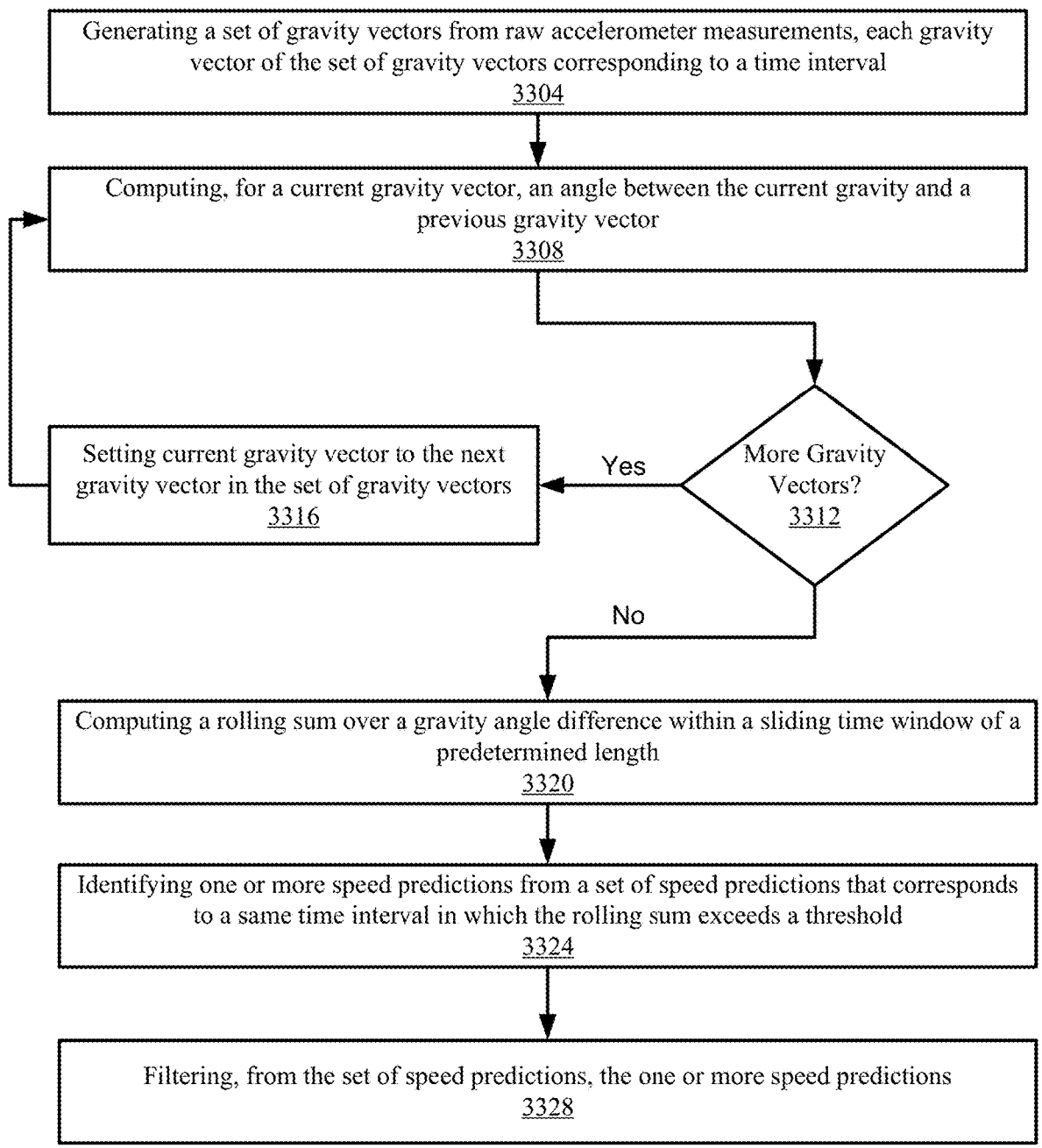
FIG. 33 is a flowchart of example of a process for filtering speed predictions according to aspects of the present disclosure.

FIG. 33 is a flowchart of example of a process for filtering speed predictions according to aspects of the present disclosure. The process includes generating a set of gravity vectors from raw accelerometer measurements, each gravity vector of the set of gravity vectors corresponding to a time interval (block 3304). Each gravity vector of the set of gravity vector may be one dimensional (e.g., incorporate raw accelerometer measurements from a single axis, such as the x-axis, y-axis, or z-axis), two dimensional (e.g., incorporate raw accelerometer measurements from two axes), or three dimensional (e.g., incorporate raw accelerometer measurements from the x-axis, y-axis, and z-axis). Each gravity vector may be associated with the time in which the corresponding raw acceleration measurements were collected. Gravity vectors may be generated in predetermined regular intervals (e.g., referred to herein as time steps) that may be determined based on the sampling rate of the accelerometer or by a user. For example, a gravity vector may be generated every half second, second, or the like.

In some instances, each gravity vector may be derived from a median of a set of raw acceleration signals. This may prevent signal noise from the accelerometer from propagating to the derived gravity vector. For instance, a rolling window may be defined with a fixed length time interval. The median accelerometer measurements collected over the time interval may be used to derive a gravity vector. For example, the sliding window may include 22 seconds (e.g., T=0-22) of raw accelerometer measurements and derive a first gravity vector from the median accelerometer measurements collected over the 22 seconds sliding window. The sliding window may than increment such that the sliding window includes a newest raw accelerometer measurement and discards an oldest raw accelerometer measurement (e.g., T=1-23, where the window no longer includes the accelerometer measurement collected at T=0, but includes an accelerometer measurement collected at T=23). A second gravity vector may be derived from the raw accelerometer measurements that are within the sliding window. The sliding window may increment in real time, when a new accelerometer measurement is received at a predetermined time intervals (e.g., every 0.5 seconds, every 1 second, or the like).

The process continues by computing an angle between a current gravity vector and a previous gravity vector (e.g., computing the "gravity angle difference") (block 3308). The process may begin at a first gravity vector in which a previous gravity vector exists to calculate the angle between and continue for each successive gravity vector in the set of gravity vectors until there are no more gravity vectors. In some instances, the previous gravity vector may be the immediately previous gravity vector to the current gravity vector. In this instance, the process may begin at the second gravity vector (as the current gravity vector) since there exists an immediately previous gravity vector from which to calculate the angle. In other instances, the previous gravity vector may be of a predetermined distance from the current gravity vector, such as five gravity vectors previous to the current gravity vector, 10 gravity vectors previous to the current gravity vector, etc.

The process continues by determining if there are more gravity vectors (e.g., there is a gravity vector that was derived after the current gravity vector in the set of gravity vectors) (block 3312). If so, the process continues by setting the current gravity vector to the next gravity vector in the set of gravity vectors (block 3316) and returning to block 3308. Blocks 3308-3316 form a loop over the set of gravity vectors. The current gravity vector (at block 3308) is initially set to the first (and oldest) gravity vector in the set of gravity vectors and iterates through the set of gravity vectors computing the gravity angle difference between the current gravity vector and the previous gravity vector until there are no more gravity vectors in the set of gravity vectors. Once the loop has concluded, a gravity angle difference value will be available for each time step (e.g., the quantity of gravity angle difference values may be approximately equal to or less than the quantity of gravity vectors in the set of gravity vectors).

The process continues by computing a rolling sum over a gravity angle difference within a sliding time window of a predetermined length (block 3320). For example, the sliding window may 10 seconds, 15 seconds, 20 seconds, or the like. The process computes the sum of the gravity angle difference values that are within the sliding window (e.g., T=5 to T=20). The sliding window is then incremented by one time step and another sum is calculated using the gravity angle values that are within the incremented sliding window (e.g., T=6 to T=21). The rolling sum over a gravity angle difference within a sliding time window may be referred to as the "sum sliding window gravity angle difference." In some instances, a "sum sliding window gravity angle difference" may be computed for each time step in which there is a gravity angle difference value. In other instances, a "sum sliding window gravity angle difference" may be computed for each complete sliding window. For example, for a sliding window of length x, the sliding window would not be complete until T=x. In those instances, a "sum sliding window gravity angle difference" may be computed for all values that exist at T greater than or equal to x.

The process then continues by identifying one or more speed predictions from a set of speed predictions that corresponds to a same time interval in which the rolling sum exceeds a threshold (block 3324). The set of speed predictions includes a predicted speed of the vehicle for each time step in which there is a "sum sliding window gravity angle difference." The process identifies each "sum sliding window gravity angle difference" that exceeds a threshold value. In some instances, the threshold may be dynamic. For instance, the threshold may be more or less sensitive based on detected events. If a vehicle crash is detected, for example, the threshold may be sensitive with respect to the time interval immediately following the detected vehicle crash. The process then identifies the one or more speed predictions that correspond to a same time step as the "sum sliding window gravity angle differences" that exceed the threshold value. The process continues by filtering from the set of speed predictions the one or more speed predictions (block 3328). In some instances, the acceleration measurements may include unwanted values and may be partly the result of a user handling the mobile device instead of the vehicle, noise, or the like. Use of these acceleration values to generate speed predictions may yield inaccurate results. The "sum sliding window gravity angle difference," representing the volatility of the acceleration measurements, may be used as a filter to remove speed predictions that correspond to accelerations measurements with a high degree of variability (e.g., likely to be the result of non-vehicular forces or noise). When the "sum sliding window gravity angle difference" exceeds the threshold value at a time step (e.g., acceleration measurements at that time step have a high degree of volatility), the speed prediction that corresponds to that time step may be filtered from the set of speed predictions.

In some instance, the process may continue indefinitely provided there are acceleration measurements to process. For instance, blocks 3304-3328 may execute continuously while the mobile device is positioned in the vehicle on a trip (e.g., the vehicle is moving from a starting location to a destination location). The process may derive speed predictions and filter those speed predictions in real time. In other instances, blocks 3304-3328 may execute once the trip has concluded. For instance, during the trip the mobile device may collect sensor measurements throughout the drive. Once the drive concludes, the sensor measurements nay be processed in a batch process to both generate a set of speed predictions over the trip and filter those speed predictions.

In still yet other instances, the process of 3304-3328 may execute as semi-batch process in which blocks 3304-3328 may execute each time a predetermined amount of sensor measurements is collected (e.g., based on a threshold quantity of memory, enough to generate a predetermined quantity of gravity vectors, the time interval between when the vehicle starting moving to when the vehicle stopped moving, or the like) and/or upon completion of the trip (e.g., in the instance where less than a threshold amount of sensor measurements were collected, but the trip concluded).

Figure 34:
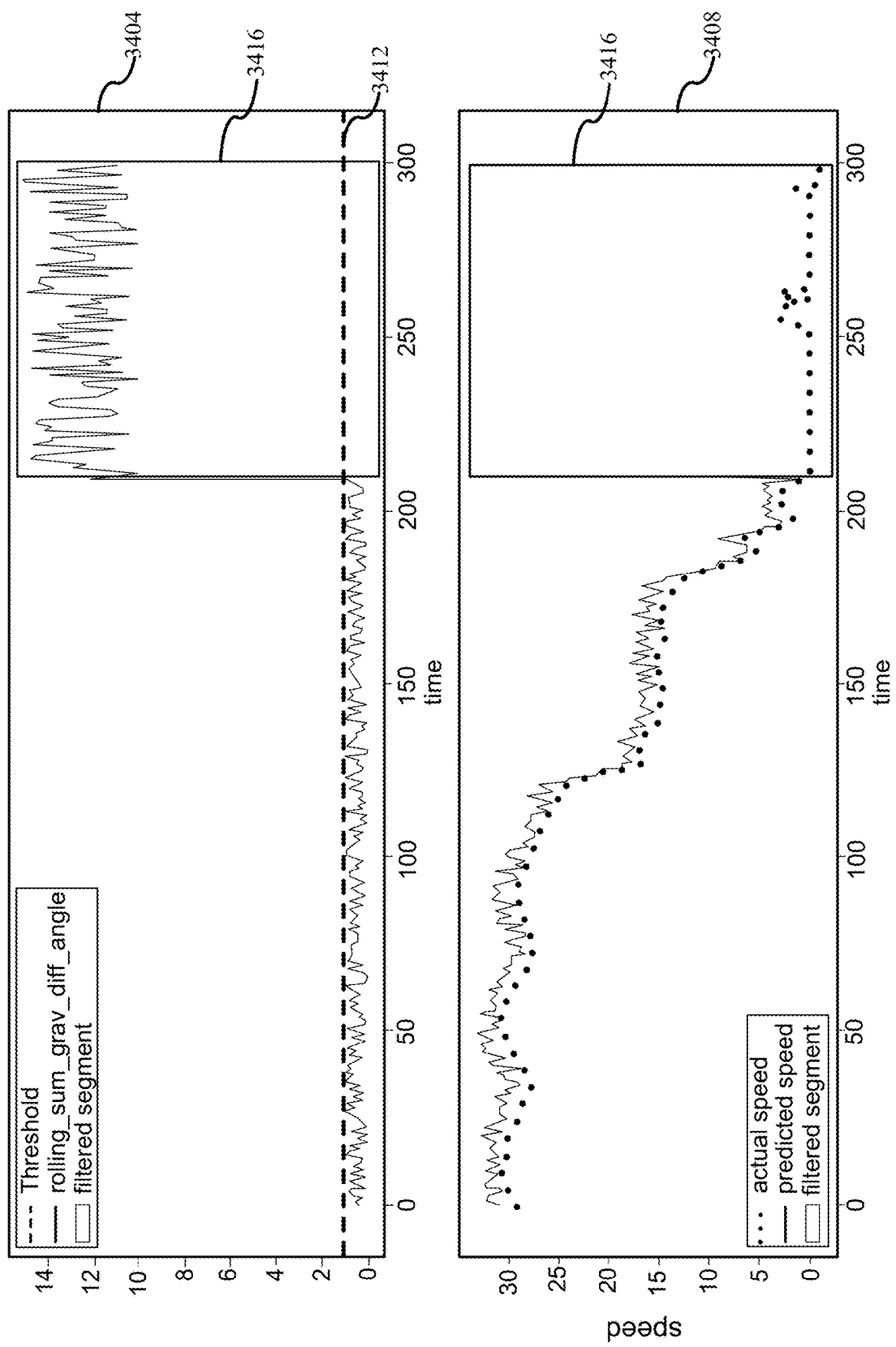
FIG. 34 includes graphs illustrating an example in which the "sum sliding window gravity angle difference" is used to filter speed predictions according to aspects of the present disclosure.

FIG. 34 includes graphs illustrating an example in which the "sum sliding window gravity angle difference" is used to filter speed predictions according to aspects of the present disclosure. Graph 3404 is a plot of the "sum sliding window gravity angle difference" over time. Graph 3408 is a plot of the actual speed of a vehicle and the predicted speed of the vehicle over the same time interval as graph 3404. Graphs 3404 and 3408 provide an illustration of an example in which speed predictions are filtered according to the process of FIG. 33. In graph 3404, when the "sum sliding window gravity angle difference" exceeds threshold 3412, as it does at approximately 210 seconds, the system begins filtering the corresponding speed prediction values 3416. Graphs 3404 and 3408 provide a graphical representation of the filtering of speed prediction values. During the process of filtering speed predictions (e.g., the process of FIG. 33), the derived values (e.g., predicted speed, the "sum sliding window gravity angle difference".) may not be represented graphically (as shown FIG. 34) but instead represented as data, as data structure, or the like.

Figure 35:
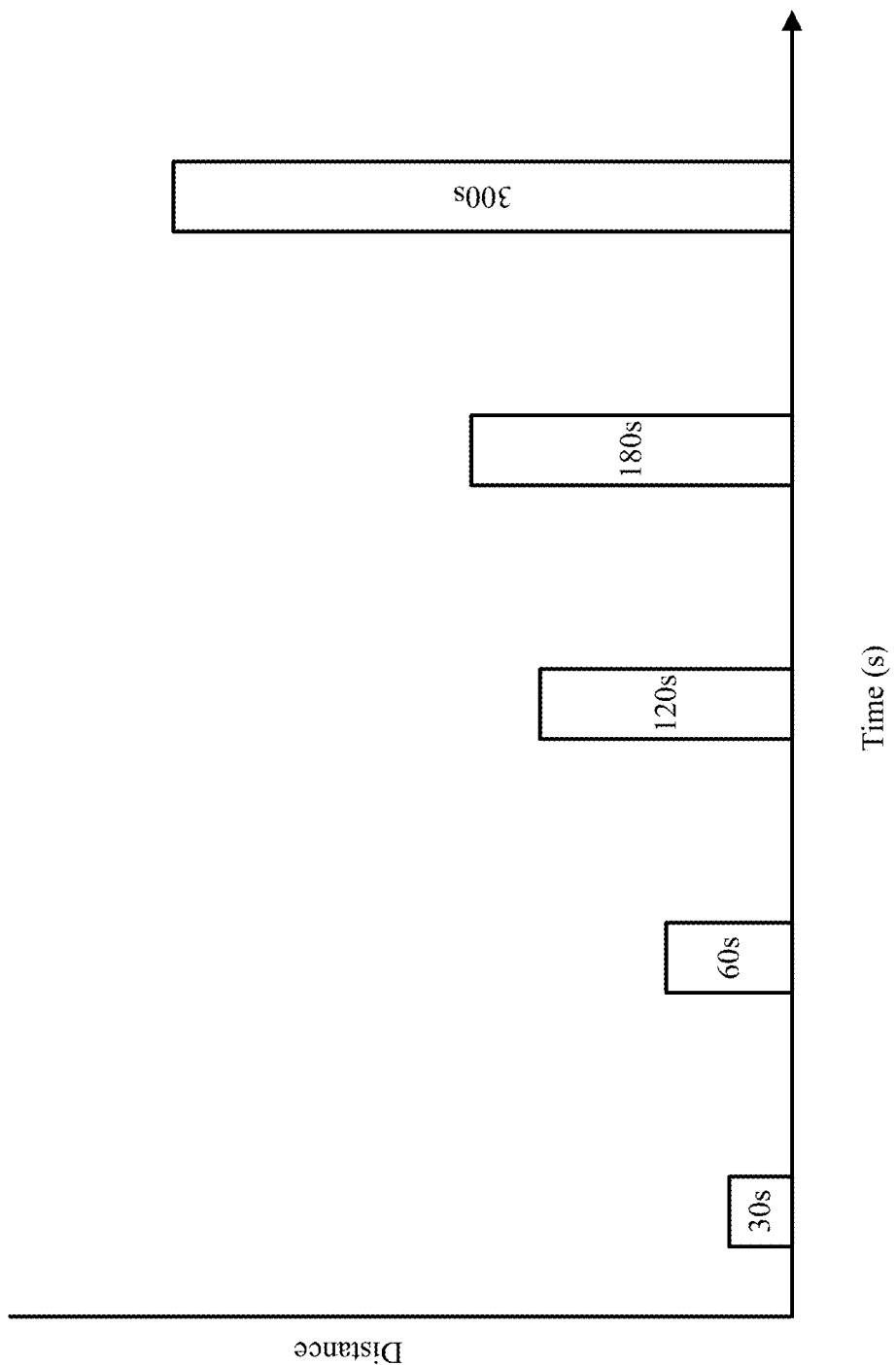
FIG. 35 is exemplary graph depicting the use of speed prediction to derive features for machine-learning model to generate a crash prediction according to some embodiments.

FIG. 35 is exemplary graph depicting the use of speed prediction to derive features for machine-learning model to generate a crash prediction according to some embodiments. A machine-learning model may generate crash predictions for a vehicle that is in operation. In some instances, signal noise or other non-vehicular forces (e.g., such as a user operating the mobile device) may cause a false positive where a crash is detected but no crash occurred. Additional features that characterize the environment of the vehicle after the crash occurred may be used to improve the accuracy of predicted crashes (e.g., eliminating false positives) and as input to the machine-learning model to refine the model or retraining.

For example, after a collision, a driver of a vehicle should bring the vehicle to a complete stop at a safe location. The driver may then survey the damage to the vehicle (e.g., to determine whether the vehicle is safe to operate), asses injuries, exchange information with other drivers, etc. Speed prediction may be used to determine if/when the vehicle comes to a stop after a detected crash. If the vehicle does stop within a predetermined time interval or distance after a detected crash, then the crash prediction is more likely to have been accurate. On the other hand, if the vehicle continues to drive after the detected crash, then the detected crash may be a false positive. The detection of the vehicle coming to a stop (based on the speed prediction) and the distance after the detected crash in which the vehicle came to a stop may be additional features that may be used to determine the accuracy of crash prediction (e.g., filter out false positives/negatives) and to further improve the accuracy of the machine-learning model in generating crash predictions (e.g., by labeling sensor data used to train the machine-learning model).

The distance from a location of a potential crash may be determined by computing the mean predicted speed over one or more windows after the time in which the crash was detected. The window may be of a fixed and predetermined length such as 30 seconds, 60 seconds, 120 seconds, 180 seconds, 300 seconds, or of any length set by the mean predicted speed (e.g., with a higher mean predicted speed having a larger window) a user. Distances can be calculated by multiplying the mean speed by the duration of each window). The distances may be calculated for each window using the predicted speed (e.g., as described in FIG. 29) and again using filtered speed (e.g., as described in FIG. 33-34). For the five windows depicted in FIG. 35 (e.g., 30 seconds, 60 seconds, 120 seconds, 180 seconds, 300 seconds), 10 distance features would be derived: one distance feature for each window using unfiltered predicted speed, and one distance feature for each window using filtered predicted speed. Additional distance features may be generated if additional windows are selected.

The distance features may be used to determine a predicted crash actually occurred. For example, if the vehicle comes to a stop within a predicted distance after a crash was detected, then it may be more likely that the crash occurred. On the other hand, if vehicle does not come to a stop within a predicted distance, then it may be more likely that the predicted crash was a false positive. In that case, the detected crash may be discarded and data collection by the mobile device may continue until the drive has concluded.

Alternatively or additionally, the distance features may be used as additional inputs for a machine-learning model configured to generate the crash predictions (e.g., either the same machine-learning model that generated the original crash prediction or a different machine-learning model). Generating a new crash prediction using the distance features as additional input may produce a crash prediction that is more accurate than the initial crash prediction.

In some instances, the additional information may be used to provide labels for future training. For example, if the driver did not stop after a crash was predicted, then the sensor data that was input to the machine-learning model may be labeled with "not a crash." Similarly, if the vehicle did stop after the predicted crash, then the sensor data that was input to the machine-learning model may be labeled with "crash." The labels assigned to the sensor data may be used by the machine-learning model to refine how machine-learning model generates future predictions and may improve the accuracy of the machine-learning model in generating future crash predictions.

Figure 36:
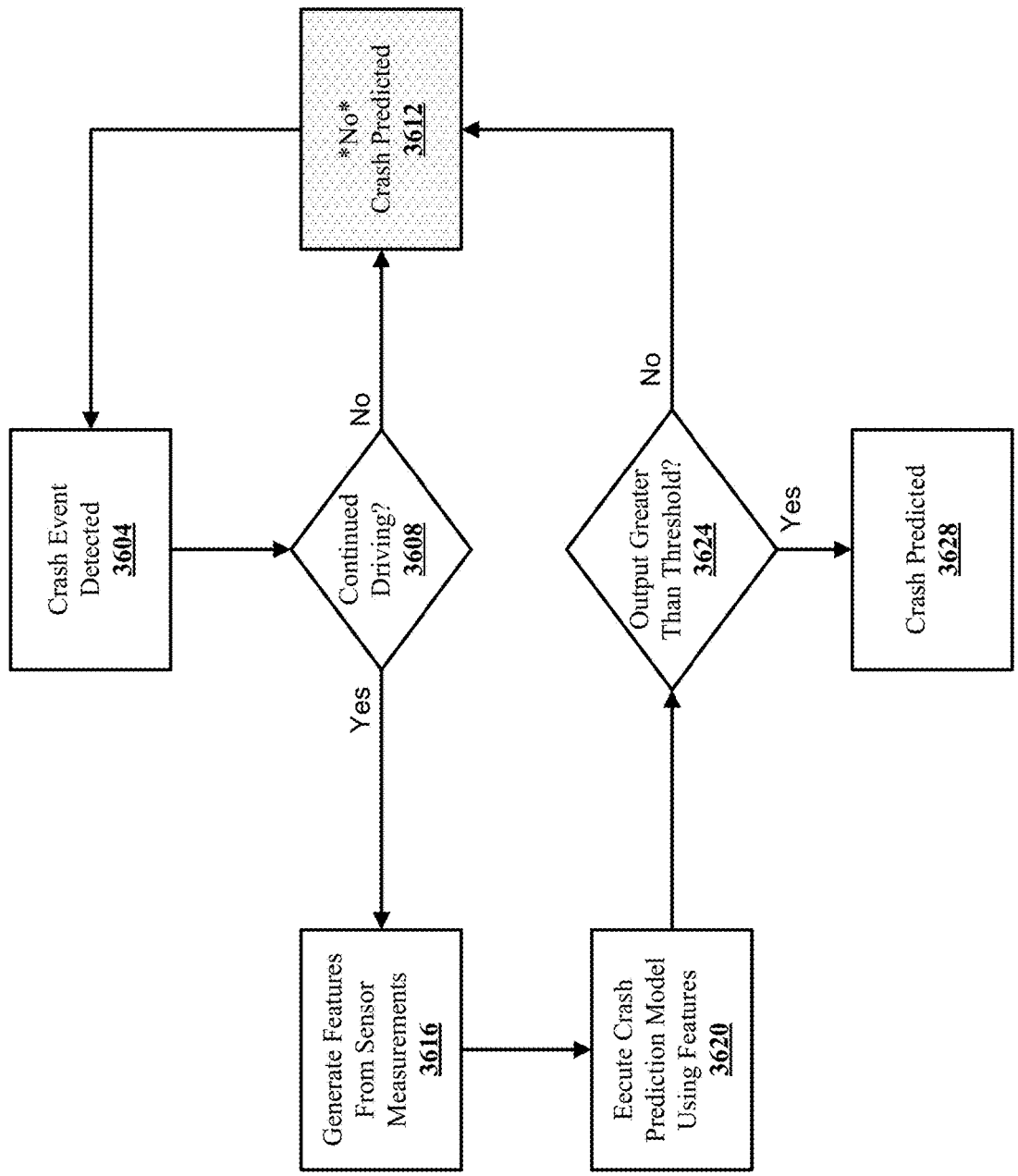
FIG. 36 is a block diagram of a process for predicting a vehicle crash according to aspects of the present disclosure.

FIG. 36 is a block diagram of a process for predicting a vehicle crash according to aspects of the present disclosure. At block 3604, a crash event associated with a vehicle is detected. A mobile device disposed within the vehicle may collect sensor measurements using sensors of the mobile device. These sensor measurements may be processed and passed as input into a crash prediction machine-learning model to generate a crash prediction. The crash prediction machine-learning model may be trained to generate crash predictions using sensor measurements (e.g., raw sensor measurements or processed sensor measurements such as those described by preprocessing pipeline 2912 of FIG. 29). The crash prediction machine-learning model may be trained using supervised learning, unsupervised learning, or semi-supervised learning. The crash prediction machine-learning model may generate crash predictions continuously (such as in regular intervals while the vehicle is in operation). In other instances, a crash prediction may be generated upon detecting anomalous sensor measurements (e.g., sensor measurements that exceed a threshold or the like).

At block 3608, it is determined whether the vehicle has come to a stop. For example, the mobile device may use sensor measurements to predict a speed of the vehicle (in real time, continuously, in regular intervals, upon detecting an event such as crash event, or the like). After the crash is detected, the mobile device may determine, after a predetermined time interval or distance from the crash event, whether the speed of the vehicle is greater than zero.

If the vehicle is still moving, the process moves to block 3612 in which it is determined that no crash occurred (e.g., the vehicle crash was a false positive) and the process of FIG. 36 returns to block 3604 and waits until another crash is detected or the vehicle is no longer in operation (e.g., the current trip has concluded).

If the vehicle came to a stop, then the process moves to block 3616 in which features may be generated from the sensor measurements. The features can include the features used by the machine-learning model to determine the original crash event at block 3604. The features may also include sensor measurements collected or derived after the crash event. For instance, the features may include one or more distance features corresponding to the distance that the car traveled after the crash occurred before coming to a stop as described in connection to FIG. 35. The one or more distance features may be derived by multiplying the mean predicted speed over each of one or more time windows (e.g., 30 seconds, 60 seconds, 120 seconds, 180 seconds, and/or 300 seconds). Alternatively or additionally, one or more distance features may be derived by multiplying the mean filtered predicted speed (e.g., as described in FIG. 33) over each of one or more time windows (e.g., 30 seconds, 60 seconds, 120 seconds, 180 seconds, and/or 300 seconds).

The distance features may provide additional information after the crash event that may provide an indication as to the severity of crash and whether the movement of the vehicle after the crash was the result of a crash event or other driving activities (e.g., reaching a destination, a stop sign or traffic light, traffic, etc.). For example, if the vehicle was disabled by the crash then the vehicle would almost immediately come to a stop after the crash. This may provide an indication that the crash event was severe enough to disable the vehicle (e.g., not a mere "fender bender"). If the vehicle continued to drive for a short duration before coming to a stop, then it may indicate that the crash event was not severe as the vehicle was able to continue operations. In another example, the distance features (with other information) may provide an indication that the vehicle stop was due to a stoplight or other routine driving operations, which may provide an indication that the crash event at 3604 was a false positive.

At block 3620, a crash prediction machine-learning model may be executed using the generated distance features to generate a new crash prediction. In some instances, this crash prediction machine-learning model may be the same machine-learning model executed at block 3604. In other instances, the crash prediction machine-learning model may be a second (different) machine-learning model. In those instances, the second machine-learning model may be trained using the sensor measurements with the distance features. The second machine-learning model may be trained using supervised learning, unsupervised learning, or semi-supervised learning.

The crash prediction machine-learning model may generate a new crash prediction based on the additional information of the generated distance features. The crash prediction machine-learning model may generate a probability that a crash has occurred at a particular time. The probability may be represented by any predetermined means (a number between 0 and 1, 1 and 100, a grade such as A-F, etc.).

At block 3624, it is determined whether the new crash prediction is greater than a threshold. In some instances, the threshold may be dynamically selected (at runtime). The sensor measurements and/or the original crash prediction may be used to set the threshold. The threshold may be different for each crash event. For example, if the original crash event indicated a high probability (e.g., 75-100%) that the crash occurred (although the car continued driving), then the threshold may be set to a lower value. As a result, a lower, new crash detection probability will satisfy the threshold and indicate the crash occurred. This allows the system to rely partly on the original crash detection results to determine that a crash has occurred. If the original crash prediction was at a lower probability (e.g., 50-75%), then the threshold may be set higher to be more sensitive to the potential of a false positive. In other instances, the threshold may be predetermined. In those instances, the threshold may be set by a machine-learning model, such as the crash prediction machine-learning model, the user, a command from a remote device, or the like.

In some instances, multiple thresholds may be used. For instance, if the crash prediction is greater than a first threshold, the process may continue to block 3628. If the crash prediction is between a first threshold and a second threshold, the process may continue by first asking a user for confirmation as to whether a crash occurred. If the user confirms the crash, then the process continues to block 3628. If the user does not confirm the crash, then the process continues to block 3612. In some instances, if the user does not reply within a predetermined time interval, a crash may be presume. For example, the crash may have prevented the user from confirming due to injury or damage to the mobile device. As a result, the process may proactively request emergency services or the like. If the crash prediction is lower than the second threshold, then the process may continue to block 3612. The first threshold may be set higher than the second threshold. For example, the first threshold may be set to 85% and the second threshold may be set to 65%. The first threshold and the second threshold may be set to any predetermined (or dynamically selected) values provided that one threshold is higher than the other threshold.

If at block 3624, it is determined that the new crash prediction is greater than the threshold, then the process shifts to block 3628 in which it is indicated that a crash occurred. In some instances, one or more actions may be performed as a result of determining that the crash has occurred such as, but not limited to, automatically transmitting a crash indication to the user of the mobile device (e.g., to start a claims process, determining the safety of the people involved in the crash, gather additional information about the crash, to provide information to the user about what to do after a crash, to provide safety information, and to provide First Aid information), automatically transmitting a crash indication to emergency services, automatically transmitting a crash indication to insurance personnel associated with the vehicle or driver, modifying a driving profile of the driver to include the crash indication and optionally sensor measurements associated with the crash, or the like.

If at block 3624, it is determined that the new crash prediction is not greater than the threshold, then the process continues to block 3612 in which it is indicated that a crash did not occur. In some instances, the crash predictions (e.g., at 3604 and/or at 3620) may be discarded from the system. In other instances, both the crash predictions and the sensor measurements that triggered the crash prediction may be discarded or otherwise marked so as to prevent the use of the sensor measurements in other data analysis. Since the sensor measurements caused at least one false positive crash prediction, the data may include anomalous sensor measurements that may not be reliable even for other analysis operations (e.g., determining driver behavior such as distracted driving or the like). In still yet other instances, the crash prediction may be preserved and further used to train and/or refine the crash prediction machine-learning model (s).

Figure 37:
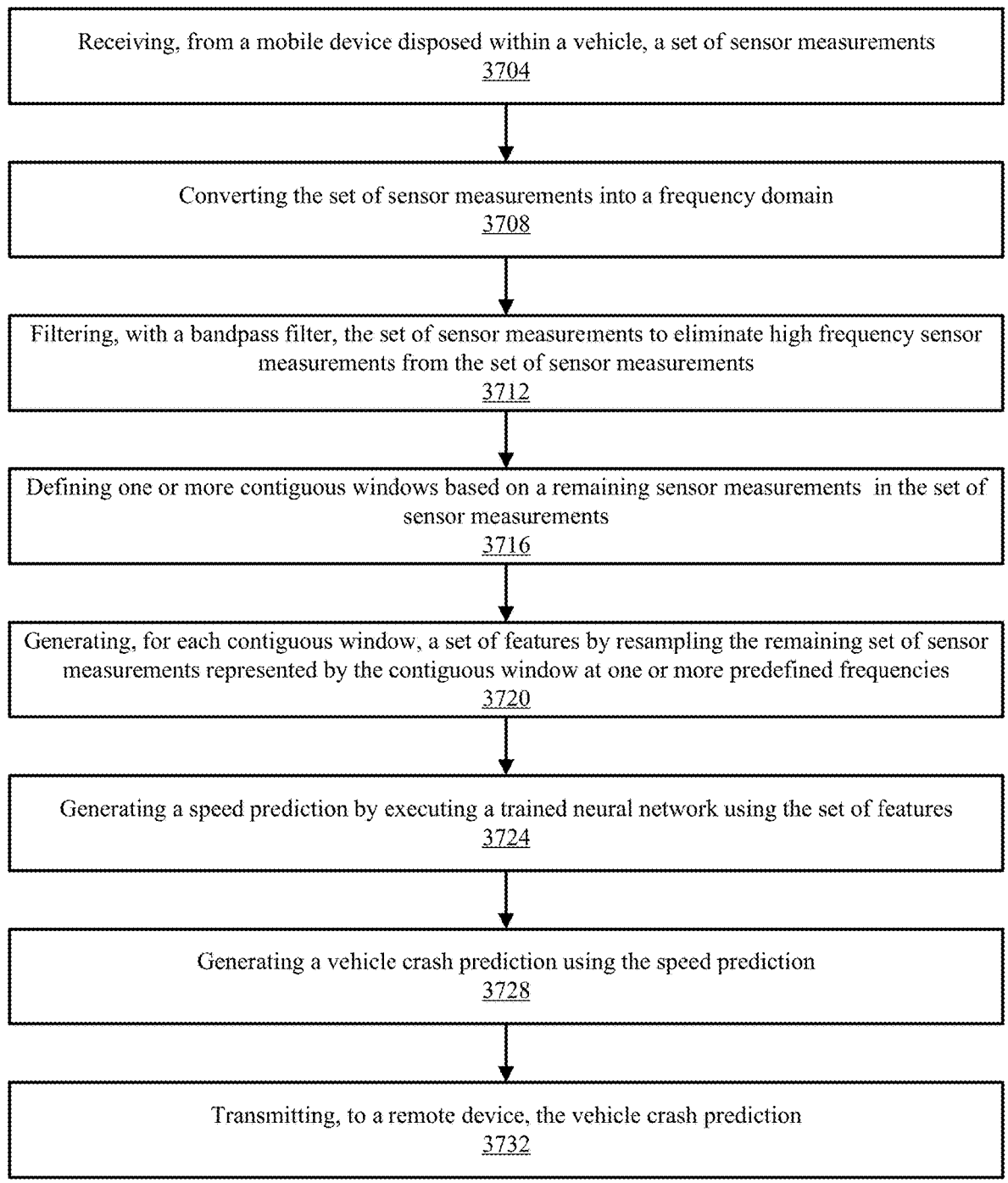
FIG. 37 is a flowchart of example of a process for generating a crash prediction a predicted speed of a vehicle according to some embodiments.

FIG. 37 is a flowchart of example of a process for generating a crash prediction a predicted speed of a vehicle according to some embodiments. The process begins by receiving, from a mobile device disposed within a vehicle, a set of sensor measurements (block 3704). The set of sensor measurements may include measurements received or derived from one or more sensors of the mobile device such as, but not limited to measurements from an accelerometer, activity data (e.g., as described by FIG. 12), measurements from a magnetometer, and/or measurements from one or more other sensors of the mobile device. The sensor measurements may be received over a predetermined time interval or event. For instance, the set of sensor measurements may be received in real time or in regular intervals such as, but not limited to, every half second, one second, five seconds, or any predetermined interval.

Alternatively, the set of sensor measurements may be received (in real time or in regular intervals) over a trip (e.g., where a vehicle is being operated to move from a starting location to a destination location). For example, activity data may be collected from the mobile device as described in connection to FIG. 12 above. The activity data may be used to determine when an activity such as a drive begins and ends. When the mobile device detects that a drive has begun, the mobile device may begin collecting the set of accelerometer measurements from the accelerometer of the mobile device until the activity data (a user, or remote communication), indicates that the drive has terminated.

Alternatively still, the set of sensor measurements may be received from a remote device such as remote accelerometer, a mobile device, a server, or the like. The set of sensor measurements may include sensor measurements collected during the drive. In some instances, the set of sensor measurements may be received after the drive was terminated, upon detection of a crash event, upon detection of another event, upon the expiration of a time interval, when sensor signals exceed a threshold, or the like.

The process continues by converting the set of sensor measurements into a frequency domain (block 3708). The set of sensor measurements may be converted using any means such as a Fourier transform or the like. In some instances, this may performed by a machine-learning model trained to process accelerometer signals. The machine-learning model may be configured to additionally perform one or more of blocks 3712-3720.

The process continues by filtering, with a bandpass filter, the set of sensor measurements to eliminate high frequency sensor measurements from the set of sensor measurements (block 3712). The bandpass filter filters out a portion of the sensor measurements that occur at particular frequencies. For example, frequencies associated with signal noise sensor measurements that do not correspond to the vehicle (e.g., movement of the mobile device independent from movement of the vehicle). In some instances, frequencies that are greater than a first threshold frequency and less than a second threshold frequency may be filtered. The first threshold may be, for example, approximately 50 Hz and the second threshold may be, for example, approximately 9 Hz. The first and second thresholds may be selected by a process of the mobile device (such as, a data collection application, the operating system, etc.), by a user, from a communication received from a remote device, or the like.

The process continues by defining one or more contiguous windows based on a remaining sensor measurements in the set of sensor measurements (block 3716). Defining one or more contiguous windows from the remaining (filtered) set of sensor measurements may be performed as described by block 2924 of FIG. 29. The contiguous windows may be defined for the time interval over which the accelerometer signals were received. Each accelerometer measurement may correspond to a contiguous window based on time interval represented by a contiguous window and when the accelerometer signal was generated by the accelerometer.

The one or more contiguous windows may be defined by identifying a time difference between each pair of consecutive accelerometer signals (e.g., when the signals were generated by the accelerometer). A continuous window may be defined between a first pair of consecutive sensor measurements that is greater than a threshold (e.g., three standard deviations from the mean time difference between consecutive accelerometer measurements or the like) and the next pair of consecutive sensor measurements that is greater than the threshold. Since the time difference between pairs of consecutive accelerometer measurements varies, the contiguous windows may not be of equal length. Each contiguous window includes a time interval over which a subset of the remaining set of sensor measurements were generated by the accelerometer.

The process continues by generating, for each contiguous window, a set of features by resampling the subset of the remaining set of sensor measurements represented by the contiguous window to one or more predefined frequencies (block 3716). The subset of the remaining set of sensor measurements may be resampled as described by 2928 of FIG. 29, which may be determined, for example, as a frequency of 9-50 Hz, by user input, by a communication from a remote device, or the like.

The process continues by generating, for each set of features, one or more speed predictions by executing a trained neural network using the set of features. The trained neural network may be neural network 2932 of FIG. 29, neural network 3100 of FIG. 31 (e.g., which may the same as neural network 2932), or a different neural network. The neural network may be trained using supervised or unsupervised learning to generate a speed prediction from sensor measurements.

In some instances, the speed predictions may be filtered to prevent reliance on signal noise or accelerometer signals that are not associated with the vehicle from producing inaccurate speed predictions. For example, the one or more speed predictions may be filtered as described by the process of FIG. 33.

The process continues by generating a vehicle crash prediction using the one or more speed predictions (block 3728). Generating a vehicle crash prediction from one or more speed predictions may be performed as described by some or all of the blocks by FIG. 36. For example, a vehicle crash prediction may be provided by a crash-prediction machine-learning model that indicates a crash event occurred. The vehicle crash prediction may be authenticated using the speed prediction to determine whether the vehicle stopped after the crash event. If the vehicle did not stop then the crash prediction may be defined as false (e.g., the crash event did not occur). If the vehicle did stop, then the crash prediction may be defined as true (e.g., the crash event did occur).

For another example, a vehicle crash prediction may be provided by a crash-prediction machine-learning model that indicates a crash event occurred. The vehicle crash prediction may be authenticated using the speed prediction to determine whether the vehicle stopped after the crash event. The speed prediction may be used to derive distance features that indicate if and/or when the vehicle stopped after an initial crash detection. The distance features may be provided to the crash prediction machine-learning model (e.g., the neural network that provided the speed prediction, the same crash prediction machine-learning model that provided the initial crash prediction, or another crash prediction machine-learning model), which may execute using the distance features and (optionally) the sensor measurements to provide a final crash detection to generate a final crash prediction. The final crash prediction may be a probability that a crash occurred (e.g., between 0-1, 0-100, a grade between A-F, a Boolean such as true or false, or the like).

The probability may be compared to one or more thresholds. If the probability is greater than the one or more thresholds, then it may be determined that a crash occurred (e.g., the vehicle crash prediction may be defined as true). If the probability was less than a first threshold but greater than a second threshold (if utilized), the mobile device may trigger a notification to a user or another device (such as a server, an onboard computing device of the vehicle, another mobile device, or the like) to request additional information and/or confirmation of whether the crash did or did not occur. The crash event may be defined based on the user input as true (e.g., crash occurred) or false (e.g., crash did not occur). If the probability is less than the one or more thresholds, then it is determined that the crash did not occur (e.g., and the vehicle crash prediction may be defined as false).

The process continues by transmitting, to a remote device, the vehicle crash prediction (and/or final crash prediction) (block 3732).

In some instances, if it is determined that a crash occurred, one or more actions may be executed by the mobile device. Examples of the one or more actions include, but are not limited to, transmitting a notification (e.g., a push notification, an email, a robocall, a text message, or the like) to emergency services, initiating a claims process, transmitting a notification to insurance personnel, transmitting a notification to another mobile device (e.g., informing an emergency contact of the driver or passenger, requesting additional information associated with the crash from other occupants of the vehicle or occupants of other vehicles involved in the crash, or the like), determining a severity of the crash, combinations thereof, or the like.

If no crash is predicted, the process may return to block 3704 in which a new set of sensor measurements may be collected. The new set of sensor measurements may be associated with another portion of the same trip or from a subsequent trip.

Figure 38:
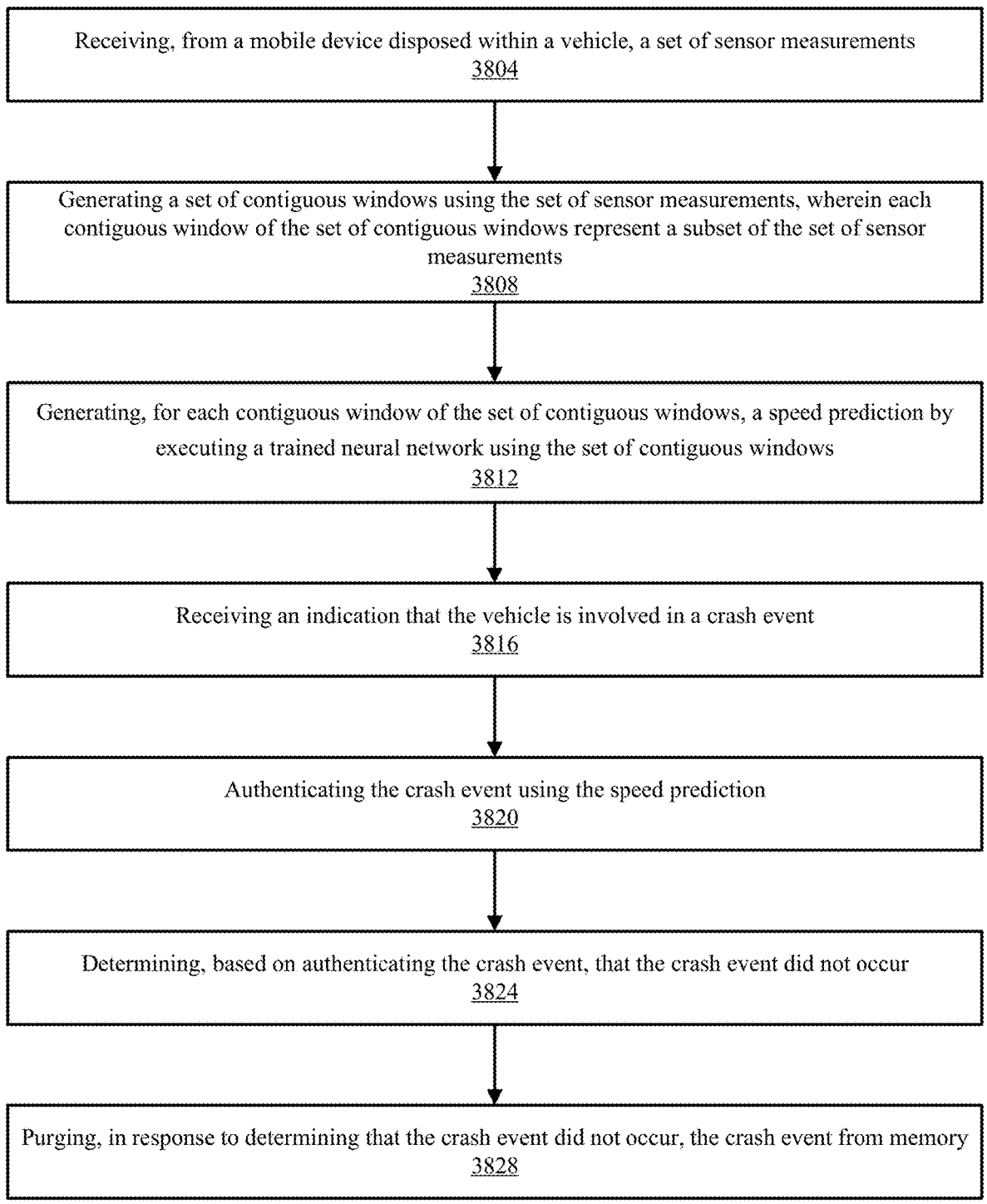
FIG. 38 is a block diagram of a process for authenticating a vehicle crash prediction using speed predictions according to aspects of the present disclosure.

FIG. 38 is a block diagram of a process for authenticating a vehicle crash prediction using speed predictions according to aspects of the present disclosure. The process begins by receiving, from a mobile device disposed within a vehicle, a set of sensor signals (block 3804). The set of sensor measurements may include measurements received or derived from one or more sensors of the mobile device such as, but not limited to measurements from an accelerometer, activity data (e.g., as described by FIG. 12), measurements from a magnetometer, and/or measurements from one or more other sensors of the mobile device. The sensor measurements may be received over a predetermined time interval or event. For instance, the set of sensor measurements may be received in real time or at regular intervals.

Alternatively, the set of sensor measurements may be received (in real time or at regular intervals) over a trip (e.g., where a vehicle is being operated to move from a starting location to a destination location). For example, activity data may be collected from the mobile device as described in connection to FIG. 12 above. The activity data may be used to determine when an activity such as a drive begins and ends. When the mobile device detects that a drive has begun, the mobile device may begin collecting the set of accelerometer measurements from the accelerometer of the mobile device until the activity data (a user, or remote communication), indicates that the drive has terminated.

Alternatively still, the set of sensor measurements may be received from a remote device such as remote accelerometer, a mobile device, a server, or the like. The set of sensor measurements may include sensor measurements collected during the drive. In some instances, the set of sensor measurements may be received after the drive was terminated, upon detection of a crash event, upon detection of another event, upon the expiration of a time interval, when sensor signals exceed a threshold, or the like.

The process continues by generating a set of contiguous windows using the set of sensor measurements, wherein each contiguous window of the set of contiguous windows represents a subset of the set of sensor measurements (block 3808). Defining one or more contiguous windows from the set of sensor measurements may be performed as described by block 2924 of FIG. 29. The contiguous windows may be defined for the time interval over which the accelerometer signals were received. Each contiguous window may represent a subset of the set of accelerometer measurements that were generated by the accelerometer during a time included in the contiguous window.

The one or more contiguous windows may be defined by identifying a time difference between each pair of consecutive accelerometer signals (e.g., when the signals were generated by the accelerometer). In some instances, the sensor measurements may be processed before the contiguous windows are defined such as filtering (e.g., as described by 2916) and normalizing the remaining sensor measurements (e.g., as described by 2920). A contiguous window may be defined between a first pair of consecutive sensor measurements that is greater than a threshold (e.g., one or more standard deviations from the mean time difference between consecutive sensor measurements or the like) and the next pair of consecutive sensor measurements that is greater than the threshold. Since the time difference between pairs of consecutive accelerometer signal varies, the contiguous windows may of varying lengths. Each contiguous window includes a time interval over which a subset of the remaining set of sensor measurements were generated by or derived from sensor of the mobile device.

The process continues by generating, for each contiguous window of the set of contiguous windows, a speed prediction by executing a trained neural network using the set of contiguous windows (block 3812). One or more features may be derived from each contiguous window. Each feature be an input to the trained neural network. The neural network may be neural network 2932 of FIG. 29 or neural network 3100 of FIG. 31 or the like. The trained neural network may execute using the subset of the set of sensor measurements that corresponds to each contiguous window to generate one or more speed predictions for the contiguous window. Each speed prediction may correspond to a time step (e.g., a particular time within the contiguous window). In some instances, the neural network may generate a set of speed predictions with one speed prediction for each time step of the contiguous window.

The process continues by receiving an indication that the vehicle is involved in a crash event (block 3816). The indication of the crash event may be determined by the mobile device from the sensor measurements. For instance, a crash prediction machine-learning model may execute to generate a crash prediction using the sensor measurements. The crash prediction machine-learning model may be the neural network or a separate model. In some instances, the indication of the crash event may be received from a remote device. For instance, the sensor measurements may be transmitted to a remote device. The remote device may execute the crash prediction machine-learning model to generate a crash prediction. The remote device may then transmit the indication of a crash event back to the mobile device.

The process continues by authenticating the crash event using the speed prediction (block 3820). The crash prediction may be authenticated by one or more of the process described in FIG. 36. In some examples, authenticating the crash event may include determining, using the speed prediction, whether the vehicle continued to drive after the crash event. The mobile device may use multiple time windows (30 seconds, 60 seconds, 120, seconds, 180 seconds, 300, seconds, etc.) and determine if and/or when the vehicle stopped with each time window. If the vehicle did not stop, then it may be determined that the indication of the crash event was a false positive (e.g., no crash event occurred).

In other examples, authenticating the crash event can include determining, using the speed prediction, whether the vehicle continued to drive after the crash event. If it was determined that the vehicle stopped after the crash event, distance features may be derived from the speed predictions and the time windows. The distance features may indicate if and/or when the vehicle stopped after an initial crash detection and at what distance from the crash event. The distance features may be provided to the crash prediction machine-learning model (e.g., the neural network that provided the speed prediction, the same crash prediction machine-learning model that provided the initial crash prediction, or another crash prediction machine-learning model), which may execute using the distance features and (optionally) the sensor measurements to generate an updated crash prediction. The updated crash prediction may be a probability that a crash occurred (e.g., between 0-1, 0-100, a grade between A-F, a Boolean such as true or false, or the like).

The probability may be compared to one or more thresholds. If the probability is greater than the one or more thresholds, then it may be determined that a crash event occurred. If the probability was less than an first threshold, but greater than a second threshold (if utilized), the mobile device may trigger a notification to a user or another device (such as a server, an onboard computing device of the vehicle, another mobile device, or the like) to request additional information and/or confirmation of whether the crash did or did not occur. The crash event may be defined based on the user input as true (e.g., crash occurred) or false (e.g., crash did not occur). If the probability is less than the one or more thresholds, then it is determined that the crash did not occur.

The process continues by determining, based on authenticating the crash event that the crash event did not occur (block 3828).

The process continues by purging, in response to determining that the crash event did not occur, the crash event from memory. In some instance, purging the crash event from memory may include purging the local memory of the mobile device. In other instances, the crash event from memory may include purging memory of one or more remote devices (e.g., other mobile devices, servers) that may be configured to process sensor measurements of the mobile device, provide speed predictions using sensor measurements of the mobile device, provide crash predictions using sensor measurements of the mobile device, or the like.

The processes of blocks 3804-3824 may continue to receive sensor measurements and upon receiving another indication of a possible crash event, authenticate the crash event.

Figure 39:
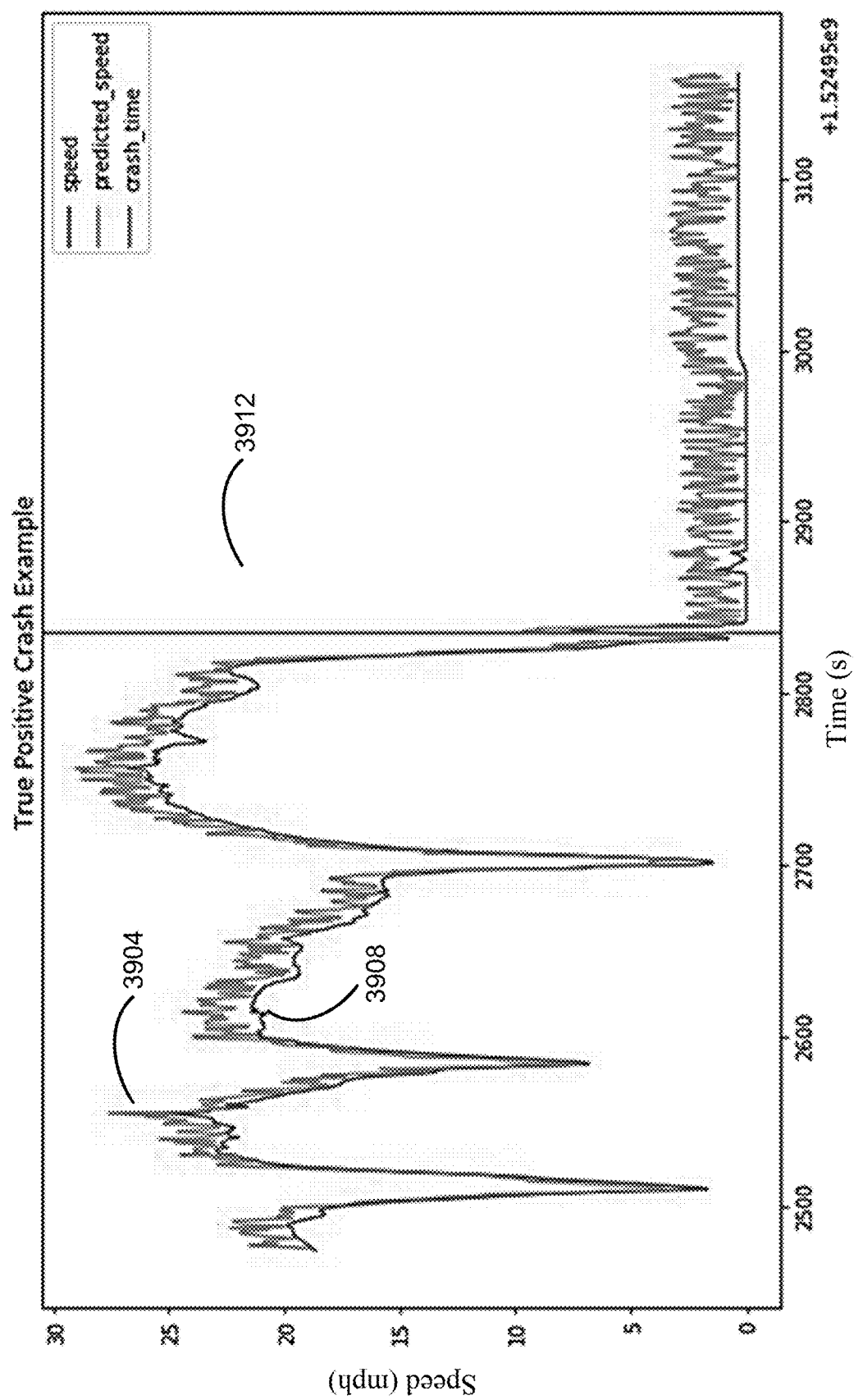
FIG. 39 is an example graph of predicted speed over time representing a true positive crash prediction according to aspects of the present disclosure.

FIG. 39 is an example graph of predicted speed over time representing a true positive crash prediction according to aspects of the present disclosure. Graph 3900 depicts the predicted speed of a vehicle during a drive 3904 (in gray) and the actual speed of the vehicle 3908 (in black). At 3912 (T=2840), a crash prediction indicates the occurrence of a possible crash event. After 3912, the predicted speed of the vehicle (and the actual speed) are reduced to approximately zero indicating the vehicle stopped after the possible crash event. Since the vehicle stopped after the crash event, the possible crash event is more likely to be a true positive (e.g., the crash occurred).

Figure 40:
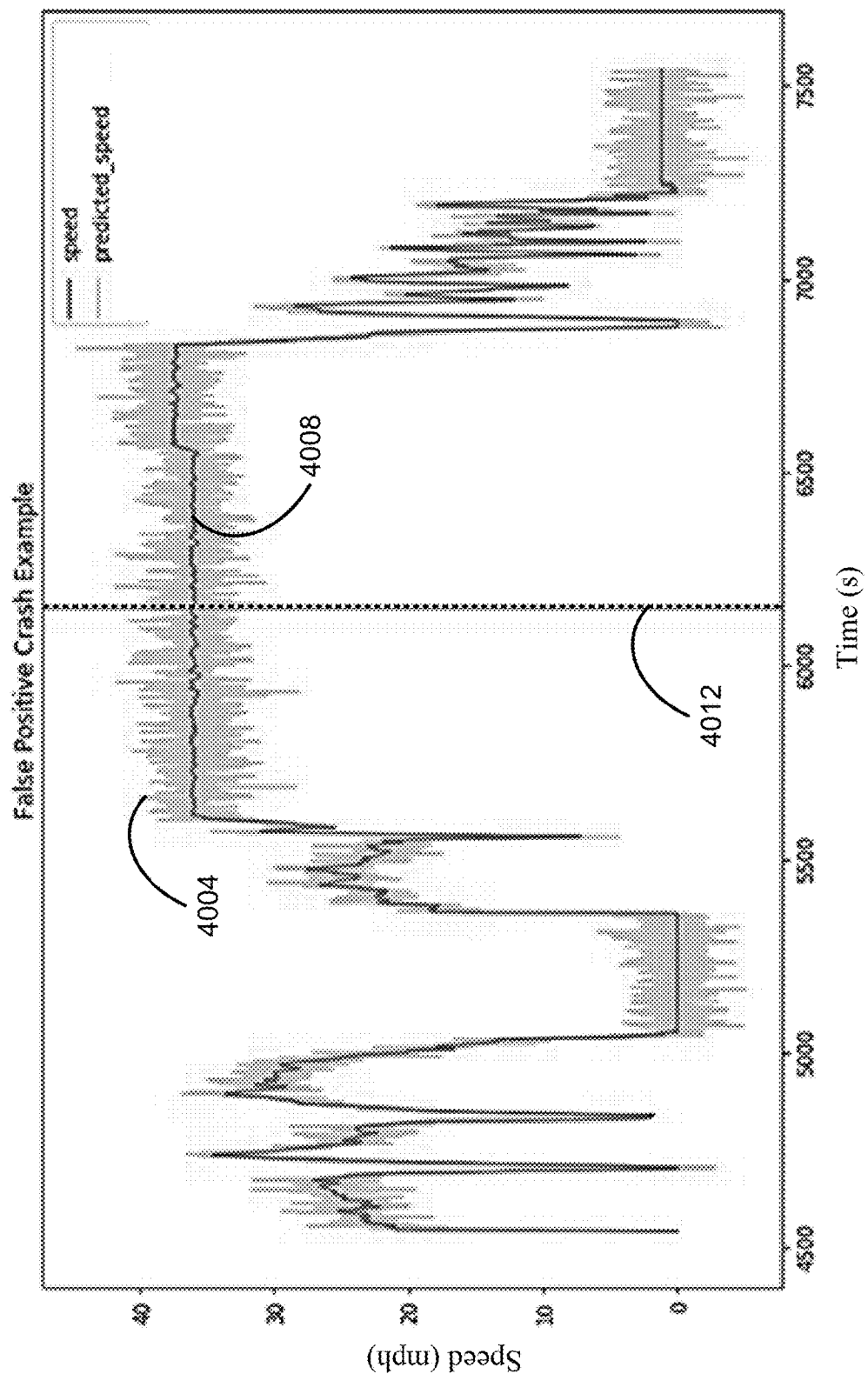
FIG. 40 is an example graph of predicted speed over time representing a false positive crash prediction according to aspects of the present disclosure.

FIG. 40 is an example graph of predicted speed over time representing a false positive crash prediction according to aspects of the present disclosure. Graph 4000 depicts the predicted speed of a vehicle during a drive 4004 (in grey) and the actual speed of the vehicle 4008 (in black). At 4012 (T=6200), the predicted speed of the vehicle is approximately 36 mph when a crash prediction indicates the occurrence of a possible crash event. After 4012, the predicted speed of the vehicle (and the actual speed) does not change but continues at 36 mph. Since the vehicle did not stop after the crash event, the possible crash event is more likely to be a false positive (e.g., no crash event occurred). As a result, the crash prediction may be purged from local memory.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code, or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein, the term "memory" refers to any type of volatile, non-volatile, or other storage medium and is not to be limited to any particular type of memory, number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices, and/or other machine readable mediums for storing information. The term "computer-readable medium" includes, but is not limited to, portable or fixed storage devices, optical storage devices, and/or various other storage mediums capable of storing that contain or carry instruction(s) and/or data.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method comprising:
measuring, by one or more sensors of a mobile phone disposed in a vehicle during a drive, movements of the mobile phone, the one or more sensors being configured to transmit electronic signals to a processor of the mobile phone indicating the movements of the mobile phone during the drive;
receiving, by the processor of the mobile phone, the electronic signals from the one or more sensors indicating the movements;
fetching, by the processor and from a memory of the mobile phone, a subset of the movements that comprises movements measured between a start time and an end time of a first trip segment completed within the drive for which accurate Global Positioning System (GPS) data from a GPS receiver of the mobile phone is unavailable;
filtering, by the processor, the subset of the movements to remove a first set of movements caused by a user of the mobile phone from the subset of the movements, thereby providing a second set of movements caused by motion of the vehicle;
detecting, by the processor, one or more complete turns made by the vehicle during the first trip segment based on the second set of movements, wherein each of the one or more complete turns comprises a respective turning direction;
determining, by the processor, a distance traveled by the vehicle before and after each of the one or more complete turns based on the second set of movements;
constructing, by the processor, an estimated sequence of the one or more complete turns and the distance traveled by the vehicle before and after each of the one or more complete turns;
determining, by the processor, a start location and an end location for the first trip segment;
selecting, by the processor, a plurality of candidate routes between the start location and the end location from map data for a region comprising the start location and the end location, wherein each candidate route of the plurality of candidate routes comprises a sequence of one or more turns and one or more travel distances between the start location and the end location;

comparing, by the processor, the sequence from each candidate route of the plurality of candidate routes with the estimated sequence to identify a matching route for the first trip segment;

detecting, by the processor, a user interaction with an interactive graphical user interface (GUI) presented on a display of the mobile phone; and in response to detecting the user interaction with the interactive GUI, causing, by the processor, the display to present a graphical image of the matching route on a map in the interactive GUI.

2. The method of claim 1, further comprising:
activating, by the processor, an application stored on the mobile phone after the drive has already begun;
detecting, by the processor, and in response to activating the application, a location of the mobile phone at an activation time of the application to determine the end location; and
determining the end time of the first trip segment based on the activation time.

3. The method of claim 1, wherein the one or more sensors of the mobile phone-comprise at least one of an accelerometer, a magnetometer, a gyroscope, a compass, or a barometer.

4. The method of claim 1, wherein the movements do not include GPS location data.

5. The method of claim 1, wherein determining the distance traveled by the vehicle before and after each of the one or more complete turns comprises:
analyzing the second set of movements to generate predicted speeds of the vehicle over time before and after each of the one or more complete turns; and
integrating the predicted speeds of the vehicle over time to produce the distance traveled by the vehicle before and after each of the one or more complete turns.

6. The method of claim 5, wherein:
the subset of the movements include motion sensor measurements;
filtering the subset of the movements to remove the first set of movements comprises:
converting the motion sensor measurements into a frequency domain; and
filtering, with a bandpass filter, the motion sensor measurements in the frequency domain to eliminate high frequency sensor measurements from the motion sensor measurements; and
analyzing the second set of movements to generate the predicted speeds comprises:
defining a set of contiguous windows based on remaining measurements in the motion sensor measurements after filtering the motion sensor measurements to eliminate the high frequency sensor measurements, each contiguous window of the set of contiguous windows representing a contiguous portion of the remaining measurements in the motion sensor measurements;
generating, for each contiguous window of the set of contiguous windows, a set of features by resampling the motion sensor measurements of the contiguous window at one or more predefined frequencies; and
executing a trained neural network using the set of features.

7. The method of claim 1, wherein detecting the one or more complete turns made by the vehicle comprises:
determining rates of course change with respect to time from the second set of movements; and
comparing the rates of course change against a threshold, wherein a turn is detected in response to determining that a rate of course change exceeds the threshold.

8. The method of claim 7, wherein the rates of course change are determined by executing a trained neural network.

9. The method of claim 1, further comprising:
detecting, by the processor, driving activity at a first time based on the movements; and
determining, by the processor, and in response to detecting the driving activity, the start time of the first trip segment based on the first time.

10. The method of claim 1, further comprising:
analyzing the movements to generate predicted speeds of the mobile phone over time;
determining, by the processor, that a predicted speed of the mobile phone exceeded a threshold speed at a first time; and
determining, by the processor, the start time of the first trip segment based on the first time.

11. The method of claim 1, wherein the start location is determined based on a previous end location of a previous trip or visit.

12. A non-transitory machine-readable storage medium, including instructions that, when executed by one or more processors of a mobile phone disposed in a vehicle during a drive, cause the one or more processors to perform operations comprising:
causing one or more sensors of the mobile phone to measure movements of the mobile phone, the one or more sensors being configured to transmit electronic signals to the one or more processors of the mobile phone indicating the movements of the mobile phone during the drive;
receiving the electronic signals from the one or more sensors indicating the movements;
fetching, from a memory of the mobile phone, a subset of the movements that comprises movements measured between a start time and an end time of a first trip segment completed within the drive for which accurate Global Positioning System (GPS) data from a GPS receiver of the mobile phone is unavailable;
filtering the subset of the movements to remove a first set of movements caused by a user of the mobile phone from the subset of the movements, thereby providing a second set of movements caused by motion of the vehicle;
detecting one or more complete turns made by the vehicle during the first trip segment based on the second set of movements, wherein each of the one or more complete turns comprises a respective turning direction;
determining a distance traveled by the vehicle before and after each of the one or more complete turns based on the second set of movements;
constructing an estimated sequence of the one or more complete turns and the distance traveled by the vehicle before and after each of the one or more complete turns;
determining a start location and an end location for the first trip segment;
selecting a plurality of candidate routes between the start location and the end location from map data for a region comprising the start location and the end location, wherein each candidate route of the plurality of candidate routes comprises a sequence of one or more turns and one or more travel distances between the start location and the end location;

comparing the sequence from each candidate route of the plurality of candidate routes with the estimated sequence to identify a matching route for the first trip segment;

detecting a user interaction with an interactive graphical user interface (GUI) presented on a display of the mobile phone; and in response to detecting the user interaction with the interactive GUI, causing the display to present a graphical image of the matching route on a map in the interactive GUI.

13. The non-transitory machine-readable storage medium of claim 12, wherein the operations further comprise:
activating an application stored on the mobile phone after the drive has already begun;
detecting, in response to activating the application, a location of the mobile phone at an activation time of the application to determine the end location; and
determining the end time of the first trip segment based on the activation time.

14. The non-transitory machine-readable storage medium of claim 12, wherein the one or more sensors of the mobile phone comprise at least one of an accelerometer, a magnetometer, a gyroscope, a compass, or a barometer, and the movements do not include GPS location data.

15. The non-transitory machine-readable storage medium of claim 13, wherein determining the distance traveled by the vehicle before and after each of the one or more complete turns comprises:
analyzing the second set of movements to generate predicted speeds of the vehicle over time before and after each of the one or more complete turns; and
integrating the predicted speeds of the vehicle over time to produce the distance traveled by the vehicle before and after each of the one or more complete turns.

16. The non-transitory machine-readable storage medium of claim 15, wherein:
the subset of the movements include motion sensor measurements;
filtering the subset of the movements to remove the first set of movements comprises:
converting the motion sensor measurements into a frequency domain; and
filtering, with a bandpass filter, the motion sensor measurements in the frequency domain to eliminate high frequency sensor measurements from the motion sensor measurements; and
analyzing the second set of movements to generate the predicted speeds comprises:
defining a set of contiguous windows based on remaining measurements in the motion sensor measurements after filtering the motion sensor measurements to eliminate the high frequency sensor measurements, each contiguous window of the set of contiguous windows representing a contiguous portion of the remaining measurements in the motion sensor measurements;
generating, for each contiguous window of the set of contiguous windows, a set of features by resampling the motion sensor measurements of the contiguous window at one or more predefined frequencies; and
executing a trained neural network using the set of features.

17. The non-transitory machine-readable storage medium of claim 12, wherein detecting the one or more complete turns made by the vehicle comprises:
determining rates of course change with respect to time from the second set of movements; and
comparing the rates of course change against a threshold, wherein a turn is detected in response to determining that a rate of course change exceeds the threshold.

18. The non-transitory machine-readable storage medium of claim 12, wherein the operations further comprise:
detecting driving activity at a first time based on the movements; and
determining, in response to detecting the driving activity, the start time of the first trip segment based on the first time.

19. The non-transitory machine-readable storage medium of claim 12, wherein the operations further comprise:
analyzing the movements to generate predicted speeds of the mobile phone over time;
determining that a predicted speed of the mobile phone exceeded a threshold speed at a first time; and
determining the start time of the first trip segment based on the first time.

20. A system comprising:
a vehicle; and
a mobile phone disposed within the vehicle, the mobile phone comprising:
one or more processors;
one or more sensors configured to measure movements of the mobile phone during a drive in the vehicle and transmit electronic signals to the one or more processors indicating the movements of the mobile phone, the one or more sensors comprising:
an accelerometer configured to generate acceleration data;
a display; and
a memory storing a set of instructions;
wherein the one or more processors are coupled to the one or more sensors, the display, and the memory, and the one or more processors are configured to execute the set of instructions to:
receive the electronic signals from the one or more sensors indicating the movements;
fetch, from the memory, a subset of the movements that comprises movements measured between a start time and an end time of a first trip segment completed within the drive for which accurate Global Positioning System (GPS) data from a GPS receiver of the mobile phone is unavailable;
filter the subset of the movements to remove a first set of movements caused by a user of the mobile phone from the subset of the movements, and thereby provide a second set of movements caused by motion of the vehicle;
detect one or more complete turns made by the vehicle during the first trip segment based on the second set of movements, wherein each of the one or more complete turns comprises a respective turning direction;
determine a distance traveled by the vehicle before and after each of the one or more complete turns based on the second set of movements;
construct an estimated sequence of the one or more complete turns and the distance traveled by the vehicle before and after each of the one or more complete turns;

determine a start location and an end location for the first trip segment;

select a plurality of candidate routes between the start location and the end location from map data for a region comprising the start location and the end location, wherein each candidate route of the plurality of candidate routes comprises a sequence of one or more turns and one or more travel distances between the start location and the end location;

compare the sequence from each candidate route of the plurality of candidate routes with the estimated sequence to identify a matching route for the first trip segment;

detect a user interaction with an interactive graphical user interface (GUI) presented on the display of the mobile phone; and in response to detecting the user interaction with the interactive GUI, cause the display to present a graphical image of the matching route on a map in the interactive GUI.

* * * * *